United States Patent
O'Brien et al.

(10) Patent No.: US 12,458,434 B2
(45) Date of Patent: Nov. 4, 2025

(54) TREATMENT OF THE REPRODUCTIVE TRACT WITH PULSED ELECTRIC FIELDS

(71) Applicant: Galvanize Therapeutics, Inc., San Carlos, CA (US)

(72) Inventors: Timothy J. O'Brien, Santa Clara, CA (US); Quim Castellvi, Barcelona (ES); Luis L. Mangual Arbelo, Sunnyvale, CA (US); Jonathan R. Waldstreicher, West Orange, NJ (US); Seth S. Gleiman, Guilford, CT (US); Nicholas S. Mercer, San Francisco, CA (US); Kevin J Taylor, San Mateo, CA (US); Robert E. Neal, II, Redwood City, CA (US); William S. Krimsky, Forest Hill, MD (US); Armaan G. Vachani, Foster City, CA (US)

(73) Assignee: Galvanize Therapeutics, Inc., San Carlos, CA (US)

( * ) Notice: Subject to any disclaimer, the term of this patent is extended or adjusted under 35 U.S.C. 154(b) by 740 days.

(21) Appl. No.: 17/575,500

(22) Filed: Jan. 13, 2022

(65) Prior Publication Data
US 2022/0133401 A1 May 5, 2022

Related U.S. Application Data

(63) Continuation of application No. PCT/US2020/042260, filed on Jul. 16, 2020.
(Continued)

(51) Int. Cl.
*A61B 18/14* (2006.01)
*A61B 18/00* (2006.01)

(52) U.S. Cl.
CPC ...... *A61B 18/1482* (2013.01); *A61B 18/1492* (2013.01); *A61B 2018/00041* (2013.01);
(Continued)

(58) Field of Classification Search
CPC .......................................... A61B 2018/00559
See application file for complete search history.

(56) References Cited

U.S. PATENT DOCUMENTS

| 5,683,384 A | 11/1997 | Gough et al. |
| 6,233,482 B1 | 5/2001 | Hofmann et al. |
| (Continued) | | |

FOREIGN PATENT DOCUMENTS

| CN | 101198287 A | 6/2008 |
| CN | 102105115 A | 6/2011 |
| (Continued) | | |

OTHER PUBLICATIONS

PCT/US2020/042260 International Search Report and Written Opinion of the International Searching Authority dated Oct. 14, 2020.
(Continued)

*Primary Examiner* — Ronald Hupczey, Jr.
(74) *Attorney, Agent, or Firm* — WILSON SONSINI GOODRICH & ROSATI

(57) ABSTRACT

Devices, systems and methods are provided for treating conditions of the reproductive tract. A number of conditions can afflict the lining and cell layers deeper within the anatomical structures. For example, cervical intraepithelial neoplasia (CIN), also known as cervical dysplasia, is a condition involving abnormal growth of cells on the surface of the cervix that could potentially lead to cervical cancer in situ (CIS). Other conditions include human papillomavirus (HPV)-related cervical disease, various endometrial diseases, acute and chronic cervicitis, and various infections (e.g. trichomoniasis) to name a few. In some embodiments, treatments eliminate diseased, damaged, abnormal or otherwise undesired cells leaving the tissue framework intact. This allows the tissue to regenerate in a normal fashion, avoiding the formation of scar tissue. When the tissue framework is left intact, the framework structure repopulates
(Continued)

with healthy cells, regenerating the normal tissue without altering the structural properties.

20 Claims, 28 Drawing Sheets

Related U.S. Application Data

(60) Provisional application No. 62/874,605, filed on Jul. 16, 2019.

(52) U.S. Cl.
CPC ........... *A61B 2018/00083* (2013.01); *A61B 2018/0022* (2013.01); *A61B 2018/00559* (2013.01); *A61B 2018/00577* (2013.01); *A61B 18/1477* (2013.01)

(56) References Cited

U.S. PATENT DOCUMENTS

| | | | |
|---|---|---|---|
| 6,248,056 B1 | 6/2001 | Persson | |
| 6,326,177 B1 | 12/2001 | Schoenbach et al. | |
| 6,366,808 B1 | 4/2002 | Schroeppel et al. | |
| 6,569,149 B2 | 5/2003 | Dev et al. | |
| 6,738,663 B2 | 5/2004 | Schroeppel et al. | |
| 6,994,706 B2 | 2/2006 | Chornenky et al. | |
| 7,130,697 B2 | 10/2006 | Chornenky et al. | |
| 7,395,112 B2 | 7/2008 | Keisari et al. | |
| 7,412,284 B2 | 8/2008 | Hofmann | |
| 7,412,285 B2 | 8/2008 | Schroeppel et al. | |
| 7,565,205 B2 | 7/2009 | Palti | |
| 7,565,206 B2 | 7/2009 | Palti | |
| 7,599,745 B2 | 10/2009 | Palti | |
| 7,599,746 B2 | 10/2009 | Palti | |
| 7,713,740 B2 | 5/2010 | Jaroszeski et al. | |
| 7,742,811 B2 | 6/2010 | Schroeppel et al. | |
| 7,765,010 B2 | 7/2010 | Chornenky et al. | |
| 7,805,201 B2 | 9/2010 | Palti | |
| RE42,016 E | 12/2010 | Chornenky et al. | |
| 7,879,610 B1 | 2/2011 | Heller et al. | |
| 7,917,227 B2 | 3/2011 | Palti | |
| 7,959,628 B2 | 6/2011 | Schaer et al. | |
| 8,014,854 B2 | 9/2011 | Schroeppel et al. | |
| 8,019,414 B2 | 9/2011 | Palti | |
| 8,024,048 B2 | 9/2011 | Schroeppel et al. | |
| 8,026,223 B1 | 9/2011 | Heller et al. | |
| 8,105,324 B2 | 1/2012 | Palanker et al. | |
| 8,109,926 B2 | 2/2012 | Azure | |
| 8,114,070 B2 | 2/2012 | Rubinsky et al. | |
| 8,231,603 B2 | 7/2012 | Hobbs et al. | |
| 8,244,345 B2 | 8/2012 | Palti | |
| 8,298,222 B2 | 10/2012 | Rubinsky et al. | |
| 8,406,870 B2 | 3/2013 | Palti | |
| 8,465,484 B2 | 6/2013 | Davalos et al. | |
| 8,500,713 B2 | 8/2013 | Ferek-Petric | |
| 8,512,334 B2 | 8/2013 | Nuccitelli et al. | |
| 8,600,494 B2 | 12/2013 | Schroeppel et al. | |
| 8,634,929 B2 | 1/2014 | Chornenky et al. | |
| 8,802,643 B1 | 8/2014 | Heller et al. | |
| 8,814,860 B2 | 8/2014 | Davalos et al. | |
| 8,927,518 B1 | 1/2015 | Heller et al. | |
| 8,992,517 B2 | 3/2015 | Davalos et al. | |
| 9,037,230 B2 | 5/2015 | Goldfarb et al. | |
| 9,101,764 B2 | 8/2015 | Nuccitelli et al. | |
| 9,168,373 B2 | 10/2015 | Nuccitelli et al. | |
| 9,211,155 B2 | 12/2015 | Fruland et al. | |
| 9,242,041 B2 | 1/2016 | Kosik et al. | |
| 9,610,364 B1 | 4/2017 | Heller et al. | |
| 9,629,912 B2 | 4/2017 | Soikum et al. | |
| 9,655,669 B2 | 5/2017 | Palti et al. | |
| 9,656,066 B2 | 5/2017 | Nuccitelli et al. | |
| 9,724,155 B2 | 8/2017 | Nuccitelli et al. | |
| 9,833,617 B2 | 12/2017 | Travers et al. | |
| 9,943,684 B2 | 4/2018 | Nuccitelli et al. | |
| 10,143,512 B2 | 12/2018 | Rubinsky et al. | |
| 10,143,759 B1 | 12/2018 | Heller et al. | |
| 10,154,869 B2 | 12/2018 | Onik et al. | |
| 10,154,874 B2 | 12/2018 | Davalos et al. | |
| 10,292,755 B2 | 5/2019 | Arena et al. | |
| 10,391,125 B2 | 8/2019 | Nuccitelli et al. | |
| 10,426,847 B2 | 10/2019 | Pierce et al. | |
| 10,448,989 B2 | 10/2019 | Arena et al. | |
| 10,471,254 B2 | 11/2019 | Sano et al. | |
| 2002/0010491 A1 | 1/2002 | Schoenbach et al. | |
| 2002/0198567 A1 | 12/2002 | Keisari et al. | |
| 2003/0170898 A1 | 9/2003 | Gundersen et al. | |
| 2004/0044338 A1 | 3/2004 | Lennox et al. | |
| 2005/0171574 A1 | 8/2005 | Rubinsky et al. | |
| 2006/0264752 A1 | 11/2006 | Rubinsky et al. | |
| 2006/0269531 A1 | 11/2006 | Beebe et al. | |
| 2006/0293731 A1 | 12/2006 | Rubinsky et al. | |
| 2008/0015571 A1 | 1/2008 | Rubinsky et al. | |
| 2009/0281477 A1 | 11/2009 | Mikus et al. | |
| 2009/0292342 A1 | 11/2009 | Rubinsky et al. | |
| 2009/0318914 A1 | 12/2009 | Utley et al. | |
| 2010/0228248 A1 | 9/2010 | Griffin | |
| 2010/0240995 A1 | 9/2010 | Nuccitelli et al. | |
| 2010/0256630 A1 | 10/2010 | Hamilton, Jr. et al. | |
| 2011/0118732 A1 | 5/2011 | Rubinsky et al. | |
| 2011/0202052 A1 | 8/2011 | Gelbart et al. | |
| 2011/0288545 A1 | 11/2011 | Beebe et al. | |
| 2012/0143120 A1 | 6/2012 | Goldfarb et al. | |
| 2012/0226271 A1 | 9/2012 | Callas et al. | |
| 2012/0315704 A1 | 12/2012 | Beebe et al. | |
| 2014/0039491 A1* | 2/2014 | Bakos | A61B 18/1492 606/41 |
| 2014/0324036 A1 | 10/2014 | Sachs et al. | |
| 2015/0005766 A1 | 1/2015 | Rioux et al. | |
| 2015/0201996 A1 | 7/2015 | Rubinsky et al. | |
| 2015/0289923 A1 | 10/2015 | Davalos et al. | |
| 2016/0206370 A1 | 7/2016 | Fruland et al. | |
| 2016/0354145 A1 | 12/2016 | Stern et al. | |
| 2016/0361109 A1 | 12/2016 | Weaver et al. | |
| 2016/0367310 A1 | 12/2016 | Onik et al. | |
| 2017/0119465 A1 | 5/2017 | Long et al. | |
| 2017/0215939 A1 | 8/2017 | Palti et al. | |
| 2017/0216585 A1 | 8/2017 | Goldfarb et al. | |
| 2017/0266283 A1 | 9/2017 | Soikum et al. | |
| 2017/0281934 A1 | 10/2017 | Giladi et al. | |
| 2017/0304002 A1 | 10/2017 | Beebe et al. | |
| 2017/0312021 A1* | 11/2017 | Pilcher | A61B 18/1492 |
| 2017/0319843 A1 | 11/2017 | Beebe et al. | |
| 2018/0000895 A1 | 1/2018 | Pierce et al. | |
| 2018/0028267 A1 | 2/2018 | Onik et al. | |
| 2018/0085575 A1 | 3/2018 | Travers et al. | |
| 2018/0104486 A1 | 4/2018 | Yoon et al. | |
| 2018/0110557 A1 | 4/2018 | Muratori et al. | |
| 2018/0110978 A1 | 4/2018 | Beebe et al. | |
| 2018/0132922 A1 | 5/2018 | Neal, II | |
| 2018/0154142 A1 | 6/2018 | Guo et al. | |
| 2018/0193082 A1 | 7/2018 | Rubinsky et al. | |
| 2018/0200510 A1 | 7/2018 | Nuccitelli et al. | |
| 2018/0263685 A1 | 9/2018 | Onik et al. | |
| 2018/0289954 A1 | 10/2018 | Hebb et al. | |
| 2019/0046791 A1 | 2/2019 | Ebbers et al. | |
| 2019/0099214 A1 | 4/2019 | Rubinsky et al. | |
| 2019/0105408 A1 | 4/2019 | Heller et al. | |
| 2019/0117963 A1 | 4/2019 | Travers et al. | |
| 2019/0117969 A1 | 4/2019 | Schmidt et al. | |
| 2019/0160283 A1 | 5/2019 | Nuccitelli et al. | |
| 2019/0201089 A1 | 7/2019 | Waldstreicher et al. | |
| 2019/0223938 A1 | 7/2019 | Arena et al. | |
| 2019/0232048 A1 | 8/2019 | Latouche et al. | |
| 2019/0239949 A1 | 8/2019 | Nuccitelli et al. | |
| 2019/0282294 A1 | 9/2019 | Davalos et al. | |
| 2019/0299019 A1 | 10/2019 | Chornenky et al. | |
| 2019/0307781 A1 | 10/2019 | Krex et al. | |
| 2019/0328445 A1 | 10/2019 | Sano et al. | |
| 2019/0350971 A1 | 11/2019 | Nuccitelli et al. | |
| 2019/0351224 A1 | 11/2019 | Sano et al. | |
| 2020/0000938 A1 | 1/2020 | Pierce et al. | |
| 2020/0009377 A1 | 1/2020 | Chang et al. | |

(56) References Cited

U.S. PATENT DOCUMENTS

| | | |
|---|---|---|
| 2020/0016067 A1 | 1/2020 | Gotlib et al. |
| 2020/0038093 A1 | 2/2020 | Onik |
| 2020/0046967 A1 | 2/2020 | Ivey et al. |

FOREIGN PATENT DOCUMENTS

| | | |
|---|---|---|
| CN | 104080418 A | 10/2014 |
| CN | 104703557 A | 6/2015 |
| EP | 0935482 B1 | 5/2005 |
| EP | 1991303 A2 | 11/2008 |
| EP | 1648555 B1 | 9/2015 |
| EP | 3003470 B1 | 8/2017 |
| EP | 3290082 A2 | 3/2018 |
| EP | 2994045 B1 | 5/2019 |
| EP | 3569144 A1 | 11/2019 |
| JP | 2011524785 A | 9/2011 |
| JP | 2012515018 A | 7/2012 |
| WO | WO-9814238 A1 | 4/1998 |
| WO | WO-9906101 A1 | 2/1999 |
| WO | WO-0110319 A1 | 2/2001 |
| WO | WO-02098501 A2 | 12/2002 |
| WO | WO-03047684 A2 | 6/2003 |
| WO | WO-2004037341 A2 | 5/2004 |
| WO | WO-2004110371 A2 | 12/2004 |
| WO | WO-2005044371 A1 | 5/2005 |
| WO | WO-2005065284 A2 | 7/2005 |
| WO | WO-2005115535 A2 | 12/2005 |
| WO | WO-2005032646 A3 | 4/2006 |
| WO | WO-2006036706 A1 | 4/2006 |
| WO | WO-2006085150 A2 | 8/2006 |
| WO | WO-2006116608 A2 | 11/2006 |
| WO | WO-2006131816 A2 | 12/2006 |
| WO | WO-2007001747 A2 | 1/2007 |
| WO | WO-2007001751 A1 | 1/2007 |
| WO | WO-2007039799 A3 | 7/2007 |
| WO | WO-2007100727 A2 | 9/2007 |
| WO | WO-2007103070 A2 | 9/2007 |
| WO | WO-2008034100 A2 | 3/2008 |
| WO | WO-2008087489 A8 | 11/2008 |
| WO | WO-2009137800 A2 | 11/2009 |
| WO | WO-2009154654 A1 | 12/2009 |
| WO | WO-2010022275 A1 | 2/2010 |
| WO | WO-2010080974 A1 | 7/2010 |
| WO | WO-2010093692 A2 | 8/2010 |
| WO | WO-2010107947 A1 | 9/2010 |
| WO | WO-2010118387 A1 | 10/2010 |
| WO | WO-2010151277 A1 | 12/2010 |
| WO | WO-2011135294 A1 | 11/2011 |
| WO | WO-2012088149 A2 | 6/2012 |
| WO | WO-2014181167 A1 | 11/2014 |
| WO | WO-2014197240 A2 | 12/2014 |
| WO | WO-2014204978 A1 | 12/2014 |
| WO | WO-2015085162 A1 | 6/2015 |
| WO | WO-2015175570 A1 | 11/2015 |
| WO | WO-2016014264 A1 | 1/2016 |
| WO | WO-2016036891 A1 | 3/2016 |
| WO | WO-2016089781 A1 | 6/2016 |
| WO | WO-2016112359 A1 | 7/2016 |
| WO | WO-2016123608 A2 | 8/2016 |
| WO | WO-2016126778 A1 | 8/2016 |
| WO | WO-2016149575 A1 | 9/2016 |
| WO | WO-2016154473 A1 | 9/2016 |
| WO | WO-2016178697 A1 | 11/2016 |
| WO | WO-2016179712 A1 | 11/2016 |
| WO | WO-2016201264 A1 | 12/2016 |
| WO | WO-2017173089 A1 | 10/2017 |
| WO | WO-2017175116 A1 | 10/2017 |
| WO | WO-2018005511 A1 * | 1/2018 | ......... A61B 18/1206 |
| WO | WO-2018010659 A1 | 1/2018 |
| WO | WO-2018065806 A1 | 4/2018 |
| WO | WO-2018067999 A1 | 4/2018 |
| WO | WO-2018075946 A1 | 4/2018 |
| WO | WO-2018106672 A1 | 6/2018 |
| WO | WO-2019032474 A1 | 2/2019 |
| WO | WO-2019084011 A1 | 5/2019 |
| WO | WO-2019095604 A1 | 5/2019 |
| WO | WO-2019100016 A1 | 5/2019 |
| WO | WO-2019108540 A1 | 6/2019 |
| WO | WO-2019133606 A1 | 7/2019 |
| WO | WO-2019133608 A1 | 7/2019 |
| WO | WO-2019197973 A1 | 10/2019 |
| WO | WO-2020010188 A1 | 1/2020 |
| WO | WO-2020018662 A1 | 1/2020 |
| WO | WO-2020215007 A1 | 10/2020 |
| WO | WO-2021011733 A1 | 1/2021 |

OTHER PUBLICATIONS

EP20840607.4 Extended European Search Report dated Jun. 27, 2023.

* cited by examiner

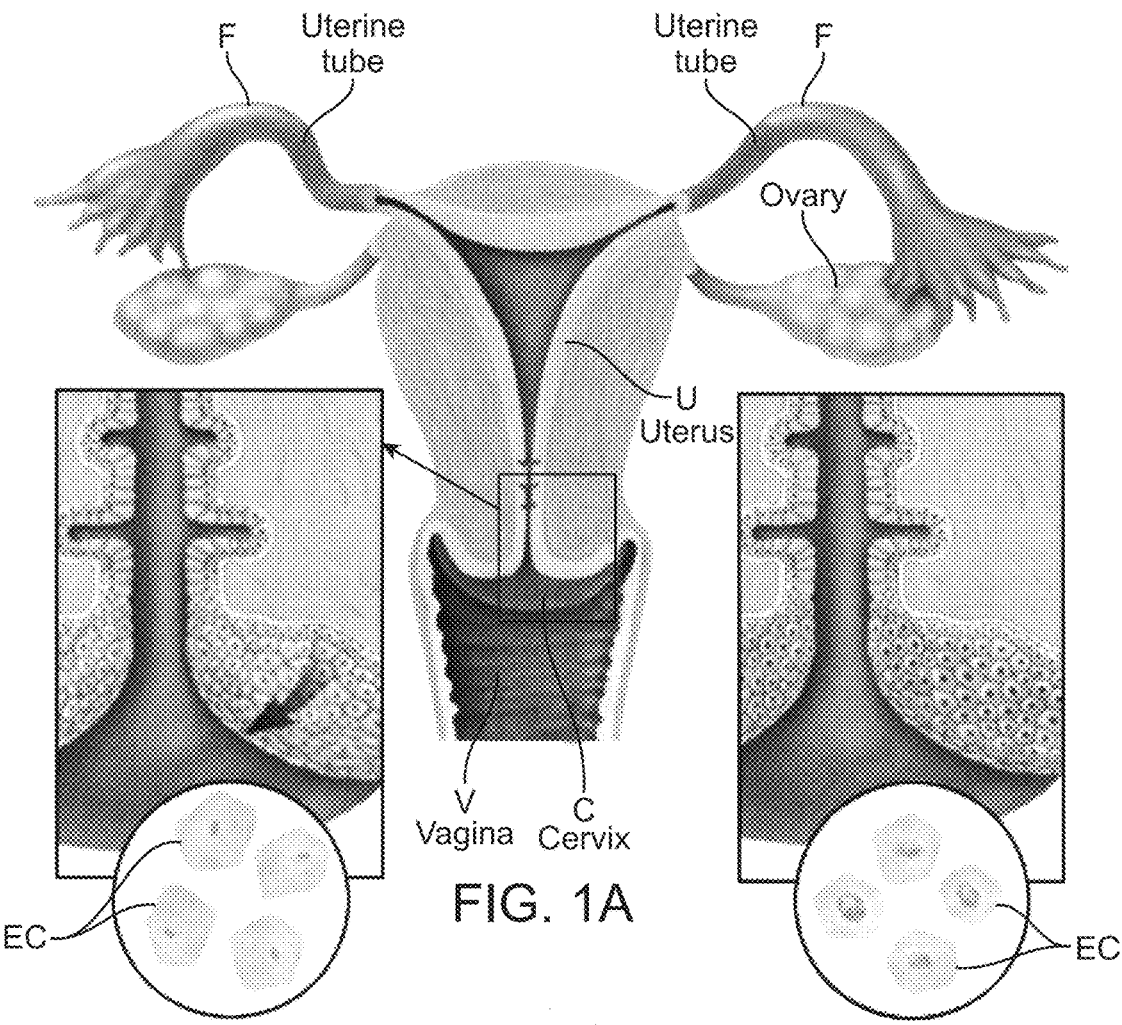
Normal cervical epithelial cells
FIG. 1B
FIG. 1A
Mild dysplasia
FIG. 1C
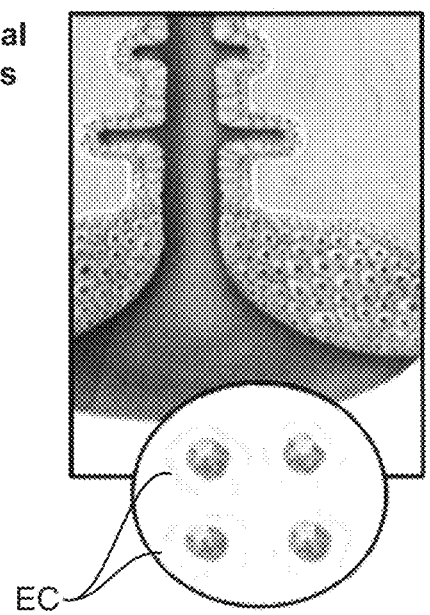
Moderate to severe displasia showing precancerous changes
FIG. 1D
(PRIOR ART)

Stage IB1 Cervical Cancer

Stage IB2 Cervical Cancer

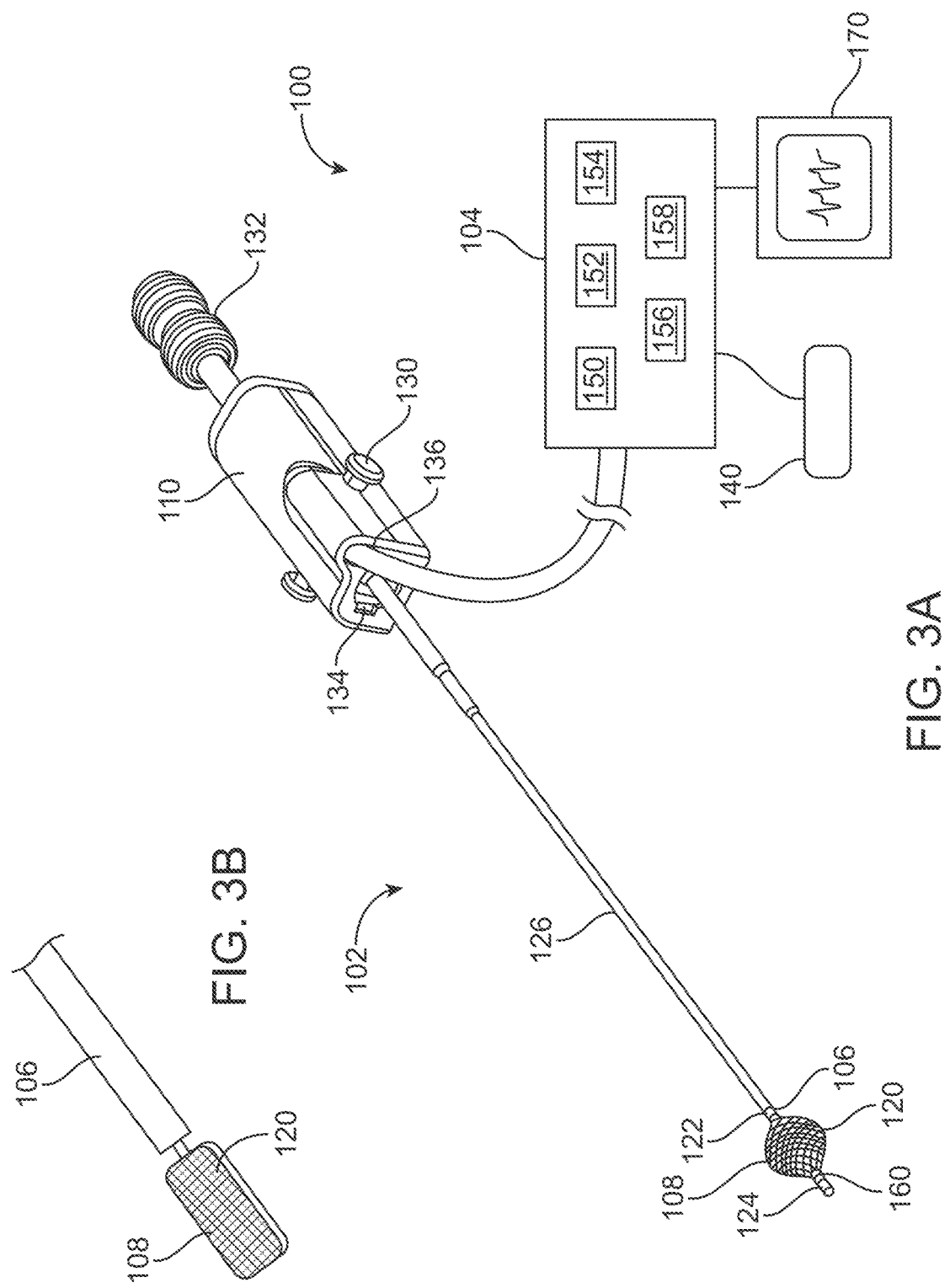

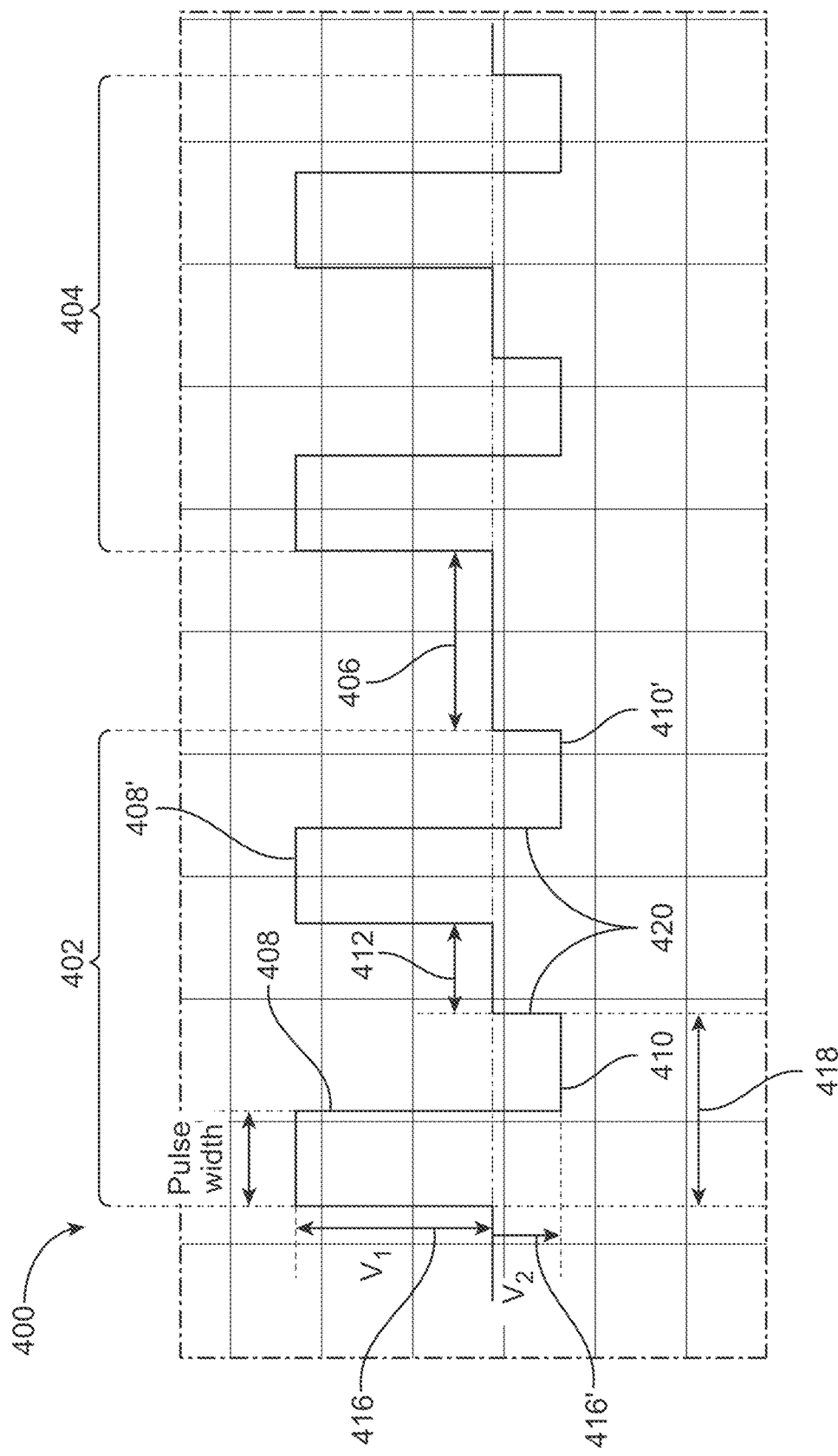

Pulse Asymmetry (pulse length and/or pulse voltage):
Ex 2500V@830ns - 0 - 2500V@830ns
*Note: Because no opposing polarity, there is no appreciable difference when considering $t_s$ V. $t_d$*

Pulse Voltage and Timing Variable Asymmetry : Multiple combinations and permutations possible

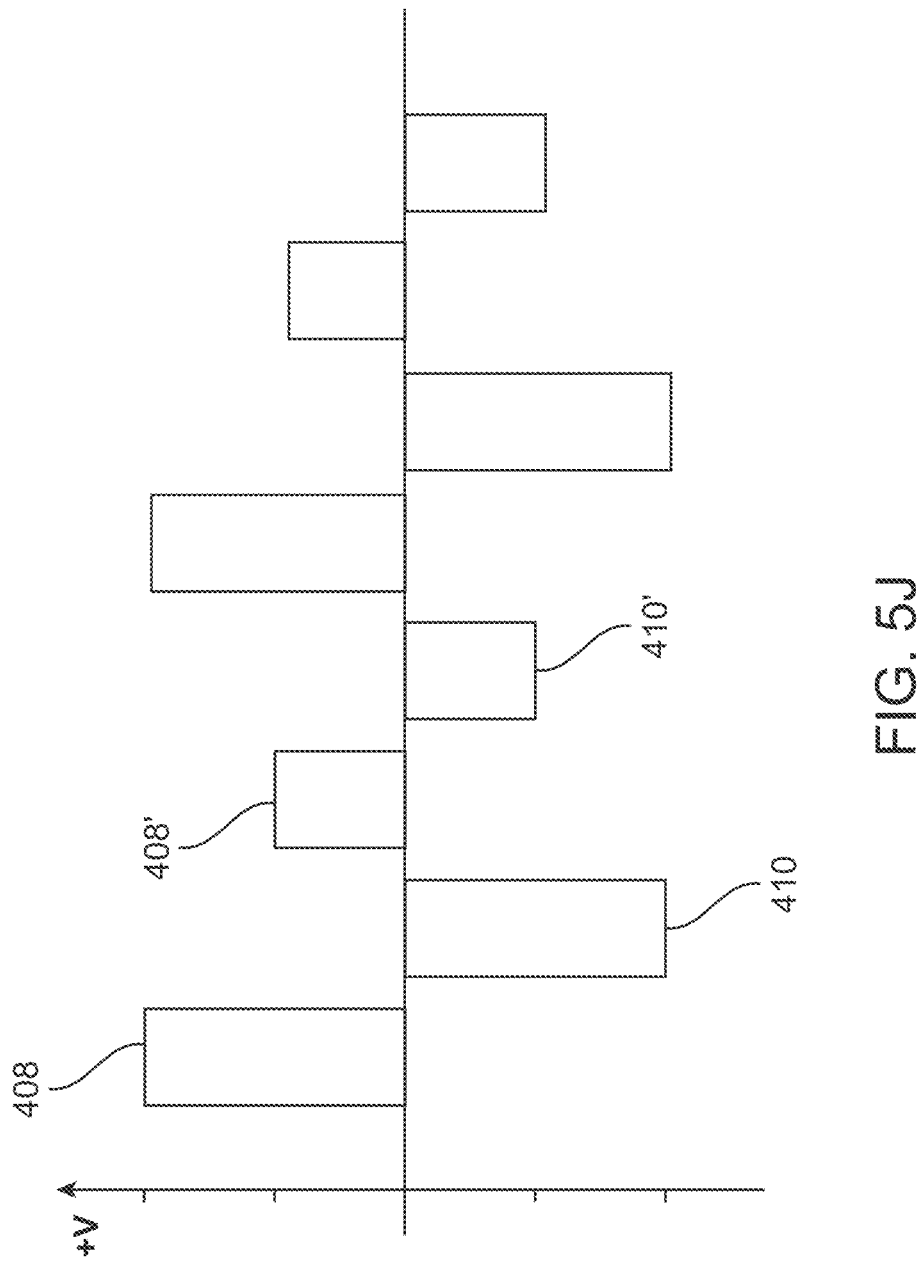

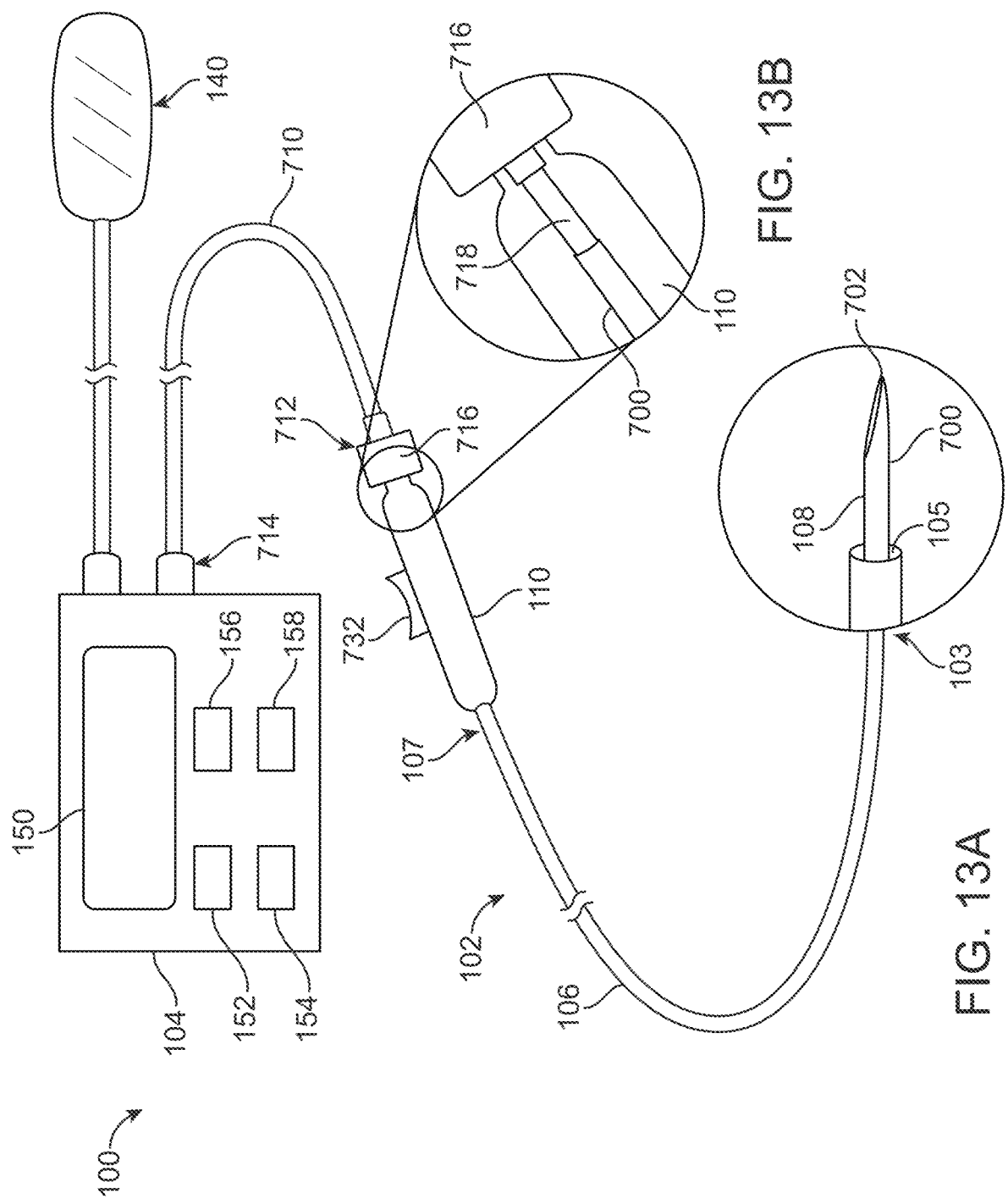

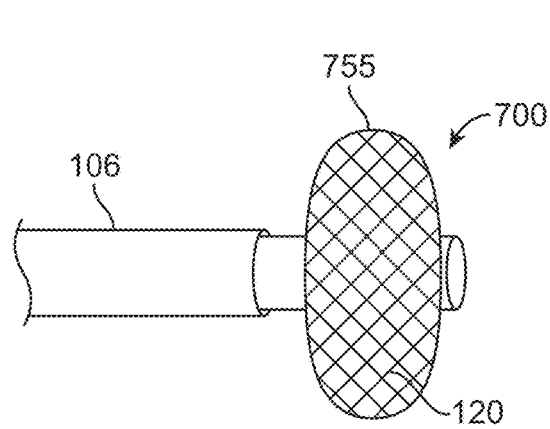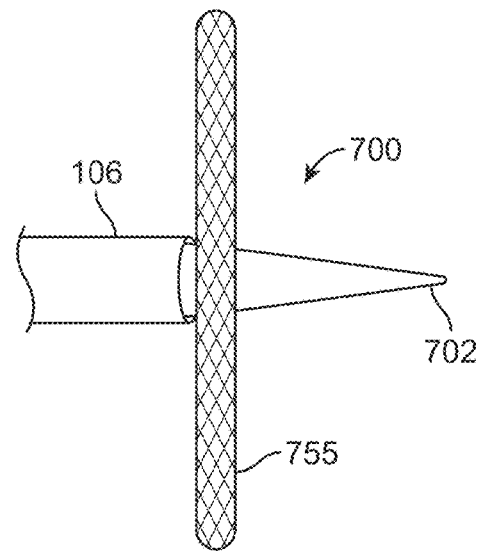
FIG. 20
FIG. 21
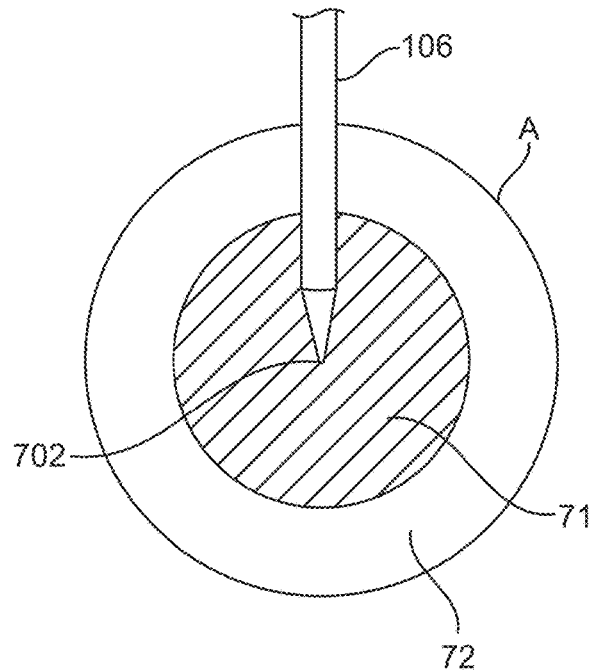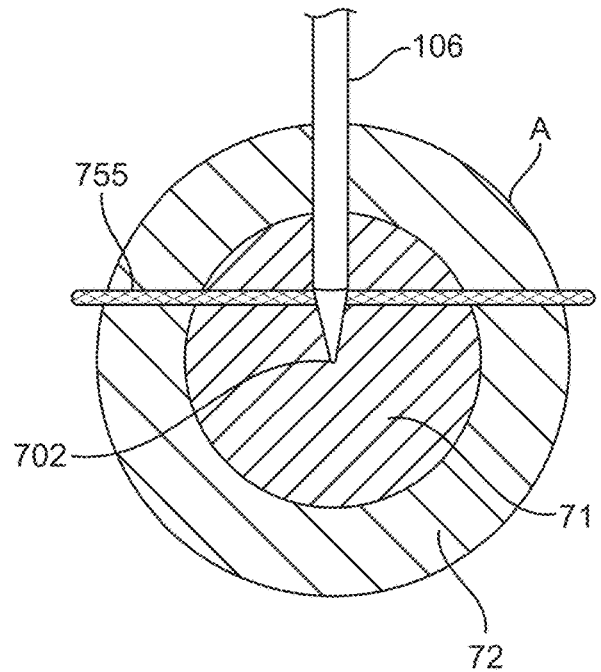
FIG. 22A
FIG. 22B

TREATMENT OF THE REPRODUCTIVE TRACT WITH PULSED ELECTRIC FIELDS

CROSS-REFERENCE

This application is a continuation of PCT Application No. PCT/US2020/042260, filed Jul. 16, 2020, which claims priority to and claims the benefit of U.S. Patent Application No. 62/874,605, filed on Jul. 16, 2019, the entire content of which is incorporated herein by reference.

BACKGROUND

The reproductive tract (or genital tract) is the biological system made up of the anatomical organs involved in sexual reproduction. The human female reproductive system is comprised of a series of organs primarily located inside of the body and around the pelvic region of a female that contribute towards the reproductive process. Thus, the internal portions of the female reproductive system may be considered a lumen that starts as a single pathway through the vagina, continues through an opening in the cervix, and splits into two lumens in the uterus, both of which continue through the fallopian tubes. The vagina is a fibromuscular canal leading from the outside of the body to the cervix of the uterus. The cervix is the neck of the uterus, the lower, narrow portion that joins with the upper part of the vagina. It is cylindrical or conical in shape and protrudes through the upper anterior vaginal wall. Approximately half its length is visible, the remainder lies above the vagina beyond view. The uterus is the major female reproductive organ. The uterus provides mechanical protection, nutritional support, and waste removal for the developing embryo and fetus. In addition, contractions in the muscular wall of the uterus are important in pushing out the fetus at the time of birth. The fallopian tubes are two tubes leading from the ovaries into the uterus. On maturity of an ovum, the follicle and the ovary's wall rupture, allowing the ovum to escape and enter the fallopian tube. There it travels toward the uterus, pushed along by movements of cilia on the inner lining of the tubes. If the ovum is fertilized while in the fallopian tube, then it normally implants in the endometrium when it reaches the uterus, which signals the beginning of pregnancy.

Epithelial cells line the fallopian tubes, uterus, cervix and vagina. Epithelial cells provide a first line of defense that confers continuous protection, by providing a physical barrier as well as secretions containing bactericidal and virucidal agents. In addition to maintaining a state of ongoing protection, these cells have evolved to respond to pathogens, in part through Toll-like receptors (TLRs), to enhance innate immune protection and, when necessary, to contribute to the initiation of an adaptive immune response. Against this backdrop, epithelial cell's innate and adaptive immune function is modulated to meet the constraints of procreation.

However, a number of conditions can afflict the epithelial cell lining and, in some instances, affect cell layers deeper within the anatomical structures. For example, cervical intraepithelial neoplasia (CIN), also known as cervical dysplasia, is a condition involving abnormal growth of cells on the surface of the cervix that could potentially lead to cervical cancer. More specifically, CIN refers to the potentially precancerous transformation of cells of the cervix. CIN most commonly occurs at the squamocolumnar junction of the cervix, a transitional area between the squamous epithelium of the vagina and the columnar epithelium of the endocervix. It can also occur in vaginal walls and vulvar epithelium. CIN is graded on a 1-3 scale, with 3 being the most abnormal. The cause of CIN is chronic infection of the cervix with human papillomavirus (HPV), especially infection with high-risk HPV types 16 or 18. It is thought that the high-risk HPV infections have the ability to inactivate tumor suppressor genes such as the p53 gene and the RB gene, thus allowing the infected cells to grow unchecked and accumulate successive mutations, eventually leading to cancer.

FIG. 1A illustrates a reproductive tract of a female patient. As shown, the reproductive tract includes the vagina V, cervix C, uterus U and fallopian tubes F. FIG. 1B provides a close-up view of a portion of the cervix C illustrating normal cervical epithelial cells EC which line the cervix C. FIG. 1C illustrates the development of mild epithelial dysplasia. Epithelial dysplasia comprises an expansion of immature cells with a corresponding decrease in the number and location of mature cells. Dysplasia is often indicative of an early neoplastic process. The term dysplasia is typically used when the cellular abnormality is restricted to the originating tissue, as in the case of an early, in-situ neoplasm. Mild dysplasia is typically confined to the first ⅓ of the epithelium (the most superficial). FIG. 1D illustrates the development of moderate to severe dysplasia. Moderate dysplasia is confined to the next ⅔ of the epithelium and represents a mix of low- and high-grade lesions not easily differentiated by histology. Severe dysplasia comprises undifferentiated neoplastic cells that span more than ⅔ of the epithelium. Abnormal cells that appear on a Pap test may require further examination for diagnosis. Such diagnosis can be achieved with a loop electrosurgical excision procedure (LEEP)/large loop excision of the transformation zone (LLETZ) or a cone biopsy/cold knife conization. Conditions beyond severe dysplasia are typically referred to as cervical carcinoma in situ (CIS).

Stage O classifies CIS as the earliest form of cervical cancer, however physicians typically consider it as precancer. This is because the cancer cells are only on the surface layer of the cervix and have not grown into deeper layers of cells. Such cells typically appear on a Pap test may require further examination for diagnosis. Again, such diagnosis can be achieved with a loop electrosurgical excision procedure (LEEP)/large loop excision of the transformation zone (LLETZ) or a cone biopsy/cold knife conization. Typically, for Stage O, these procedures serve as effective treatments due to the removal of cells.

Beyond Stage O, CIS is divided into various stages of cancer. In some of the earlier stages, cryosurgery and laser surgery may be used for treatment. Later stages generally involve surgery, radiation, or radiation given with chemo (concurrent chemoradiation). FIGS. 2A-2C illustrate Stage IB1 and Stage IB2 of cervical cancer. As illustrated, malignant cells MC have invaded the deeper tissues of the cervix C, beyond the epithelial cells EC. For patients desiring to maintain fertility, a radical trachelectomy with pelvic lymph node dissection may be utilized for treatment.

In the diagnosis and treatment of both CIN and CIS, possible complications include infection, bleeding, and changes or scarring of the cervix from removal of tissue, to name a few. Even in procedures intended to remove only epithelial cells, deeper tissues are often affected leading to scarring. Scarring prevents normal cell repopulation of the decellularized tissue, and also relates to the necrotic and coagulative necrotic patterns of response of the extracellular matrix (ECM) proteins to the high/low temperatures. These suboptimal response and lesion resolution patterns are associated with persistent bleeding, potential loss of elasticity of the tissue, and possible occlusion risks to the cervical lumen.

In some cases, the cervical lumen narrowing can interfere with fertility and can cause premature labor in pregnancy.

A case-control study found an association between surgical treatment of CIN lesions and risk of infertility or subfertility, with an odds ratio of approximately 2. A cohort study came to the result that women with a time interval from LEEP to pregnancy of less than 12 months compared with 12 months or more were at significantly increased risk for spontaneous abortion, with risk of miscarriage of 18% compared with 4.6%, respectively. On the other hand, no increased risk was identified for preterm birth after LEEP. However, a large meta-analysis concluded that women with CIN have a higher baseline risk for preterm birth than the general population and that LEEP as the treatment for CIN probably increase this risk further. Also, the risk of preterm birth appears to increase with multiple treatments and increasing amounts of tissue removed. Cervical conization causes a risk for subsequent pregnancies ending up in preterm birth of approximately 30% on average, due to cervical incompetence.

Improvement procedures for diagnosis and treatment are desired. Such treatments should be safe, effective, and lead to reduced complications include impact on future fertility.

SUMMARY OF THE INVENTION

Described herein are embodiments of apparatuses, systems and methods for treating target tissue.

In a first aspect, a catheter is provided for treating an area of tissue within a reproductive system of a patient comprising: an elongate shaft and an energy delivery body disposed near a distal end of the elongate shaft, wherein the elongate shaft is configured to be advanced into the reproductive tract so as to position the energy delivery body near or against the area of tissue within the reproductive system and wherein the catheter is couplable with a generator in a manner so that that energy is deliverable by the energy delivery body so as to treat the area of tissue.

In some embodiments, the energy delivery body has a shape configured to mate with contours of a cervix of the patient. For example, in some embodiments, the energy delivery body has a cup shape wherein the cup shape has a concave surface configured to mate with the contours of the cervix of the patient. In some embodiments, the energy delivery body comprises a wireform. In some embodiments, the energy delivery body comprises a flexible expandable member configured to be pressable against the cervix so as to conform to contours of the cervix. In some embodiments, the flexible expandable member includes one or more flexible electrodes. Optionally, the flexible expandable member comprises a non-conductive material and the one or more flexible electrodes comprises one or more pad electrodes.

In some embodiments, the catheter further comprises a stabilizing element configured to be advanced into a uterus of the patient to stabilize the catheter while the energy delivery body resides in a vagina of the patient so as to deliver energy to the cervix. In some embodiments, the stabilizing element is mounted on a shaft configured to pass through a lumen in the elongate shaft of the catheter. In some embodiments, the stabilizing element is mounted on a shaft configured to be advanced within an endocervical canal. In some embodiments, the stabilizing element comprises an expandable member having a collapsed configuration which allows passage through the endocervical canal and an expanded configuration which resists passage through the endocervical canal.

In some embodiments, the catheter further comprises a second energy delivery body. Optionally, the energy delivery body and the second energy delivery body function as a bipolar pair. In some embodiments, the energy delivery body and the second energy delivery body are configured to receive different waveforms of energy from the generator.

In some embodiments, the second energy delivery body is configured to be advanced into a uterus of the patient so as to treat an area of tissue within the uterus while the energy delivery body resides in a vagina of the patient so as to treat an area of tissue within the vagina. In some embodiments, the energy delivery body and the second energy delivery body function as a bipolar pair delivering an electric field configured to cause destruction of cells along and/or within the cervix. In some embodiments, the second energy delivery body has a funnel shape. In some embodiments, the energy delivery body has a cup shape. In some embodiments, the first and second energy delivery bodies are shaped to nest together holding cervical tissue therebetween. In some embodiments, the second energy delivery body is mounted on a second elongate shaft that telescopes within the elongate shaft of the energy delivery body. In some embodiments, the second energy delivery body is configured to be advanced into an endocervical canal so as to treat an area of tissue within the endocervical canal while the energy delivery body resides in a vagina of the patient so as to treat an area of tissue within the vagina or in a uterus of the patient so as to treat an area of tissue within the uterus. In some embodiments, the second energy delivery body is mounted on a second elongate shaft that telescopes within the elongate shaft of the energy delivery body.

In some embodiments, the catheter further comprises a third energy delivery body configured to be advanced into a uterus of the patient while the second energy delivery body resides in the endocervical canal and the energy delivery body resides in a vagina of the patient. In some embodiments, the second energy delivery body is mounted on a second elongate shaft that telescopes within the elongate shaft of the energy delivery body and the third energy delivery body is mounted on a third elongate shaft that telescopes within the second elongate shaft.

In some embodiments, the area of tissue comprises multiple inner surfaces of a luminal structure of the reproductive tract and wherein the energy delivery body comprises an expandable member configured to expand so as to be simultaneously positionable against the multiple inner surfaces. In some embodiments, the expandable member is configured to expand so as to substantially fill a uterus of the patient. In some embodiments, the expandable member comprises a flexible non-conductive material and one or more flexible pad electrodes.

In some embodiments, the energy delivery body comprises a probe configured to penetrate a wall of a luminal structure within the reproductive system and deliver the energy to the area of tissue. In some embodiments, the probe is advanceable from the distal end of the elongate shaft. In some embodiments, the probe includes a probe tip, wherein the probe tip is able to be advanced up to 8 cm from the distal end of the elongate shaft. In some embodiments, the distal end of the elongate shaft is configured to be advanced up to 20 cm beyond the wall of the luminal structure. In some embodiments, the probe comprises a plurality of probe elements, wherein at least one probe element is capable of delivering the energy to the area of tissue. In some embodiments, at least two probe elements are capable of delivering the energy and at least one of the at least two probe elements is independently selectable for receiving the energy for delivery. In some embodiments, each of the at least two probe elements are capable of simultaneously delivering the energy in different amounts. In some embodiments, the probe comprises a plurality of probe elements, wherein each probe element is capable of delivering the energy to the area of tissue. In some embodiments, wherein the probe comprises a plurality of probe elements, wherein at least one probe element is individually advanceable from the shaft.

In some embodiments, the probe comprises a conductive tube extending from a proximal end of the elongate shaft to the distal end of the elongate shaft. In some embodiments, the probe further comprises an energy plug configured to electrically connect the probe to the generator, wherein the energy plug includes a conductive wire configured to engage the conductive tube. In some embodiments, the probe comprises a probe tip disposed near the distal end of the elongate shaft and a conductive wire extending from a proximal end of the elongate shaft to the probe tip. In some embodiments, the probe comprises a probe tip and a conductive element configured to extend beyond the probe tip, wherein the conductive element is configured to deliver the energy to the area of tissue.

In some embodiments, the energy delivery body comprises an electrode having a disk shape. In some embodiments, the disk shape is disposed so that its diameter is substantially perpendicular to a longitudinal axis of the elongate shaft. In some embodiments, the energy delivery body includes probe tip that is substantially concentric with the electrode having the disk shape. In some embodiments, the catheter is configured so that the electrode having the disk shape delivers different energy than the probe tip.

In some embodiments, the energy delivery body comprises a basket-shaped electrode. In other embodiments, the energy delivery body comprises a paddle configured to be positioned near the area of tissue so that the paddle is able to deliver the energy to the area of tissue.

In some embodiments, the elongate shaft further comprises a delivery lumen configured to deliver a fluid to the area of tissue.

In second aspect a system is provided for treating an area of tissue within a reproductive system of a patient comprising a catheter as described herein; and a generator couplable with the catheter, wherein the generator includes at least one energy delivery algorithm configured to provide an electric signal of energy, wherein the energy is deliverable by the energy delivery body so as to treat the area of tissue.

In some embodiments, the energy comprises non-thermal energy and treating the area of tissue comprises destroying at least a portion of cells within the area of tissue while maintaining its collagen structure. In some embodiments, the area of tissue comprises epithelial cells along an inner surface of the reproductive system and wherein non-thermal energy deliverable by the energy delivery body causes destruction of at least a portion of the epithelial cells. In some embodiments, the epithelial cells reside along a cervix of the reproductive system. In some embodiments, the area of tissue resides within a wall of a luminal structure of the reproductive system. In some embodiments, the area of tissue comprises a fibroid. In some embodiments, the area of tissue resides within a wall of a fallopian tube. In some embodiments, the at least one energy delivery algorithm is configured to provide the electric signal of the energy deliverable to the tissue area so as to destroy at least a portion of the tissue area while maintaining patency of the luminal structure. In some embodiments, the area of tissue comprises a mass of undesired tissue cells and treating the area of tissue comprises destroying at least a portion of the mass of undesired tissue cells. In some embodiments, the mass of undesired tissue cells comprises a tumor, a benign tumor, a malignant tumor, a fibroid, a cyst, or an area of diseased tissue In some embodiments, the area of tissue is located external to a wall of a luminal structure of the reproductive system. In some embodiments, the at least one energy delivery algorithm is configured to provide non-thermal energy that is deliverable from the energy delivery body to a depth of up to 3 cm from an exterior of a wall of a luminal structure within the reproductive tract when the energy delivery body is disposed within the luminal structure.

In some embodiments, the at least one energy delivery algorithm is configured to provide non-thermal energy that is deliverable from the energy delivery body to a depth of up to but not beyond 2 mm into a wall of a luminal structure within the reproductive tract when the energy delivery body is disposed within the luminal structure.

In some embodiments, the at least one energy delivery algorithm is configured to provide non-thermal energy that is deliverable from the energy delivery body to but not beyond an epithelial layer of a luminal structure within the reproductive tract. In some embodiments, the luminal structure comprises a cervix, vagina, uterus or endocervical canal. In some embodiments, the electric signal comprises a series of biphasic pulses delivered in packets to provide non-thermal energy. In some embodiments, each of the biphasic pulses has a voltage between approximately 100 V to 10 kV. In some embodiments, each of the biphasic pulses has a voltage between approximately 500-4000 V. In some embodiments, the electric signal has a frequency in the range of approximately 100-1000 kHz. In some embodiments, the system further comprises a return electrode positionable at a distance from the energy delivery body so that the energy delivery body functions in a monopolar fashion.

In some embodiments, the catheter comprises a second energy delivery body, wherein the energy delivery body and the second energy delivery body function as a bipolar pair, and wherein the at least one energy delivery algorithm includes a first energy delivery algorithm configured to provide a first electric signal of energy deliverable by the energy delivery body and a second energy delivery algorithm configured to provide a second electric signal of energy deliverable by the second energy delivery body.

In some embodiments, the system further comprises a liquid deliverable by the catheter. Optionally, the liquid comprises a conductive solution. Optionally, the liquid comprises adjuvant material and wherein the energy encourages uptake of the adjuvant material. In some embodiments, the adjuvant material comprises a molecule, a macromolecule, or a plasmid.

Likewise, the invention relates to the following numbered clauses:
1. A method of treating an area of tissue within a reproductive system of a patient comprising:
    inserting a distal end of a catheter having an energy delivery body into a luminal structure of the reproductive system;
    positioning the energy delivery body near the area of tissue; and
    providing energy to the catheter so that the energy delivery body delivers the energy to the area of tissue so as to treat the area of tissue.
2. A method as in claim 1, wherein the energy comprises non-thermal energy that leads to destruction of at least a portion of cells in the area of tissue while maintaining a collagen structure within the area of tissue.

3. A method as in claim 2, wherein the at least a portion of cells comprise epithelial cells or squamous cells.

4. A method as in claim 2, wherein the at least a portion of cells suffer from dysplasia.

5. A method as in claim 2, wherein the energy leads to destruction of at least a portion of cells in the area of tissue.

6. A method as in claim 5, wherein the at least a portion of cells suffer from cancer.

7. A method as in claim 1, wherein the energy delivery body has a shape configured to mate with contours of a cervix of the patient, and wherein positioning the energy delivery body near the area of tissue comprises mating the energy delivery body with the contours of the cervix.

8. A method as in claim 7, wherein the energy delivery body has a cup shape, and wherein mating comprises positioning a concave surface of the cup shape against the contours of the cervix.

9. A method as in claim 1, wherein the energy delivery body is comprised of a flexible material and wherein positioning the energy delivery body comprises pressing the energy delivery body against an inner surface of a luminal structure of the reproductive system.

10. A method as in claim 9, wherein the energy delivery body comprises a flexible expandable member, the method further comprising expanding the flexible expandable member so as to press against the inner surface of the luminal structure of the reproductive system.

11. A method as in claim 10, wherein expanding the flexible expandable member comprises expanding the flexible expandable member so as to substantially fill a uterus of the patient.

12. A method as in claim 9, wherein the flexible expandable member includes one or more flexible electrodes and wherein pressing the energy delivery body against the inner surface of the luminal structure comprises pressing at least one of the at least one or more flexible electrodes against the inner surface of the luminal structure.

13. A method as in claim 1, wherein the catheter further comprises a stabilizing element, the method further comprises positioning the stabilizing element in a manner that stabilizes the position of the energy delivery body near the area of tissue.

14. A method as in claim 13, wherein positioning the stabilizing element comprises positioning the stabilizing element within a uterus of the patient, and wherein positioning the energy delivery body comprises positioning the energy delivery body within a vagina of the patient.

15. A method as in claim 14, wherein the stabilizing element comprises an expandable member, the method further comprising passing the expandable member through an endocervical canal while the expandable member is in a collapsed configuration and expanding the expandable member in the uterus so that such expansion resists passage of the expandable member back through the endocervical canal.

16. A method as in claim 1, wherein the catheter further comprises a second energy delivery device, the method further comprising positioning the second energy delivery device near a second area of tissue and providing energy to the catheter so that the second energy delivery body delivers energy to the second area of tissue so as to treat the second area of tissue.

17. A method as in claim 16, wherein the first area of tissue resides within a vagina of the patient and the second area of tissue resides within a uterus of the patient.

18. A method as in claim 16, wherein providing energy to the catheter comprises providing energy to the catheter so that the energy delivery body delivers energy to the area of tissue to a depth of up to but not beyond 2 mm into a wall of the luminal structure.

19. A method as in claim 16, wherein providing energy to the catheter comprises providing energy to the catheter so that the energy delivery body delivers energy to the area of tissue to a depth of up to 3 cm from an exterior of a wall of the luminal structure.

20. A method as in claim 16, wherein providing energy to the catheter comprises providing energy to but not beyond an epithelial layer of the luminal structure within the reproductive tract.

21. A method as in claim 1, wherein the luminal structure comprises a cervix, vagina, uterus or endocervical canal.

22. A method as in claim 1, wherein the energy is generated from an electric signal comprising a series of biphasic pulses delivered in packets.

23. A method as in claim 22, wherein each of the biphasic pulses has a voltage between approximately 100 V to 10 kV.

24. A method as in claim 23, wherein each of the biphasic pulses has a voltage between approximately 500-4000 V.

25. A method as in claim 22, wherein the electric signal has a frequency in the range of approximately 100-1000 kHz.

26. A method as in claim 1, further comprising positioning a return electrode at a distance from the energy delivery body so that the energy delivery body functions in a monopolar fashion.

27. A method as in claim 1, further comprising delivering a liquid to the area of tissue.

28. A method as in claim 27, wherein the liquid comprises a conductive solution.

29. A method as in claim 27, wherein the liquid comprises adjuvant material and wherein the energy encourages uptake of the adjuvant material.

30. A method as in claim 29, wherein the adjuvant material comprises a molecule, a macromolecule, or a plasmid.

31. A method for treating a cervix of a patient comprising:
inserting a distal end of a catheter having an energy delivery body into a vagina of the patient;
positioning the energy delivery body near the cervix;
providing energy to the catheter so that the energy delivery body delivers the energy toward the cervix causing destruction of a portion of epithelial cells.

32. A method as in claim 31, wherein providing energy comprises providing energy that reaches a depth of up to but not beyond 2 mm into a wall of the cervix.

33. A method as in claim 32, wherein providing energy comprises providing energy that reaches a depth of up to but not beyond 1 mm into a wall of the cervix.

34. A method as in claim 31, wherein providing energy causes destruction of the portion of epithelial cells without generating scar tissue.

35. A method as in claim 31, wherein the epithelial cells suffer dysplasia.

36. A method as in claim 31, wherein the energy comprises non-thermal energy and the non-thermal energy causes destruction of the portion of epithelial cells while maintaining a collagen structure of the cervix.

37. A method for treating a vagina of a patient comprising:
inserting a distal end of a catheter having an energy delivery body into the vagina of the patient;
positioning the energy delivery body near a wall of the vagina;
providing energy to the catheter so that the energy delivery body delivers the energy toward the wall of the vagina causing rejuvenation of at least a portion of the wall of the vagina.

38. A method as in claim 37, wherein the energy comprises non-thermal energy.

39. A method as in claim 37, wherein rejuvenation comprises increased blood flow.

40. A method as in claim 37, wherein rejuvenation comprises increased lubricity.

41. A method as in claim 37, wherein the energy delivery body comprises a wireform basket and positioning the energy delivery body comprises expanding the wireform basket so as to contact at least a portion of the wall of the vagina.

42. A method as in claim 41, wherein positioning the energy delivery body comprises expanding the wireform basket so as to circumferentially contact a vaginal canal having the wall of the vagina.

43. A catheter for treating an area of tissue of a patient comprising:
an elongate shaft; and
an energy delivery body disposed near a distal end of the elongate shaft,
wherein the elongate shaft is configured to be advanced so as to position the energy delivery body near or against the area of tissue and
wherein the catheter is couplable with a generator in a manner so that that energy is deliverable by the energy delivery body so as to treat the area of tissue.

44. A catheter as in claim 43, wherein the distal end of the shaft is configured to pass through a percutaneous needle.

45. A catheter as in claim 43, wherein the shaft is configured to be advanced percutaneously through skin of the patient.

46. A system for treating an area of tissue within a patient comprising:
a catheter as in any of claims 43-45; and
a generator couplable with the catheter, wherein the generator includes at least one energy delivery algorithm configured to provide an electric signal of energy, wherein the energy is deliverable by the energy delivery body so as to treat the area of tissue.

These and other embodiments are described in further detail in the following description related to the appended drawing figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A illustrates a reproductive tract of a female patient.

FIG. 1B provides a close-up view of a portion of the cervix illustrating normal cervical epithelial cells which line the cervix.

FIG. 1C illustrates the development of mild epithelial dysplasia.

FIG. 1D illustrates the development of moderate to severe dysplasia.

FIG. 3A illustrates a basic embodiment of a therapeutic energy delivery catheter.

FIG. 3B illustrates an energy delivery body having a paddle shape.

FIG. 5D illustrates an example waveform prescribed by another energy delivery algorithm wherein the waveform has voltage imbalance.

FIG. 5J illustrates an example of a waveform having imbalances in both positive and negative voltages.

FIGS. 13A-13B illustrates an embodiment of a therapeutic system that delivers energy extra-luminally.

FIG. 20 illustrates an embodiment of a probe comprising a plurality of wires or ribbons to form a basket.

FIG. 21 provides a side view illustration of a probe comprising a basket having a disk shape.

FIG. 22A illustrates an embodiment of a probe positioned within a target tissue area creating a first ablation zone surrounding the probe tip.

FIG. 22B illustrates the embodiment of the probe FIG. 22A with the addition of a disk-shaped basket forming a second ablation zone that is larger than the first ablation zone.

DETAILED DESCRIPTION

Figure 2A:
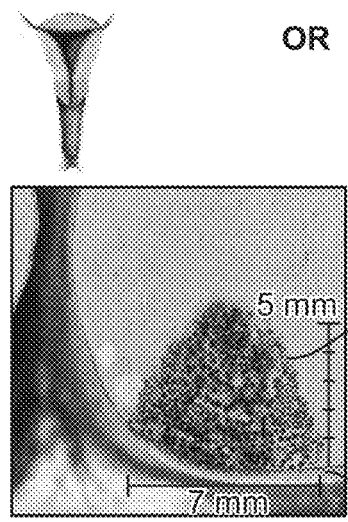
FIGS. 2A-2C illustrate Stage IB1 and Stage IB2 of cervical cancer.

Devices, systems and methods are provided for treating conditions of the reproductive tract, in some instances, conditions associated with the lining of the reproductive tract. A number of conditions can afflict the lining and cell layers deeper within the anatomical structures. For example, cervical intraepithelial neoplasia (CIN), also known as cervical dysplasia, is a condition involving abnormal growth of cells on the surface of the cervix that could potentially lead to cervical cancer in situ (CIS). Other conditions include human papillomavirus (HPV)-related cervical disease, various endometrial diseases, acute and chronic cervicitis, and various infections (e.g. trichomoniasis) to name a few. Such conditions may affect various portions of the reproductive tract, such as the vagina, cervix, endocervical canal, and uterus. Conditions particular to the uterus may include those which cause abnormal uterine bleeding such as menorrhagia or metrorrhagia. Such conditions which are non-malignant include polyps, secretory phase endometrium and endometritis. Malignant causes include simple and complex hyperplasia leading to endometrial cancers. Other causes of abnormal uterine bleeding include fibroids or leiomyomas. Devices, systems and methods described herein are particularly suitable for treating such conditions along with others.

The devices, systems and methods described herein eliminate diseased, damaged, abnormal or otherwise undesired cells leaving the tissue framework intact. This allows the tissue to regenerate in a normal fashion, avoiding the formation of scar tissue. Scarring occurs when the tissue framework is damaged or removed. In such instances, repair of the tissue framework involves introduction of the same protein (collagen) that it is replacing, however the fiber composition and organization of the protein is different than that of normal tissue. Instead of the random basket weave formation of the collagen fibers found in normal tissue, in fibrosis the collagen cross-links and forms a pronounced alignment in a single direction. This collagen scar tissue alignment is usually of inferior functional quality to the normal collagen randomized alignment. The result is scar tissue. In contrast, when the tissue framework is left intact, the framework structure repopulates with healthy cells, regenerating the normal tissue without altering the structural properties.

Such treatment which preserves the tissue framework, thereby reducing or eliminating complications such as scarring is achieved with the use of specialized energy delivery devices which deliver pulsed electric fields (PEFs) at particular parameter settings. The PEFs are delivered through at least one electrode placed on or near the targeted tissue region. These PEFs destabilize the affected cells, resulting in subsequent cell death. In some instances, this treats the condition outright. In other instances, this reduces the severity of the condition, such as in the case of downstaging cancer, which may allow the use of other treatment methods for successful elimination.

Generally, an electrode or array of electrodes is placed near or into contact with the targeted tissue, such as the lining of the reproductive tract, optionally epithelial cells EC lining the cervix C. It may be appreciated that in some embodiments the electrode(s) are positioned in contact with a conductive substance which is likewise in contact with the targeted tissue. Such solutions may include isotonic or hypertonic solutions. These solutions may further include adjuvant materials, such as chemotherapy or calcium, to further enhance the treatment effectiveness both for the focal treatment as well as potential regional infiltration regions of the targeted tissue types. In a monopolar arrangement, a dispersive electrode is positioned externally, such as on the patient's skin. High voltage, short duration biphasic electric pulses are then delivered through the electrode(s) in the vicinity of the target tissue. The induced electric field is strongest at the tissue-electrode interface and decays further away until falling below a lethal electric field threshold value which is based on secondary parameters (e.g. packet duration, packet number/packet count, frequency, and packet timing). The cells within the region of tissue where the electric field is greater than the lethal electric field threshold will die. Thus, the treatment is designed so that targeted cells (e.g. potentially aberrant/neoplastic/dysplastic cells) are killed directly or rendered more susceptible to treatment or effects from the uptake of some adjuvant material while the surrounding tissue is preserved so as to maintain its function and reduce the possibility of any adverse events or collateral morbidity.

Example Embodiment Overview

Typically, the electrode or array of electrodes that deliver the PEFs are disposed on a therapeutic energy delivery catheter configured to be advanced to the target tissue site. Access to the various portions of the reproductive tract are typically accessed through the vagina V. FIG. 3A illustrates a basic embodiment of a therapeutic energy delivery catheter 102. In this embodiment, the catheter 102 has an elongate shaft 106 with at least one energy delivery body 108 near its distal end and a handle 110 at its proximal end. The catheter 102 is connectable to a generator 104 as part of a treatment system 100. Connection of the catheter 102 to the generator 104 provides electrical energy to the energy delivery body 108, among other features. In this embodiment, the energy delivery body 108 includes a plurality of wires or ribbons 120, constrained by a proximal end constraint 122 and a distal end constraint 124, and forms a spiral-shaped basket serving as an electrode. In an alternative embodiment, the wires or ribbons are straight instead of formed into a spiral-shape (i.e., configured to form a straight-shaped basket). In still another embodiment, the energy delivery body 108 is laser cut from a tube. It may be appreciated that a variety of other designs may be used. For example, FIG. 3B illustrates an energy delivery body 108 having a paddle shape. In this embodiment, the energy delivery body 108 is comprised of a plurality of wires or ribbons 120 arranged so as to form a flat pad or paddle. Such an energy delivery body 108 is flexible so as to be retracted into the shaft 106. Referring back to FIG. 3A, in some embodiments, the energy delivery body 108 is self-expandable and delivered to a targeted area in a collapsed configuration. This collapsed configuration can be achieved, for example, by placing a sheath 126 over the energy delivery body 108. The catheter shaft 106 (within the sheath 126) terminates at the proximal end constraint 122, leaving the distal end constraint 124 essentially axially unconstrained and free to move relative to the shaft 106 of the catheter 102. Advancing the sheath 126 over the energy delivery body 108 allows the distal end constraint 124 to move forward, thereby lengthening/collapsing and constraining the energy delivery body 108.

As shown in this example, the catheter 102 includes a handle 110 at its proximal end. In some embodiments, the handle 110 is removable, such as by pressing a handle removal button 130. In this embodiment, the handle 110 includes an energy delivery body manipulation knob 132 wherein movement of the knob 132 causes expansion or retraction/collapse of the basket-shaped electrode. In this example, the handle 110 also includes a working port snap 134 for optional connection with an endoscope, hysteroscope or other type of visualization device and a cable plug-in port 136 for connection with the generator 104. It may be appreciated that a variety of types of visualization may be used. Typically, the reproductive tract is accessed with the use of a speculum and direct visualization or direct video visualization is used. In some embodiments, particularly when accessing portions of the reproductive tract that are located further from the vagina, other types of visualization may be used, including angiography (optionally including markers), computed tomography, optical coherence tomography, and ultrasound, to name a few.

In this embodiment, the therapeutic energy delivery catheter 102 is connectable with the generator 104 along with a dispersive (return) electrode 140 applied externally to the skin of the patient P. Thus, in this embodiment, monopolar energy delivery is achieved by supplying energy between the energy delivery body 108 disposed near the distal end of the catheter 102 and the return electrode 140. It will be appreciated, however, that bipolar energy delivery and other arrangements may alternatively be used. When using bipolar energy delivery, the therapeutic energy delivery catheter 102 may differ in overall design, such as to include a plurality of energy delivery bodies 108, or may appear similar in overall design, such as to include a single energy delivery body 108 which is configured to function in a bipolar manner (e.g. the energy delivery body 108 includes multiple electrodes which function in a bipolar manner). In some instances, bipolar energy delivery allows for the use of a lower voltage to achieve the treatment effect, as compared to monopolar energy delivery. In some bipolar configurations, the positive and negative poles are close enough together to provide a treatment effect both at the electrode poles and in-between the electrode poles. This can spread the treatment effect over a larger, shallower surface area thus requiring a lower voltage to achieve the treatment effect, compared to monopolar. Likewise, this lower voltage may be used to reduce the depth of penetration.

In this embodiment, the generator 104 includes a user interface 150, one or more energy delivery algorithms 152, a processor 154, a data storage/retrieval unit 156 (such as a memory and/or database), and an energy-storage sub-system 158 which generates and stores the energy to be delivered. In some embodiments, one or more capacitors are used for energy storage/delivery, however any other suitable energy storage element may be used. In addition, one or more communication ports are included.

In some embodiments, the generator 104 includes three sub-systems: 1) a high-energy storage system, 2) a high-voltage, medium-frequency switching amplifier, and 3) the system controller, firmware, and user interface. Although unlikely to be needed when treating the reproductive tract, in some embodiments the system controller includes a cardiac synchronization trigger monitor that allows for synchronizing the pulsed energy output to the patient's cardiac rhythm. The generator takes in alternating current (AC) mains to power multiple direct current (DC) power supplies. The generator's controller can cause the DC power supplies to charge a high-energy capacitor storage bank before energy delivery is initiated. At the initiation of therapeutic energy delivery, the generator's controller, high-energy storage banks and a bi-phasic pulse amplifier can operate simultaneously to create a high-voltage, medium frequency output.

It will be appreciated that a multitude of generator electrical architectures may be employed to execute the energy delivery algorithms. In particular, in some embodiments, advanced switching systems are used which are capable of directing the pulsed electric field circuit to the energy delivering electrodes separately from the same energy storage and high voltage delivery system. Further, generators employed in advanced energy delivery algorithms employing rapidly varying pulse parameters (e.g., voltage, frequency, etc.) or multiple energy delivery electrodes may utilize modular energy storage and/or high voltage systems, facilitating highly customizable waveform and geographical pulse delivery paradigms. It should further be appreciated that the electrical architecture described herein above is for example only, and systems delivering pulsed electric fields may or may not include additional switching amplifier components.

The user interface 150 can include a touch screen and/or more traditional buttons to allow for the operator to enter patient data, select a treatment algorithm (e.g., energy delivery algorithm 152), initiate energy delivery, view records stored on the storage/retrieval unit 156, and/or otherwise communicate with the generator 104.

In some embodiments, the user interface 150 is configured to receive operator-defined inputs. The operator-defined inputs can include a duration of energy delivery, one or more other timing aspects of the energy delivery pulse, power, and/or mode of operation, or a combination thereof. Example modes of operation can include (but are not limited to): system initiation and self-test, operator input, algorithm selection, pre-treatment system status and feedback, energy delivery, post energy delivery display or feedback, treatment data review and/or download, software update, or any combination or subcombination thereof.

Since the reproductive system is a considerable distance away from the heart, treatment of the reproductive system is unlikely to require cardiac synchronization. However, in some embodiments the system 100 also includes a mechanism for acquiring an electrocardiogram (ECG), such as an external cardiac monitor 170, in situations wherein cardiac synchronization is desired. Example cardiac monitors are available from AccuSync Medical Research Corporation. In some embodiments, the external cardiac monitor 170 is operatively connected to the generator 104. The cardiac monitor 170 can be used to continuously acquire an ECG signal. External electrodes 172 may be applied to the patient P to acquire the ECG. The generator 104 analyzes one or more cardiac cycles and identifies the beginning of a time period during which it is safe to apply energy to the patient P, thus providing the ability to synchronize energy delivery with the cardiac cycle. In some embodiments, this time period is within milliseconds of the R wave (of the ECG QRS complex) to avoid induction of an arrhythmia, which could occur if the energy pulse is delivered on a T wave. It will be appreciated that such cardiac synchronization is typically utilized when using monopolar energy delivery, however it may be utilized as part of other energy delivery methods.

In some embodiments, the processor 154, among other activities, modifies and/or switches between the energy-delivery algorithms, monitors the energy delivery and any sensor data, and reacts to monitored data via a feedback loop. In some embodiments, the processor 154 is configured to execute one or more algorithms for running a feedback control loop based on one or more measured system parameters (e.g., current), one or more measured tissue parameters (e.g., impedance), and/or a combination thereof.

The data storage/retrieval unit 156 stores data, such as related to the treatments delivered, and can optionally be downloaded by connecting a device (e.g., a laptop or thumb drive) to a communication port. In some embodiments, the device has local software used to direct the download of information, such as, for example, instructions stored on the data storage/retrieval unit 156 and executable by the processor 154. In some embodiments, the user interface 150 allows for the operator to select to download data to a device and/or system such as, but not limited to, a computer device, a tablet, a mobile device, a server, a workstation, a cloud computing apparatus/system, and/or the like. The communication ports, which can permit wired and/or wireless connectivity, can allow for data download, as just described but also for data upload such as uploading a custom algorithm or providing a software update.

As described herein, a variety of energy delivery algorithms 152 are programmable, or can be pre-programmed, into the generator 104, such as stored in memory or data storage/retrieval unit 156. Alternatively, energy delivery algorithms can be added into the data storage/retrieval unit to be executed by processor 154. Each of these algorithms 152 may be executed by the processor 154. In some embodiments, the catheter 102 includes one or more sensors 160 that can be used to determine temperature, impedance, resistance, capacitance, conductivity, permittivity, and/or conductance, to name a few. Sensor data can be used to plan the therapy, monitor the therapy and/or provide direct feedback via the processor 154, which can then alter the energy-delivery algorithm 152. For example, impedance measurements can be used to determine not only the initial dose to be applied but can also be used to determine the need for further treatment, or not.

It will be appreciated that the system 100 can include an automated treatment delivery algorithm that could dynamically respond and adjust and/or terminate treatment in response to inputs such as temperature, impedance at various voltages or AC frequencies, treatment duration or other timing aspects of the energy delivery pulse, treatment power and/or system status.

In some embodiments, imaging is achieved with the use of a commercially-available system, such as an endoscope or hysteroscope connected with a separate imaging screen 180, as illustrated in FIG. 3. It will be appreciated that imaging modalities can be incorporated into the catheter 102 or used alongside or in conjunction with the catheter 102. The imaging modality can be mechanically, operatively, and/or communicatively coupled to the catheter 102 using any suitable mechanism.

As mentioned previously, one or more energy delivery algorithms 152 are programmable, or can be pre-programmed, into the generator 104 for delivery to the patient P. The one or more energy delivery algorithms 152 specify electric signals which provide energy delivered to the walls of the reproductive tract which are non-thermal (e.g. below a threshold for thermal ablation; below a threshold for inducing coagulative thermal damage), reducing or avoiding inflammation, and/or preventing denaturation of stromal proteins in the luminal structures. In general, the algorithm 152 is tailored to affect tissue to a pre-determined depth or volume and/or to target specific types of cellular responses to the energy delivered.

Figure 4A:
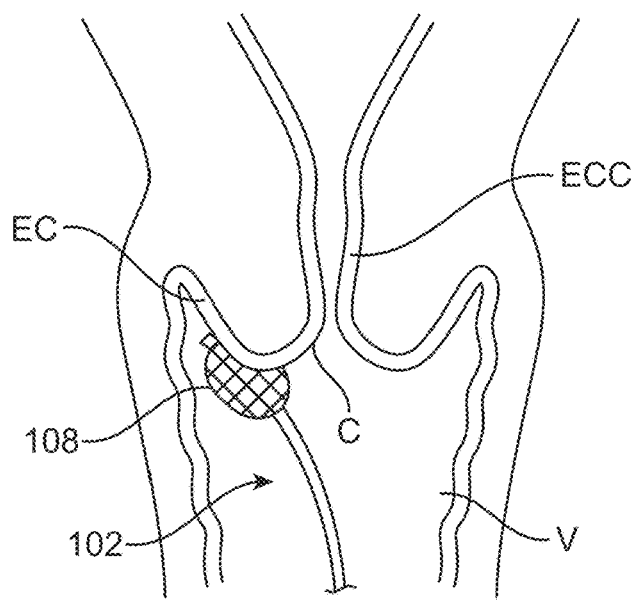
FIGS. 4A-4B illustrate an embodiment of a therapeutic energy delivery catheter delivering energy to a surface of the cervix.
Figure 4B:
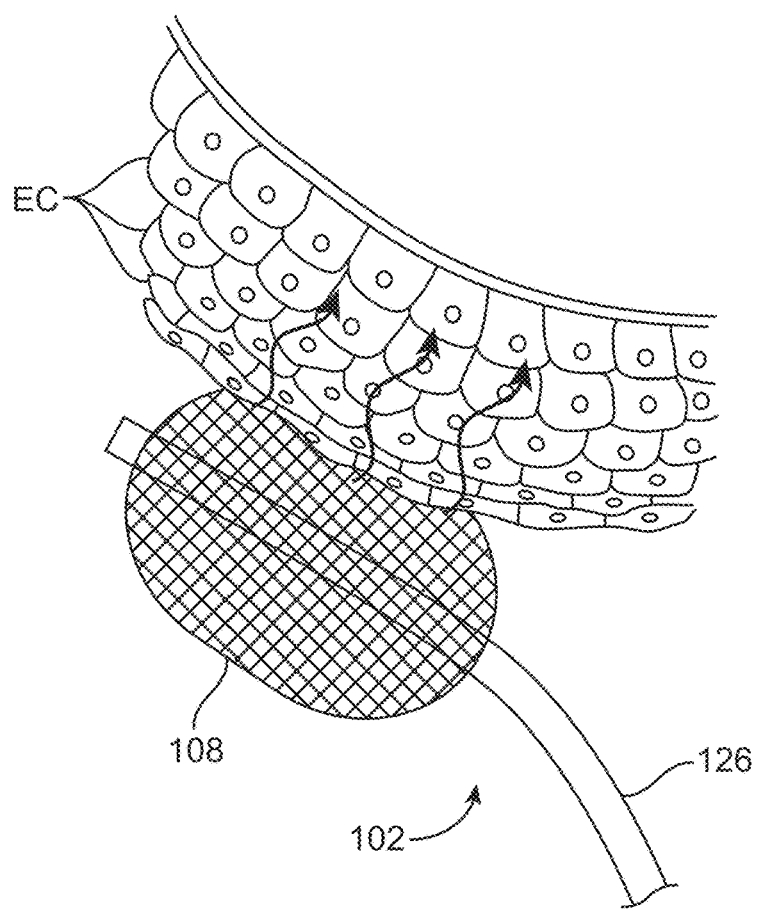

FIGS. 4A-4B illustrate an embodiment of a therapeutic energy delivery catheter 102 delivering energy to a surface of the cervix C. FIG. 4A shows the catheter 102 advanced into the vagina V and positioned such that the energy delivery body 108 is near or against a portion of the cervix C. FIG. 4B provides a close-up view of FIG. 4A wherein the energy delivery body 108 is shown positioned against the epithelial cells EC lining the cervix C. It may be appreciated that epithelial cells EC along the ectocervix (the portion of the cervix C outside of the endocervical canal ECC) are comprised of squamous cells. Such squamous cells transition into glandular cells near or within the endocervical canal wherein soft, columnar glandular cells line the endocervix. Thus, in this example, the energy delivery body 108 is positioned against squamous cells of the ectocervix. Energy is delivered to the squamous cells as indicated by the wavy arrows. It may be appreciated that depth and/or cell targeting may be affected by parameters of the energy signal prescribed by the one or more energy delivery algorithms 152, the design of the catheter 102 (particularly the one or more energy delivery bodies 108), and/or the choice of monopolar or bipolar energy delivery.

In some embodiments, the energy penetrates up to various depths within the layer of epithelial cells EC (e.g. up to 1 mm, up to 2 mm), such as to treat CIN. This destroys the abnormal epithelial cells EC without affecting cells beyond the epithelial cell layer. In other embodiments, the energy penetrates beyond the layer of epithelial cells EC (e.g. up to 1 cm), such as to treat CIS. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

In some embodiments, depths of penetration of up to 0.01 cm, up to 0.02 cm, 0.01-0.02 cm, up to 0.03 cm, 0.03-0.05 cm, up to 0.05 cm, up to 0.08 cm, up to 0.09 cm, up to 0.1 cm, up to 0.2 cm, up to 0.5 cm, up to 0.7 cm, up to 1.0 cm, up to 1.5 cm, up to 2.0 cm, up to 2.5 cm, up to 3.0 cm, up to 3.5 cm, up to 4.0 cm, up to 4.5 cm, or up to 5.0 cm, to name a few, may be achieved. It may be appreciated that in some embodiments, energy is delivered to target tissue from within the luminal wall rather than from a surface of the luminal wall. This may be achieved with a variety of devices, such as including needle electrodes. This may be particularly useful when treating tumors or fibroids. Fibroids can vary widely in size. Typically fibroids are at least 0.5 cm in diameter when diagnosed and can range in size of up to 20 cm in diameter or more. Thus, fibroids may be treated with a single treatment or multiple overlapping treatments. Volumetric treatment areas may be, for example, 0.05 cm$^3$ to 4000 cm$^3$ or more.

As mentioned, the therapeutic energy is generally characterized by high voltage pulses which allow for removal of target tissue with little or no destruction of critical anatomy, such as tissue-level architectural proteins among extracellular matrices. This prevents dangerous collateral effects, such as stenosis (e.g. when treating the endocervical canal), thrombus formation or fistulization, to name a few, and also allows for regeneration of healthy new luminal tissue within days of the procedure. The treatment may use pulsed electric field electric current flows that are 1) distributed circumferentially or 2) focally directed. Examples of systems which provide similar types of therapeutic treatment include the pulmonary tissue modification systems (e.g., energy delivery catheter systems) described in commonly assigned patent applications including international patent application number PCT/US2017/039527 titled "GENERATOR AND A CATHETER WITH AN ELECTRODE AND A METHOD FOR TREATING A LUNG PASSAGEWAY," which claims priority to U.S. provisional application Nos. 62/355,164 and 62/489,753, international patent application number PCT/US2018/067501 titled "METHODS, APPARATUSES, AND SYSTEMS FOR THE TREATMENT OF DISORDERS" which claims priority to U.S. Provisional Application No. 62/610,430, and international patent application number PCT/US2018/067504 titled "OPTIMIZATION OF ENERGY DELIVERY FOR VARIOUS APPLICATIONS" which claims priority to Provisional Patent Application No. 62/610,430 filed Dec. 26, 2017 and U.S. Provisional Patent Application No. 62/693,622 filed Jul. 3, 2018, all of which are incorporated herein by reference for all purposes.

Energy Delivery Algorithms

It may be appreciated that a variety of energy delivery algorithms 152 may be used. In some embodiments, the algorithm 152 prescribes a signal having a waveform comprising a series of energy packets wherein each energy packet comprises a series of high voltage pulses. In such embodiments, the algorithm 152 specifies parameters of the signal such as energy amplitude (e.g., voltage) and duration of applied energy, which is comprised of the number of packets, number of pulses within a packet, and the fundamental frequency of the pulse sequence, to name a few. Additional parameters may include switch time between polarities in biphasic pulses, dead time between biphasic cycles, and rest time between packets, which will be described in more detail in later sections. There may be a fixed rest period between packets, or packets may be gated to the cardiac cycle and are thus variable with the patient's heart rate. There may be a deliberate, varying rest period algorithm or no rest period may also be applied between packets. A feedback loop based on sensor information and an auto-shutoff specification, and/or the like, may be included.

Figure 5A:
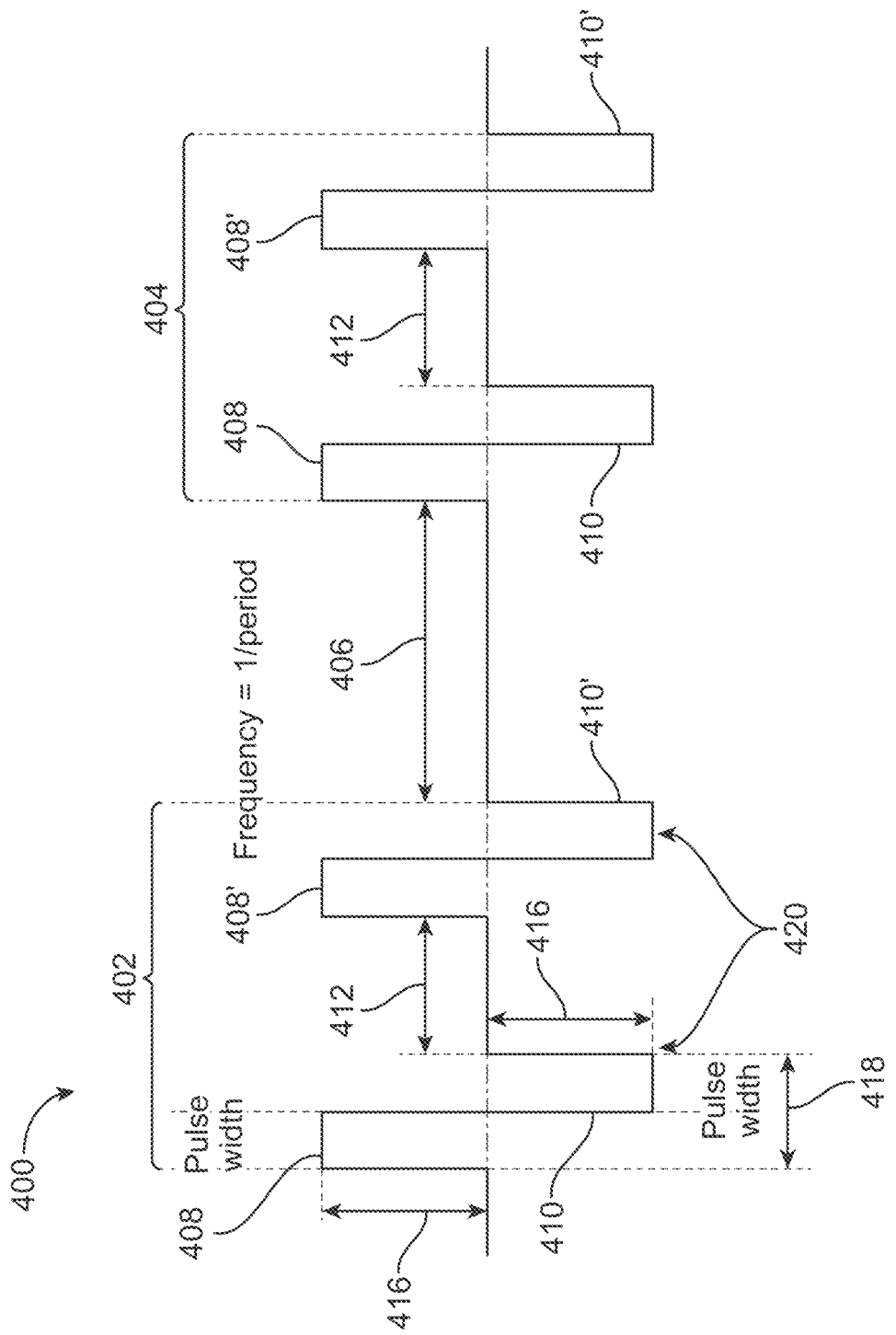
FIG. 5A illustrates an embodiment of a waveform of a signal prescribed by an energy delivery algorithm.

FIG. 5A illustrates an embodiment of a waveform 400 of a signal prescribed by an energy delivery algorithm 152. Here, two packets are shown, a first packet 402 and a second packet 404, wherein the packets 402, 404 are separated by a rest period 406. In this embodiment, each packet 402, 404 is comprised of a first biphasic cycle (comprising a first positive pulse peak 408 and a first negative pulse peak 410) and a second biphasic cycle (comprising a second positive pulse peak 408' and a second negative pulse peak 410'). The first and second biphasic pulses are separated by dead time 412 (i.e. a pause) between each pulse. In this embodiment, the biphasic pulses are symmetric so that the set voltage 416 is the same for the positive and negative peaks. Here, the biphasic, symmetric waves are also square waves such that the magnitude and time of the positive voltage wave is approximately equal to the magnitude and time of the negative voltage wave. When using a bipolar configuration, portions of the lumen cells facing the negative voltage wave undergo cellular depolarization in these regions, where a normally negatively charged cell membrane region briefly turns positive. Conversely, portions of the lumen cells facing the positive voltage wave undergo hyperpolarization in which the cell membrane region's electric potential becomes extremely negative. It may be appreciated that in each positive or negative phase of the biphasic pulse, portions of the lumen cells will experience the opposite effects. For example, portions of cell membranes facing the negative voltage will experience depolarization, while the portions 180° to this portion will experience hyperpolarization. In some embodiments, the hyperpolarized portion faces the dispersive or return electrode 140.

A. Voltage

The voltages used and considered may be the tops of square-waveforms, may be the peaks in sinusoidal or sawtooth waveforms, or may be the RMS voltage of sinusoidal or sawtooth waveforms. In some embodiments, the energy is delivered in a monopolar fashion and each high voltage pulse or the set voltage 416 is between about 500 V to 10,000 V, particularly about 500 V to 2500 V, 2500 V to 3000 V, 500 V to 3500 V, 3500 V to 4000 V, about 3500 V to 5000 V, about 3500 V to 6000 V, including all values and subranges in between including about 1500 V, 2000 V, 2500 V, 3000 V, 3500 V, 4000 V, 4500 V, 5000 V, 5500 V, 6000 V to name a few.

It may be appreciated that the set voltage 416 may vary depending on whether the energy is delivered in a monopolar or bipolar fashion. In bipolar delivery, a lower voltage may be used due to the smaller, more directed electric field. The bipolar voltage selected for use in therapy is dependent on the separation distance of the electrodes, whereas the monopolar electrode configurations that use one or more distant dispersive pad electrodes may be delivered with less consideration for exact placement of the catheter electrode and dispersive electrode placed on the body. In monopolar electrode embodiments, larger voltages are typically used due to the dispersive behavior of the delivered energy through the body to reach the dispersive electrode, on the order of 10 cm to 100 cm effective separation distance. Conversely, in bipolar electrode configurations, the relatively close active regions of the electrodes, on the order of 0.5 mm to 10 cm, including 1 mm to 1 cm, results in a greater influence on electrical energy concentration and effective dose delivered to the tissue from the separation distance. For instance, if the targeted voltage-to-distance ratio is 3000 V/cm to evoke the desired clinical effect at the appropriate tissue depth (1.3 mm), if the separation distance is changed from 1 mm to 1.2 mm, this would result in an increase in treatment voltage from 300 to about 360 V, a change of 20%.

In some embodiments, the energy is delivered in a bipolar fashion and voltage-to distance ratios are utilized. Voltage may vary to attain the same voltage-distance ratio based on the separation distance of individual poles in the bipolar arrangement. Example, voltage-to-distance ratios in bipolar arrangements include 200 V/cm, 250 V/cm, 500 V/cm, 500-3000 V/cm, 1000 V/cm, 1500 V/cm, 250-1500 V/cm, 2000 V/cm, 2500V/cm, 3000 V/cm, to name a few.

B. Frequency

It may be appreciated that the number of biphasic cycles per second of time is the frequency when a signal is continuous. In some embodiments, biphasic pulses are utilized, such as to reduce undesired muscle stimulation. In other embodiments, the pulse waveform is monophasic and there is no clear inherent frequency. Instead, a fundamental frequency may be considered by doubling the monophasic pulse length to derive the frequency.

In some embodiments, the signal has a frequency in the range 100 kHz-1 MHz, more particularly 100 kHz-1000 kHz. Typically, frequencies are selected based on the targeted depth, disease type. In some embodiments, the signal has a frequency in the range of approximately 100-800 kHz which typically penetrates the lumen wall W up to 10 mm depending on the combined parameters. Example fundamental frequencies when using monopolar, biphasic waveforms typically include, 300 kHz, 400 kHz, 500 kHz, 300-600 kHz, 400-800 kHz, 500-800 kHz, 550 kHz, 600 kHz, 650 kHz, 700 kHz, 750 kHz, 300-800 kHz, and 800 kHz including all subranges. It may be appreciated that at some voltages, frequencies at or below 100-250 kHz may cause undesired muscle stimulation. It may be appreciated that higher frequencies may be used with components which minimize signal artifacts.

C. Voltage-Frequency Balancing

The frequency of the waveform delivered may vary relative to the treatment voltage in synchrony to retain adequate treatment effect. Such synergistic changes would include the decrease in frequency, which evokes a stronger effect, combined with a decrease in voltage, which evokes a weaker effect. For instance, in some cases the treatment may be delivered using 3000 V in a monopolar fashion with a waveform frequency of 800 kHz, while in other cases the treatment may be delivered using 2000 V with a waveform frequency of 400 kHz.

When used in opposing directions, the treatment parameters may be manipulated in a way that makes it too effective, which may increase muscle contraction likelihood or risk effects to undesirable tissues, such as cartilage for airway treatments. For instance, if the frequency is increased and the voltage is decreased, such as the use of 2000 V at 800 kHz, the treatment may not have sufficient clinical therapeutic benefit. Opposingly, if the voltage was increased to 3000 V and frequency decreased to 400 kHz, there may be undesirable treatment effect extent to collateral sensitive tissues. In some cases, the over-treatment of these undesired tissues could result in morbidity or safety concerns for the patient, such as destruction of cartilaginous tissue in the airways sufficient to cause airway collapse, or destruction of smooth muscle in the GI tract sufficient to cause interruption of normal peristaltic motion. In other cases, the overtreatment of the untargeted or undesirable tissues may have benign clinical outcomes and not affect patient response or morbidity if they are overtreated.

D. Packets

As mentioned, the algorithm 152 prescribes a signal having a waveform comprising a series of energy packets wherein each energy packet comprises a series of high voltage pulses. The cycle count 420 is half the number of pulses within each biphasic packet. Referring to FIG. 5A, the first packet 402 has a cycle count 420 of two (i.e. four biphasic pulses). In some embodiments, the cycle count 420 is set between 1 and 100 per packet, including all values and subranges in between. In some embodiments, the cycle count 420 is up to 5 pulses, up to 10 pulses, up to 25 pulses, up to 40 pulses, up to 60 pulses, up to 80 pulses, up to 100 pulses, up to 1,000 pulses or up to 2,000 pulses, including all values and subranges in between.

The packet duration is determined by the cycle count and frequency, among other factors. When other variables are held constant, the higher the cycle count, the longer the packet duration and the larger the quantity of energy delivered. In some embodiments, packet durations are in the range of approximately 20 to 1000 microseconds, such as 20 µs, 30 µs, 40 µs, 50 µs, 50 µs-250 µs, 60 µs, 70 µs, 80 µs, 90 µs, 100 µs, 125 µs, 150 µs, 175 µs, 200 µs, 250 µs, 100 to 250 µs, 150 to 250 µs, 200 to 250 µs, 500 to 1000 µs to name a few. In other embodiments, the packet durations are in the range of approximately 100 to 1000 microseconds, such as 150 µs, 200 µs, 250 µs, 500 µs, or 1000 µs. In other embodiments, the packet durations are in the range of approximately 2 ms, 3 ms, 5 ms, or 10 ms.

The number of packets delivered during treatment, or packet count, may include 1 packet, 2 packets, 3 packets, 4 packets, 5 packets, 10 packets, 15 packets, 20 packets, 25 packets, 30 packets, 40 packets, 1 to 5 packets, 1 to 10 packets, 1 to 15 packets, 1 to 20 packets, 1 to 100 packets, or 1 to 1,000 packets, including all values and subranges in between. In some embodiments, when using a monopolar arrangement with a biphasic waveform, 1-15 packets are delivered, wherein each packet has a packet duration of 100 µs, a set voltage of 2500 V and a fundamental frequency of 600 kHz. This may reach a target depth of 0.1-1 mm. Increasing the packet count to 15-40 may increase the target depth to 1-2 mm. Likewise, increasing the packet count to 40-100 and using a set voltage of 3000 V with a fundamental frequency of 500 kHz along with the packet duration of 100

μs may increase the target depth to 2-5 mm. Further, utilizing a packet count of 20-200 and using a set voltage of 4000 V with a frequency of 400 along with a packet duration of 200 μs may increase the target depth to 5-10 mm. In some embodiments, when using a bipolar arrangement with a biphasic waveform, 1-100 packets are delivered, wherein each packet has a packet duration of 100 μs, and a voltage-to-distance ratio of 2000 V/cm and a fundamental frequency of 600 kHz are utilized. This may reach a target depth of 0.1-1 mm. Increasing the packet count to 40-100 wherein each packet has a packet duration of 100 μs, with a voltage-to-distance ratio of 2500 V/cm and a fundamental frequency of 500 kHz may increase the target depth to 2-5 mm.

E. Rest Period

In some embodiments, the time between packets, referred to as the rest period 406, is set between about 0.1 seconds and about 5 seconds, including all values and subranges in between. In other embodiments, the rest period 406 ranges from about 0.001 seconds to about 10 seconds, including all values and subranges in between. In some embodiments, the rest period 406 is approximately 1 second.

F. Switch Time and Dead Time

Figure 2B:
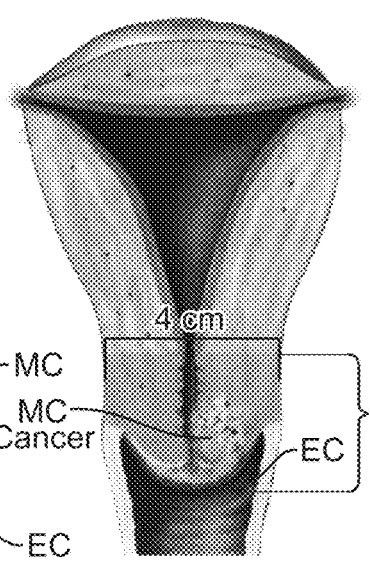
Figure 2C:
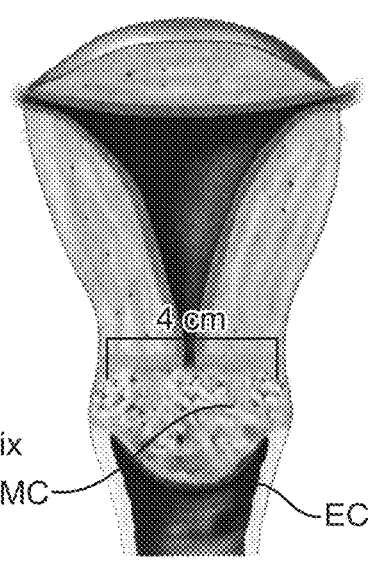
Figure 5B:
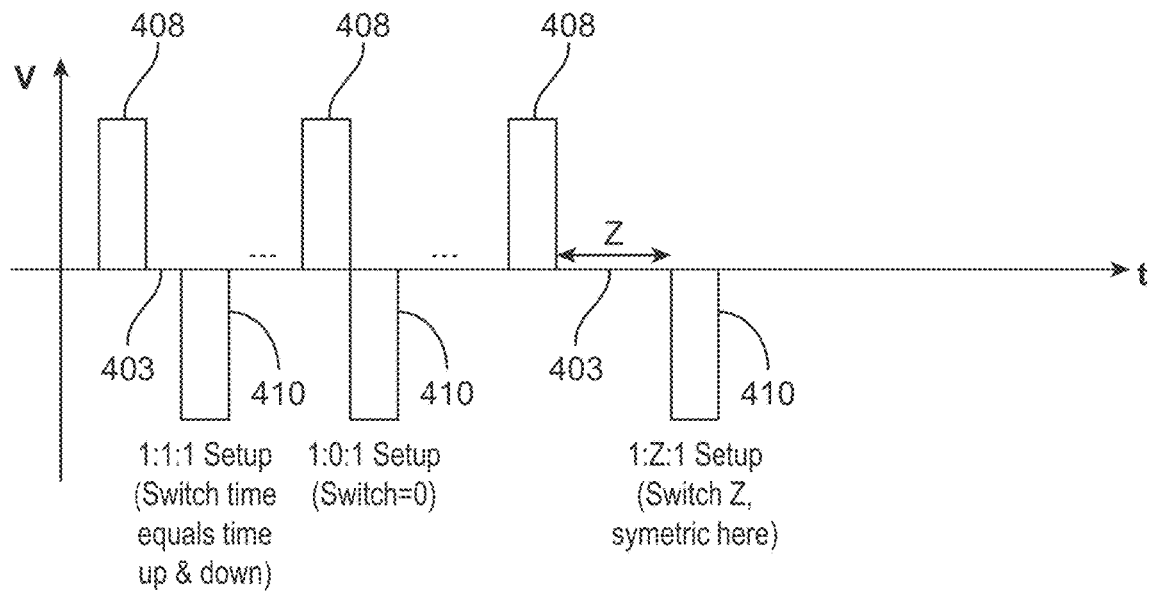
FIG. 5B illustrates various examples of biphasic pulses having a switch time therebetween.
Figure 5C:
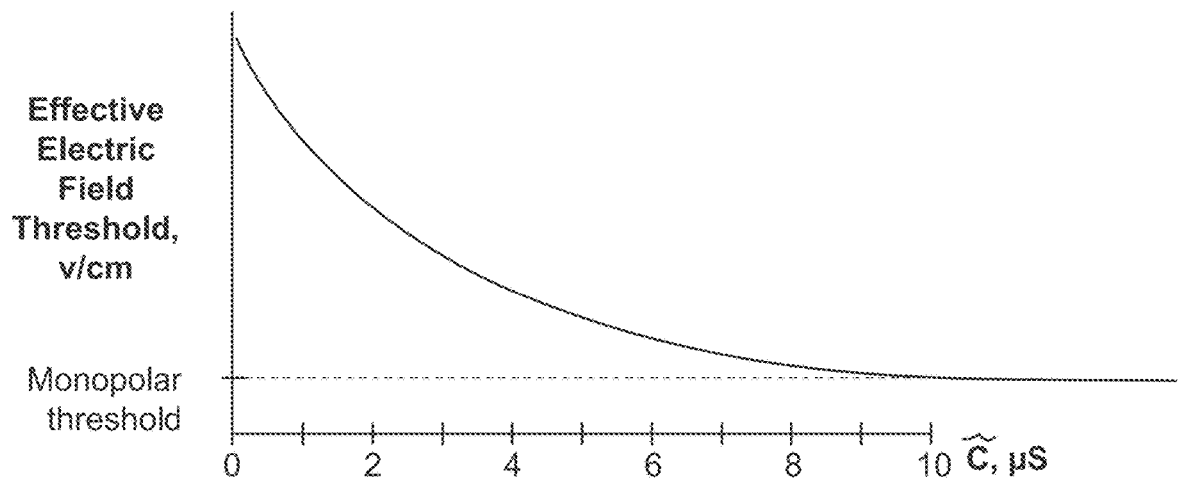
FIG. 5C illustrates the relationship between effective electric field threshold and pulse length

A switch time is a delay or period of no energy that is delivered between the positive and negative peaks of a biphasic pulse, as illustrated in FIGS. 2B-2C. FIG. 5B illustrates various examples of biphasic pulses (comprising a positive peak 408 and a negative peak 410) having a switch time 403 therebetween (however when the switch time 403 is zero, it does not appear). In some embodiments, the switch time ranges between about 0 to about 1 microsecond, including all values and subranges in between. In other embodiments, the switch time ranges between 1 and 20 microseconds, including all values and subranges in between. In other embodiments, the switch time ranges between about 2 to about 8 microsecond, including all values and subranges in between. FIG. 5C illustrates the relationship between effective electric field threshold and switch time.

Delays may also be interjected between each cycle of the biphasic pulses, referred as "dead-time". Dead time occurs within a packet, but between biphasic pulses. This is in contrast to rest periods which occur between packets. In other embodiments, the dead time 412 is in a range of approximately 0 to 0.5 microseconds, 0 to 10 microseconds, 2 to 5 microseconds, 0 to 20 microseconds, about 0 to about 100 microseconds, or about 0 to about 100 milliseconds, including all values and subranges in between. In some embodiments, the dead time 412 is in the range of 0.2 to 0.3 microseconds. Dead time may also be used to define a period between separate, monophasic, pulses within a packet.

Delays, such as switch times and dead times, are introduced to a packet to reduce the effects of biphasic cancellation within the waveform. Biphasic cancellation is a term used to refer to the reduced induction of cellular modulation in response to biphasic waveforms versus monophasic waveforms, particularly when switch times and dead times are small, such as below 10 μs. One explanation for this phenomenon is provided here, though it may be appreciated that there are likely other biological, physical, or electrical characteristics or alterations that result in the reduced modulation from biphasic waveforms. When cells are exposed to the electromotive force induced by the electric field presence, there is electrokinetic movement of ions and solutes within the intracellular and extracellular fluids. These charges accumulate at dielectric boundaries such as cell and organelle membranes, altering the resting transmembrane potentials (TMPs). When the electric field is removed, the driving force that generated the manipulated TMPs is also eliminated, and the normal biotransport and ionic kinetics operating with concentration gradients begin to restore normative distributions of the solutes. This induces a logarithmic decay of the manipulated TMP on the membranes. However, if rather than eliminating the electric field, the electric field polarity is retained but with a reversed polarity, then there is a new electromotive force actively eliminating the existing TMP that was induced, followed by the accumulation of a TMP in the opposite polarity. This active depletion of the initially manipulated TMP considerably restricts the downstream effects cascade that may occur to the cell, weakening the treatment effect from the initial electric field exposure. Further, where the subsequent electric field with reversed polarity must first "undo" the original TMP manipulation generated, and then begin accumulating its own TMP in the opposite polarity; the final TMP reached by the second phase of the electric field is not as strong as the original TMP, assuming identical durations of each phase of the cycle. This reduces the treatment effects generated from each phase of the waveform resulting in a lower treatment effect than that generated by either pulse in the cycle would achieve alone. This phenomenon is referred as biphasic cancellation. For packets with many cycles, this pattern is repeated over the entire set of cycles and phase changes within the cycles for the packet. This dramatically limits the effect from the treatment. When cell behavior is modulated as a result of the pulsed electric fields by mechanisms other than purely transmembrane potential manipulation, it may be appreciated that the effects of biphasic cancellation are less pronounced, and thus the influence of switch times and dead times on treatment outcome are reduced.

Thus, in some embodiments, the influence of biphasic cancellation is reduced by introducing switch time delays and dead time. In some instances, the switch time and dead time are both increased together to strengthen the effect. In other instances, only switch time or only dead time are increased to induce this effect.

It may be appreciated that typically appropriate timing is for the relaxation of the TMP to complete after 5× the charging time-constant, τ. For most cells, the time constant may be approximated as 1 μs. Thus, in some embodiments the switch time and the dead time are both set to at least 5 μs to eliminate biphasic cancellation. In other embodiments, the reduction in biphasic cancellation may not require complete cell relaxation prior to reversing the polarity, and thus the switch time and the dead time are both set at 0.5 μs to 2 μs. In other embodiments, the switch time and the dead time are set to be the same length as the individual pulse lengths, since further increases in these delays may only offer diminishing returns in terms of increased treatment effect and the collateral increase in muscle contraction. In this way, the combination of longer-scale pulse durations (>500 ns) and stacked pulse cycles with substantial switch time and dead time delays, it is possible to use biphasic waveforms without the considerably reduced treatment effect that occurs due to biphasic cancellation. In some cases, the tuning of these parameters may be performed to evoke stronger treatment effects without a comparably proportional increase in muscle contraction. For example, using 600 kHz waveform with switch time=dead time=1.66 us (2× the duration as the pulses), may be used to retain the reduction in muscle contraction versus monophasic pulse waveforms, but with the retention of stronger treatment effects.

In some embodiments, the switch time duration is adjusted such that the degree of therapy effect relative to distant cell effects is optimized for the target of the therapy. In some embodiments, the switch time duration or dead time duration is minimized to decrease distant muscle cell contractions, with lesser local therapy effect. In other embodiments, the switch time duration is extended to increase the local therapy effect, with potential additional distant muscle cell contractions. In some embodiments, the switch time or dead time duration are extended to increase the local therapy effect, and the use of neuromuscular paralytics are employed to control the resulting increase in muscle contraction. In some embodiments, switch time duration is 10 ns to 2 μs, while in other embodiments, the switch time duration is 2 μs to 20 μs. In some instances, when cell modulation is targeted in a way where transmembrane potential manipulation is not the primary mechanism needed to evoke the targeted treatment effects, the switch time and dead time delays are minimized to less than 0.1 μs or to 0 μs. This elimination of delays minimizes the peripheral, non-targeted treatment effects such as skeletal muscle or smooth muscle contraction.

Another benefit of utilizing switch time and the dead time delays to increase treatment effects for biphasic waveforms is a reduction in generator demands, whereby the introduction of pauses will enable stronger treatment effects without requiring asymmetric/unbalanced pulse waveforms. In this case, unbalanced waveforms are described as those that are monophasic, or have an unbalanced duration or voltage or combination in one polarity relative to the other. In some cases, unbalanced means that the integral of the positive portions of the waveform are not equal to the integral of the negative portions of the waveform. Generators capable of delivering unbalanced waveforms have a separate set of design considerations that are accounted for thereby increasing potential generator complexity.

G. Waveforms

Figure 5E:
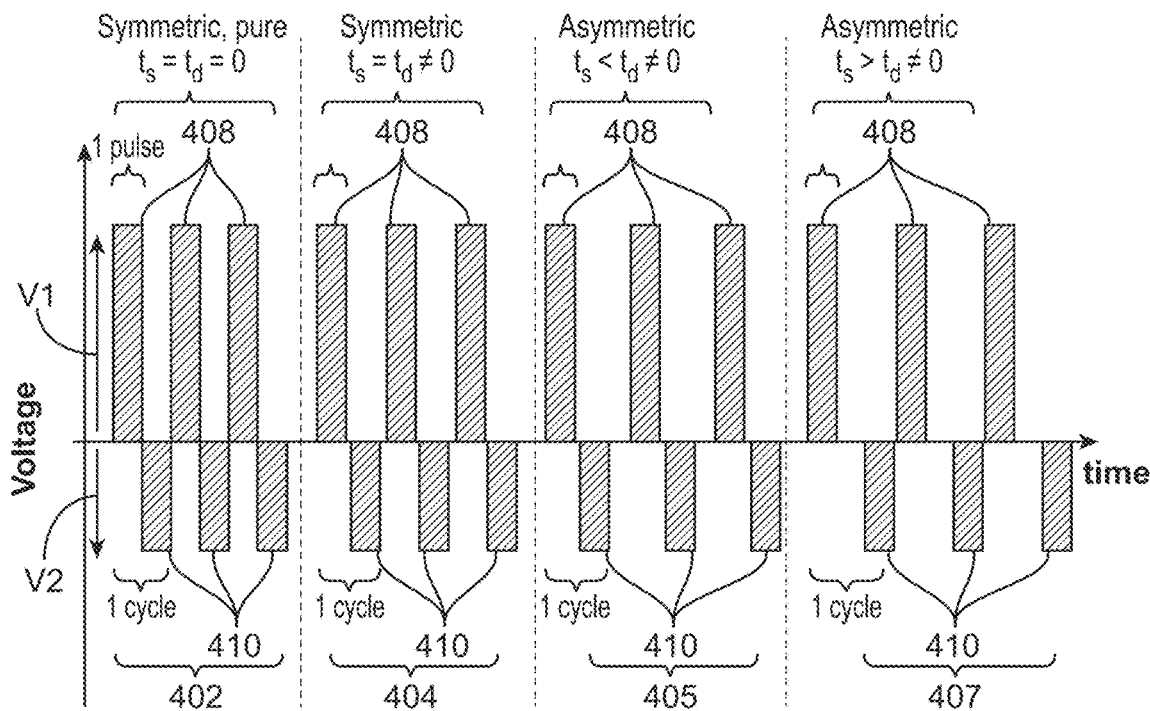
FIG. 5E illustrates further examples of waveforms having unequal voltages.

FIG. 5A illustrates an embodiment of a waveform 400 having symmetric pulses such that the voltage and duration of pulse in one direction (i.e., positive or negative) is equal to the voltage and duration of pulse in the other direction. FIG. 5D illustrates an example waveform 400 prescribed by another energy delivery algorithm 152 wherein the waveform 400 has voltage imbalance. Here, two packets are shown, a first packet 402 and a second packet 404, wherein the packets 402, 404 are separated by a rest period 406. In this embodiment, each packet 402, 404 is comprised of a first biphasic cycle (comprising a first positive pulse peak 408 having a first voltage V1 and a first negative pulse peak 410 having a second voltage V2) and a second biphasic cycle (comprising a second positive pulse peak 408' having first voltage V1 and a second negative pulse peak 410' having a second voltage V2). Here the first voltage V1 is greater than the second voltage V2. The first and second biphasic cycles are separated by dead time 412 between each pulse. Thus, the voltage in one direction (i.e., positive or negative) is greater than the voltage in the other direction so that the area under the positive portion of the curve does not equal the area under the negative portion of the curve. This unbalanced waveform may result in a more pronounced treatment effect as the dominant positive or negative amplitude leads to a longer duration of same charge cell membrane charge potential. In this embodiment, the first positive peak 408 has a set voltage 416 (V1) that is larger than the set voltage 416' (V2) of the first negative peak 410. FIG. 5E illustrates further examples of waveforms having unequal voltages. Here, four different types of packets are shown in a single diagram for condensed illustration. The first packet 402 is comprised of pulses having unequal voltages but equal pulse widths, along with no switch times and dead times. Thus, the first packet 402 is comprised of four biphasic pulses, each comprising a positive peak 408 having a first voltage V1 and a negative peak 410 having a second voltage V2). Here the first voltage V1 is greater than the second voltage V2. The second packet 404 is comprised of pulses having unequal voltages but symmetric pulse widths (as in the first pulse 402), with switch times equal to dead times. The third packet 405 is comprised of pulses having unequal voltages but symmetric pulse widths (as in the first pulse 402), with switch times that are shorter than dead times. The fourth packet 407 is comprised of pulses having unequal voltages but symmetric pulse widths (as in the first pulse 402), with switch times that are greater than dead times. It may be appreciated that in some embodiments, the positive and negative phases of biphasic waveform are not identical, but are balanced, where the voltage in one direction (i.e., positive or negative), is greater than the voltage in the other direction but the length of the pulse is calculated such that the area under the curve of the positive phase equals the area under the curve of the negative phase.

In some embodiments, imbalance includes pulses having pulse widths of unequal duration. In some embodiments, the biphasic waveform is unbalanced, such that the voltage in one direction is equal to the voltage in the other direction, but the duration of one direction (i.e., positive or negative) is greater than the duration of the other direction, so that the area under the curve of the positive portion of the waveform does not equal the area under the negative portion of the waveform.

Figure 5F:
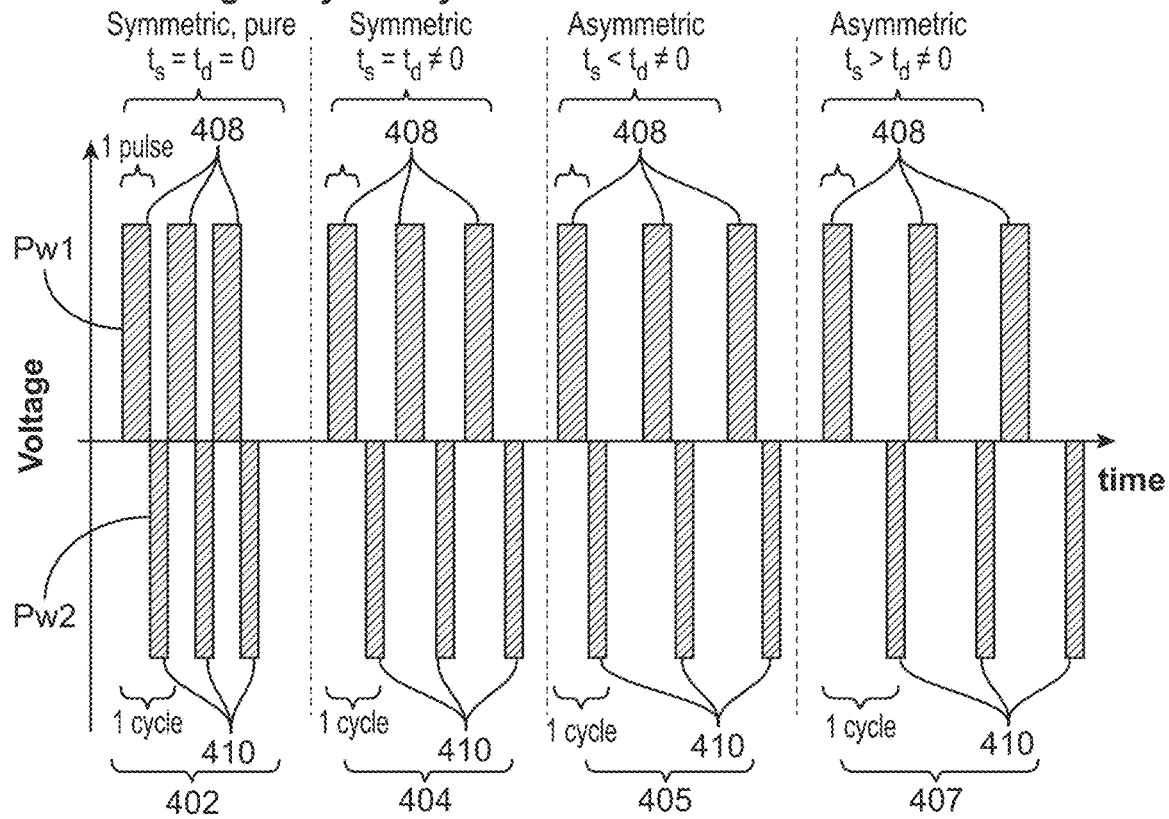
FIG. 5F illustrates further examples of waveforms having unequal pulse widths.

FIG. 5F illustrates further examples of waveforms having unequal pulse widths. Here, four different types of packets are shown in a single diagram for condensed illustration. The first packet 402 is comprised of pulses having equal voltages but unequal pulse widths, along with no switch times and dead times. Thus, the first packet 402 is comprised of four biphasic pulses, each comprising a positive peak 408 having a first pulse width PW1 and a negative peak 410 having a second pulse width PW2). Here the first pulse width PW1 is greater than the second pulse width PW2. The second packet 404 is comprised of pulses having equal voltages but unequal pulse widths (as in the first pulse 402), with switch times equal to dead times. The third packet 405 is comprised of pulses having equal voltages but unequal pulse widths (as in the first pulse 402), with switch times that are shorter than dead times. The fourth packet 407 is comprised of pulses having equal voltages but unequal pulse widths (as in the first pulse 402), with switch times that are greater than dead times.

Figure 5G:
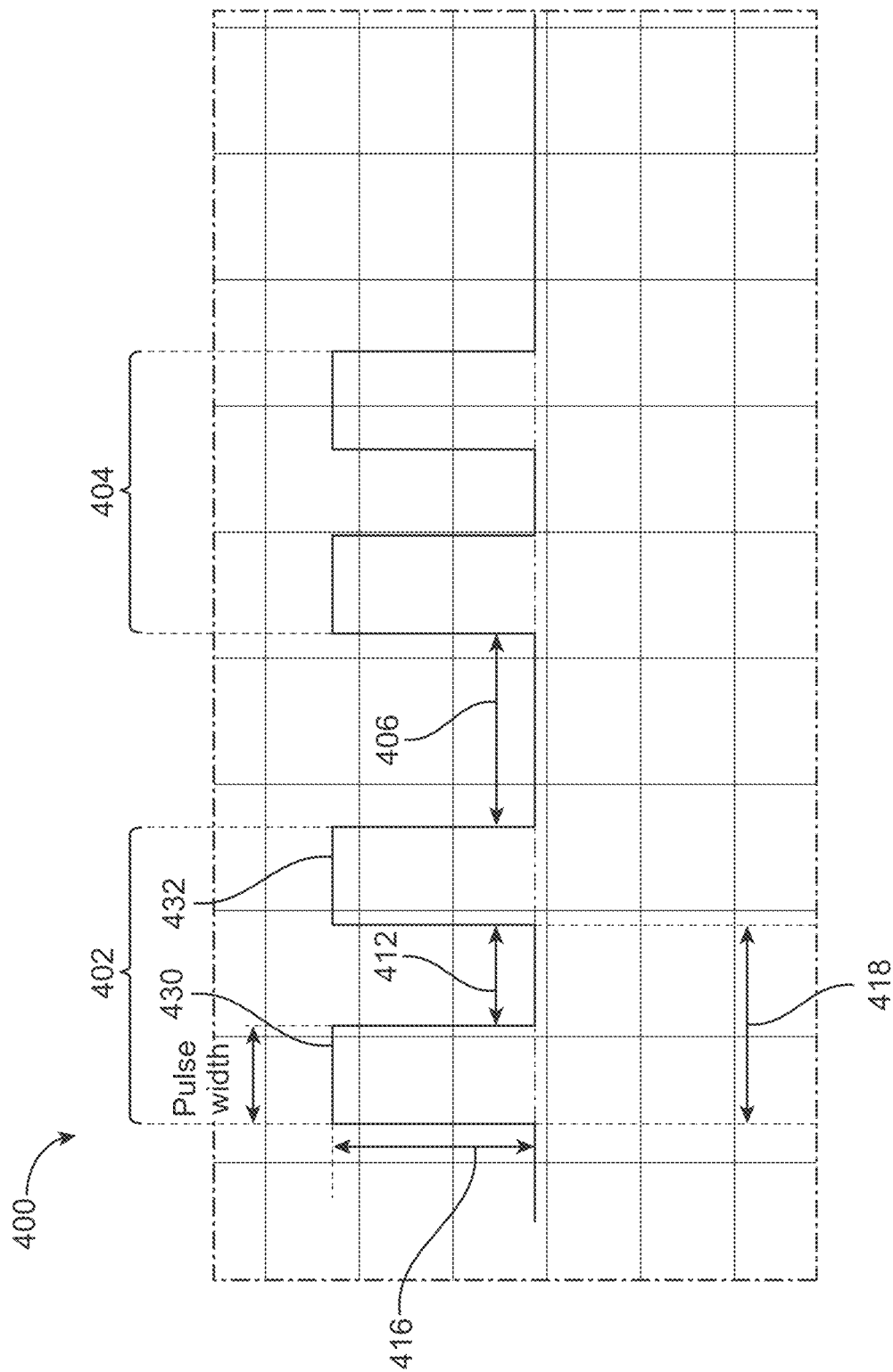
FIG. 5G illustrates an example waveform prescribed by another energy delivery algorithm wherein the waveform is monophasic.

FIG. 5G illustrates an example waveform 400 prescribed by another energy delivery algorithm 152 wherein the waveform is monophasic, a special case of imbalance whereby there is only a positive or only a negative portion of the waveform. Here, two packets are shown, a first packet 402 and a second packet 404, wherein the packets 402, 404 are separated by a rest period 406. In this embodiment, each packet 402, 404 is comprised of a first monophasic pulse 430 and a second monophasic pulse 432. The first and second monophasic pulses 430, 432 are separated by dead time 412 between each pulse. This monophasic waveform could lead to a more desirable treatment effect as the same charge cell membrane potential is maintain for longer durations. However, adjacent muscle groups will be more stimulated by the monophasic waveform, compared to a biphasic waveform.

Figure 5H:
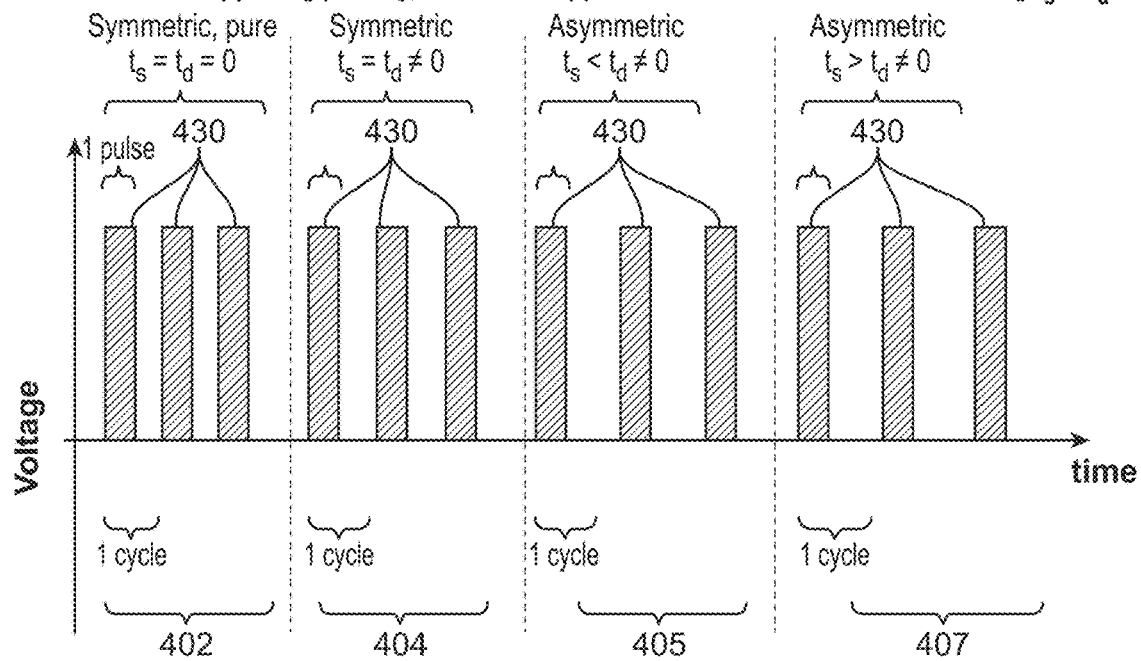
FIG. 5H illustrates further examples of waveforms having monophasic pulses.

FIG. 5H illustrates further examples of waveforms having monophasic pulses. Here, four different types of packets are shown in a single diagram for condensed illustration. The first packet 402 is comprised of pulses having identical voltages and pulse widths, with no switch times (because the pulses are monophasic) and a dead time equal to the active time. In some cases, there may be less dead time duration than the active time of a given pulse. Thus, the first packet 402 is comprised of three monophasic pulses 430, each comprising a positive peak. In instances where the dead time is equal to the active time, the waveform may be considered unbalanced with a fundamental frequency representing a cycle period of 2× the active time and no dead time. The second packet 404 is comprised of monophasic pulses 430 having equal voltages and pulse widths (as in the first packet 402), with larger dead times. The third packet 405 is comprised of monophasic pulses 430 having equal voltages and pulse widths (as in the first packet 402), and even larger dead times. The fourth packet 407 is comprised of monophasic pulses 430 having equal voltages and pulse widths (as in the first packet 402), with yet larger dead times.

In some embodiments, target depths of 0.1 mm-5 mm may be achieved with monopolar, monophasic (consistent or alternating) delivery having, for example, a voltage of 2000 V, a packet duration of 100 μs and a packet count of 1-100. Likewise, the voltage may be 500-1500V with a packet duration of 100 μs and a packet count of 40, or a voltage of 2000 V with a packet duration of 10-200 μs and a packet count of 40, to name a few. Alternatively, in some embodiments, target depths of 0.1 mm-2 mm may be achieved with bipolar, monophasic (consistent or alternating) delivery having, for example, a voltage-to-distance ratio of 1000 V/cm, a packet duration of 100 μs and a packet count of 1-60. Likewise, the voltage-to-distance ratio may be 250-1500 V/cm with a packet duration of 100 μs and a packet count of 30, or a voltage-to-distance ratio of 1000 V/cm with a packet duration of 20-1000 μs and a packet count of 30.

Figure 5I:
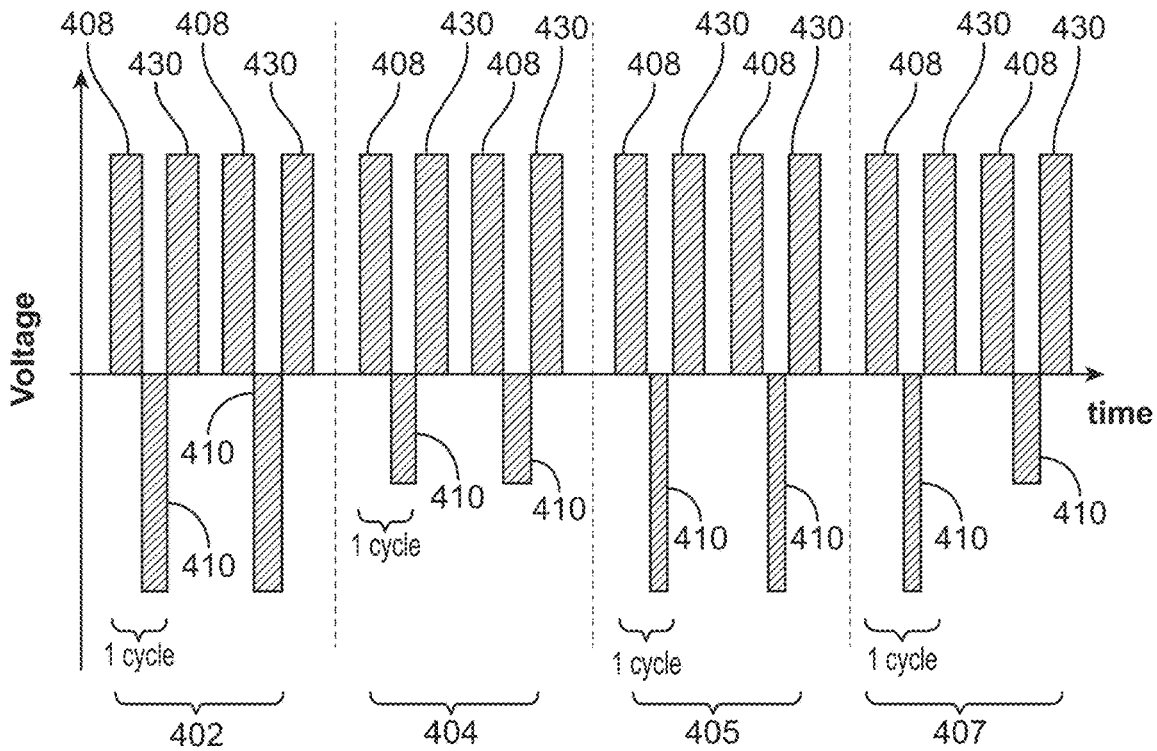
FIG. 5I illustrates further examples of waveforms having such phase imbalances.

In some embodiments, an unbalanced waveform is achieved by delivering more than one pulse in one polarity before reversing to an unequal number of pulses in the opposite polarity. FIG. 5I illustrates further examples of waveforms having such phase imbalances. Here, four different types of packets are shown in a single diagram for condensed illustration. The first packet 402 is comprised of four cycles having equal voltages and pulse widths, however, opposite polarity pulses are intermixed with monophasic pulses. Thus, the first cycle comprises a positive peak 408 and a negative peak 410. The second cycle is monophasic, comprising a single positive pulse with no subsequent negative pulse 430. This then repeats. The second packet 404 is comprised of intermixed biphasic and monophasic cycles (as in the first packet 402), however the pulses have unequal voltages. The third packet 405 is comprised of intermixed biphasic and monophasic cycles (as in the first packet 402), however the pulses have unequal pulse widths. The fourth packet 407 is comprised of intermixed biphasic and monophasic pulses (as in the first packet 402), however the pulses have unequal voltages and unequal pulse widths. Thus, multiple combinations and permutations are possible. FIG. 5J illustrates an example of a waveform having imbalances in both positive and negative voltages. Here a packet is shown having a first positive pulse peak 408 and a first negative pulse peak 410 having a greater voltage than a second positive pulse peak 408' and a second negative pulse peak 410'. These differing cycles repeat throughout the packet.

Regarding the utility of unequal waveforms, the unbalanced TMP manipulation achieved reduces the implications of biphasic cancellation. There is a correlative relationship between the degree of imbalance, approaching a monopolar waveform as fully unbalanced, and the intensity of TMP manipulation. This will result in proportional relationship between the extent of treatment effect as well as the degree of muscle contraction. Thus, approaching more unbalanced waveforms will enable stronger treatment effects at the same voltage and frequency (if applicable) for biphasic waveforms than those produced from purely balanced biphasic waveforms. For example, the treatment effect evoked by an 830 ns-415 ns-830 ns-etc pulse length sequence within a packet will have the pulse constituting the second half of the cycle being half the duration of the original phase. This will restrict the induction of TMP manipulation by the second phase of the cycle, but will also generate less reversed TMP, enabling a stronger effect from the original polarity in the subsequent cycle at the original length. In another example, the "positive" portion of the waveform may be 2500V, with the "negative" portion being 1500V (2500-1250-2500-etc V), which will induce comparable effects on TMP polarization as that which was described for the pulse duration imbalance. In both of these cases, the manipulation of the opposing polarity intensity will result in cumulative stronger TMP manipulation for the positive pulse in the cycle. This will thus reduce the effects of biphasic cancellation and will generate stronger treatment effects than a protocol of 830-830-830 ns or 2500-2500-2500V, despite the deposition of less total energy delivered to the tissue. In this way, it is possible to deliver less total energy to the tissue but evoke the desired treatment effect when TMP manipulations are integral to the treatment mechanism of action.

Extended further, the fully unbalanced waveforms would not include any opposite polarity component but may still include brief portions of pulses delivered in just the positive phase. An example of this is a packet that contains 830 ns of positive polarity, an 830 ns pause with no energy delivered, followed by another 830 ns of positive polarity, and so forth. The same approach is true whether considering the pulse length imbalance or the voltage imbalance, as the absence of a negative pulse is equivalent to setting either of these parameters to zero for the "negative" portion.

However, appropriate treatment delivery considers that the advantages offered by biphasic waveforms, namely the reduction of muscle contraction, resulting from biphasic cancellation will likewise be reduced. Therefore, the appropriate treatment effect extent is balanced against the degree of acceptable muscle contraction. For example, an ideal voltage imbalance may be 2500-1000-2500- . . . V, or 2500-2000-2500- . . . V; or 830-100-830- . . . ns, or 830-500-830- . . . ns.

H. Waveform Shapes

Figure 5K:
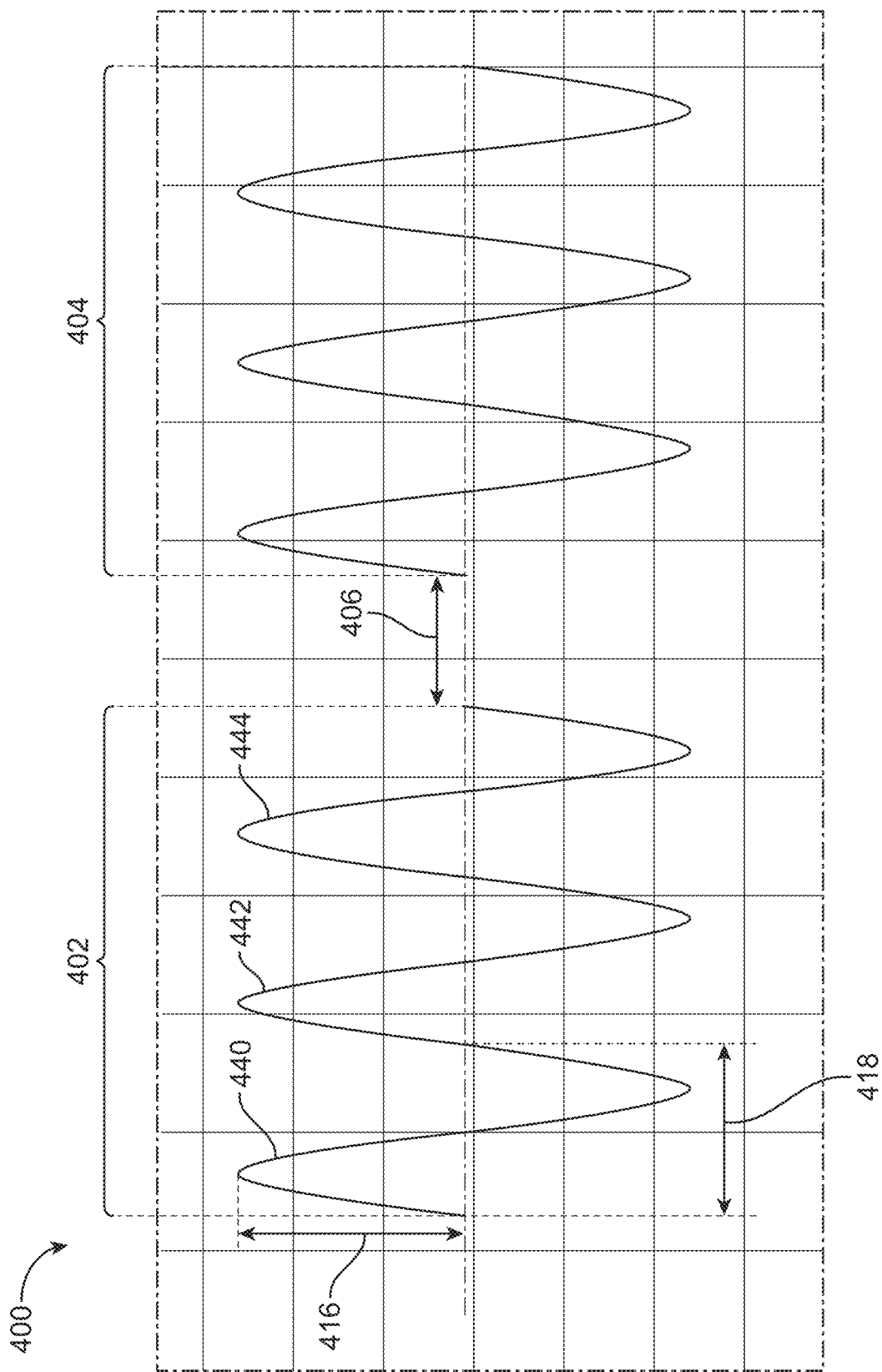
FIG. 5K illustrates an example waveform prescribed by another energy delivery algorithm wherein the pulses are sinusoidal in shape rather than square.

FIG. 5K illustrates an example waveform 400 prescribed by another energy delivery algorithm 152 wherein the pulses are sinusoidal in shape rather than square. Again, two packets are shown, a first packet 402 and a second packet 404, wherein the packets 402, 404 are separated by a rest period 406. In this embodiment, each packet 402, 404 is comprised three biphasic pulses 440, 442, 444. And, rather than square waves, these pulses 440, 442, 444 are sinusoidal in shape. One benefit of a sinusoidal shape is that it is balanced or symmetrical, whereby each phase is equal in shape. Balancing may assist in reducing undesired muscle stimulation. It may be appreciated that in other embodiments the pulses have decay-shaped waveforms.

Energy delivery may be actuated by a variety of mechanisms, such as with the use of a button 164 on the catheter 102 or a foot switch 168 operatively connected to the generator 104. Such actuation typically provides a single energy dose. The energy dose is defined by the number of packets delivered and the voltage of the packets. Each energy dose delivered to the wall W maintains the temperature at or in the wall W below a threshold for thermal ablation, particularly thermal ablation of the basement membrane BM which comprises denaturing stromal proteins in the basement membrane or deeper submucosal extracellular protein matrices. In addition, the doses may be titrated or moderated over time so as to further reduce or eliminate thermal build up during the treatment procedure. Instead of inducing thermal damage, defined as protein coagulation at sites of danger to therapy, the energy dose provide energy at a level which treats the condition, such as cancer, without damaging sensitive tissues.

It may be appreciated that other surfaces along the reproductive tract or other surfaces or lumens in the body may be treated in a similar manner. In some embodiments, a target depth of 0.1-1 mm may be achieved with a monopolar arrangement and a biphasic waveform having a voltage of 500-2500 V, a fundamental frequency of 500 kHz, a packet duration of 100 μs, and a packet count of 10. Likewise, a target depth of 1-2 mm may be achieved with a monopolar arrangement and a biphasic waveform having a voltage of 2500-3000 V, a fundamental frequency of 500 kHz, a packet duration of 100 μs, and a packet count of 15. Similarly, a target depth of 2-5 mm may be achieved with a monopolar arrangement and a biphasic waveform having a voltage of 2500-3500 V, a fundamental frequency of 500 kHz, a packet duration of 100 μs, and a packet count of 40. Further, a target depth of 5-10 mm may be achieved with a monopolar arrangement and a biphasic waveform having a voltage of 3000-6000 V, a fundamental frequency of 400 kHz, a packet duration of 200 μs, and a packet count of 20.

Additional Embodiments

Figure 6A:
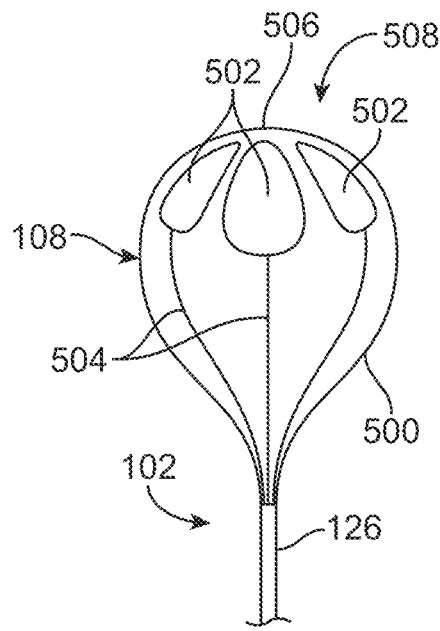
FIGS. 6A-6D illustrate an embodiment of a therapeutic energy delivery catheter delivering energy to a surface of the cervix, wherein the catheter has an energy delivery body comprising a flexible expandable member (e.g. a balloon) having one or more flexible electrodes mounted thereon.
Figure 6B:
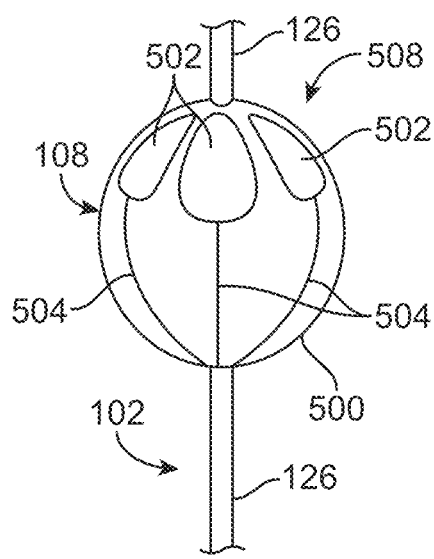
Figure 6C:
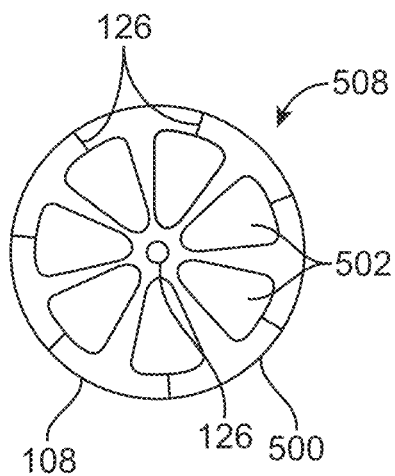
Figure 6D:
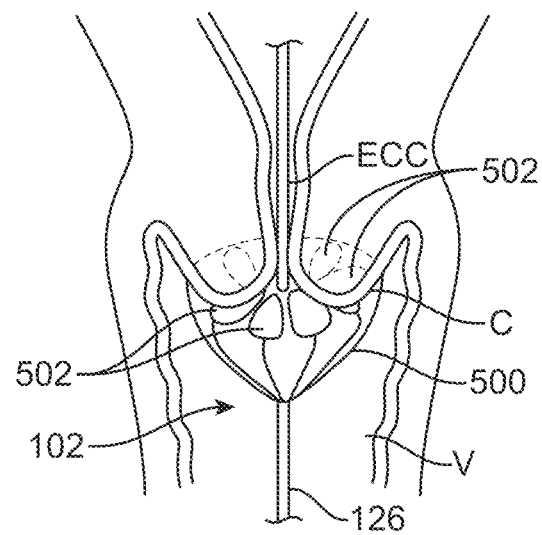

FIGS. 6A-6D illustrate another embodiment of a therapeutic energy delivery catheter 102 delivering energy to a surface of the cervix C. In this embodiment, the catheter 102 has an energy delivery body 108 comprising a flexible expandable member 500 (e.g. a balloon) having one or more flexible electrodes 502 mounted thereon. In this embodiment, the electrodes 502 have the form of a pad having a relatively broad surface area and thin cross-section. The pad shape provides a broader surface area than other shapes, such as a wire shape, although wires may be used. Each electrode 502 is connected with a conduction wire 504 which electrically connects the electrode 502 with the generator. It may be appreciated that each electrode 502 may be energized individually or in concert or synchronicity with one or more other electrodes 502. The electrodes 502 may be comprised of flexible circuit pads or other materials attached to the expandable member 500 or formed into the expandable member 500. The electrodes 502 may have a variety of shapes, may have a variety of sizes, may be distributed in various patterns, may vary in number, and may operate in a monopolar or bipolar fashion. Typically, the electrodes 502 are sized, shaped and arranged so as to cover a surface of the expandable member 500 configured to mate with the cervix C. Thus, in the embodiment of FIG. 6A, the electrodes 502 each have a pedal shape and are arranged around a point 506 on the distal end 508 of the expandable member 500. FIG. 6B illustrates a similar embodiment wherein the catheter 102 has an energy delivery body 108 comprising a flexible expandable member 500 (e.g. a balloon) having one or more flexible electrodes 502 mounted thereon. However, in this embodiment, the shaft 126 upon which the energy delivery body 108 is mounted extends therethrough, beyond the distal end 508 of the expandable member 500. Such extension allows the shaft 126 to enter the endocervical canal ECC. This helps to guide the energy delivery body 108 into position and stabilizes its orientation in relation to the cervix C. FIG. 6C provides a top view of the distal end 508 of the energy delivery body 108 of FIG. 6B. As shown, the electrodes 502 each have a pedal shape and are arranged around the shaft 126 on the distal end 508 of the expandable member 500. FIG. 6D illustrates the catheter 102 of FIGS. 6B-6C in use. As shown, the catheter 102 is introduced through the vagina V and the shaft 126 is advanced into the endocervical canal. The energy delivery body 108 is advanced so that its distal end 508 contacts a surface of the cervix C. The flexibility of the expandable member 500 and electrodes 502 allows the electrodes 502 to contour to the shape of the surface of the cervix C, maximizing contact. One or more electrodes 502 are then energized to deliver PEFs to the cervix C.

In some embodiments, the energy penetrates up to various depths within the layer of epithelial cells EC (e.g. up to 2 mm), such as to treat CIN. This destroys the abnormal epithelial cells EC without affecting cells beyond the epithelial cell layer. In other embodiments, the energy penetrates beyond the layer of epithelial cells EC (e.g. up to 1 cm), such as to treat CIS. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal, or otherwise undesired cells leaving the tissue framework intact. This allows the tissue to regenerate in a normal fashion, avoiding the formation of scar tissue.

Figure 7A:
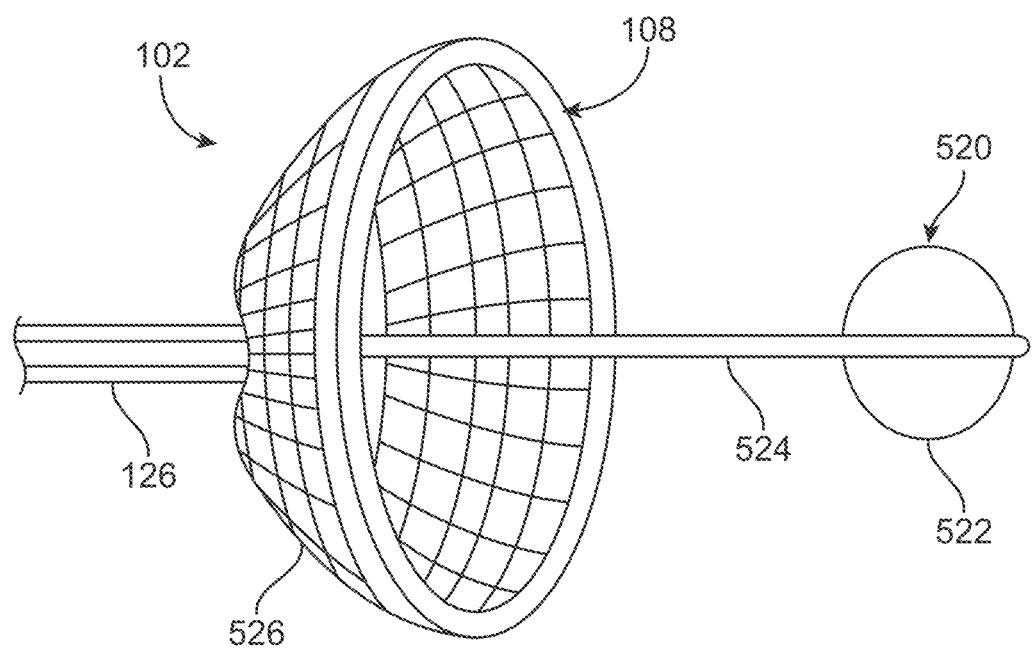
FIGS. 7A-7B illustrate an embodiment of a therapeutic energy delivery catheter delivering energy to a surface of the cervix, wherein the catheter comprises an energy delivery body and a stabilizing element.
Figure 7B:
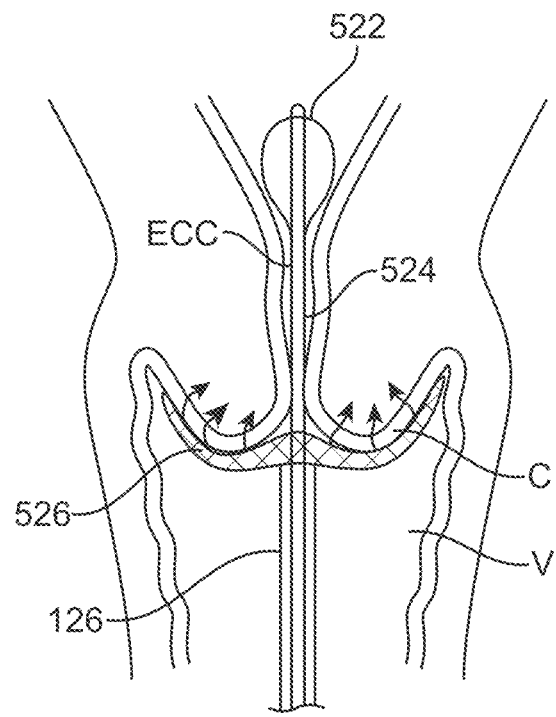

FIGS. 7A-7B illustrate another embodiment of a therapeutic energy delivery catheter 102 delivering energy to a surface of the cervix C. In this embodiment, the catheter 102 comprises energy delivery body 108 and a stabilizing element 520. The stabilizing element 520 is configured to be advanced into the uterus U to stabilize the catheter 102 while the energy delivery body 108 resides in the vagina V so as to deliver energy to the cervix C. In this embodiment, the stabilizing element 520 comprises an expandable member 522 (e.g. a balloon) that is mounted on a shaft 524. The shaft 524 is sized and configured to concentrically pass through a lumen in shaft 126 of the catheter 102. The energy delivery body 108 is mounted on the shaft 126. Thus, the shaft 524 and stabilizing element 520 are able to move relative to the energy delivery body 108 therefore allowing the distance between the stabilizing element 520 and energy delivery body 108 to be adjustable. In this embodiment, the energy delivery body 108 comprises a wireform 526 that is shaped to mate with the contours of the cervix C. Thus, in this embodiment the wireform 526 has a modified cup shape facing the stabilizing element 520. Likewise, the shaft 126 is disposed so that the stabilizing element 520 and its shaft 524 pass through the center of the wireform 526, centering the cup shape such as around the endocervical canal EEC.

In some embodiments, the wireform 526 is comprised of a plurality of wires that together act as a single electrode. In such embodiments, the wireform 526 delivers PEFs in a monopolar fashion. In other embodiments, the wireform 526 is comprised of a plurality of wires wherein the wires are individually energizable or energizable in groups. In such embodiments, the wireform 526 delivers PEFs in a bipolar fashion but may optionally operate in a monopolar fashion. Further, such functionality may vary over time.

FIG. 7B illustrates the catheter 102 positioned within the reproductive tract of a patient. As shown, the catheter 102 is introduced through the vagina V and the shaft 524 is advanced into the endocervical canal EEC. The stabilizing element 520 is expanded so that the shaft 524 can no longer be retracted through the endocervical canal EEC. The energy delivery body 108 is advanced so that the wireform 526 contacts a surface of the cervix C. In this embodiment, the wireform 526 is shaped so that the wireform 526 mates with a circumferential portion of the surface of the cervix C. The electrode(s) of the wireform 526 are then energized to deliver PEFs to the cervix C.

In some embodiments, the energy penetrates up to various depths within the layer of epithelial cells EC (e.g. up to 2 mm), such as to treat CIN. This destroys the abnormal epithelial cells EC without affecting cells beyond the epithelial cell layer. In other embodiments, the energy penetrates beyond the layer of epithelial cells EC (e.g. up to 1 cm), such as to treat CIS. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Figure 8A:
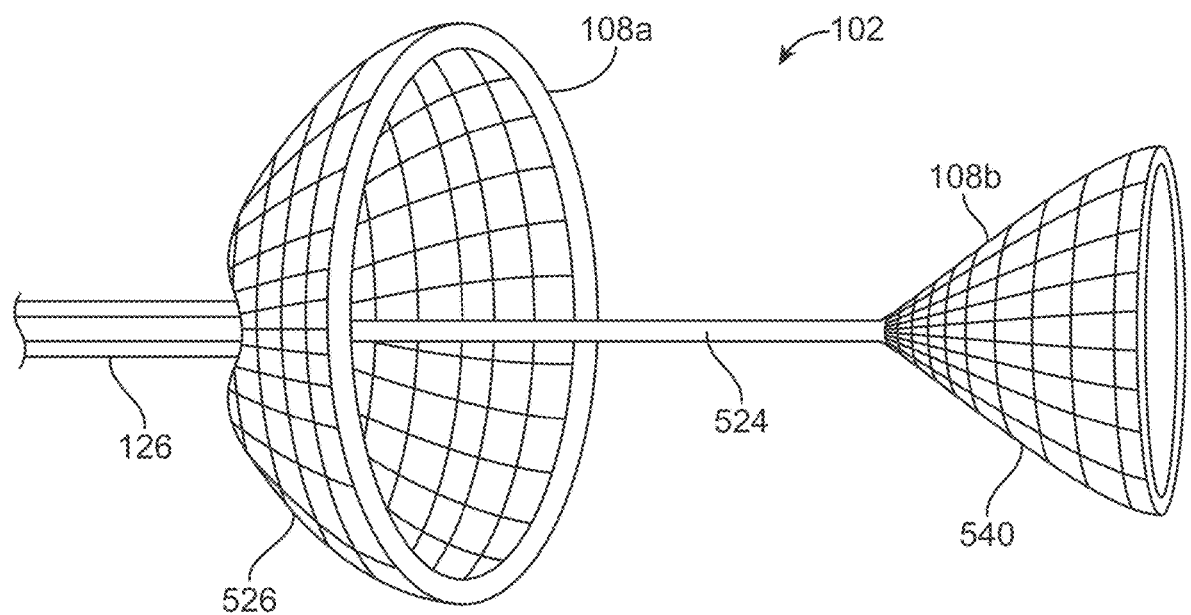
FIGS. 8A-8B illustrate another embodiment of a therapeutic energy delivery catheter delivering energy to portions of the reproductive tract, wherein the catheter comprises a first energy delivery body and a second energy delivery body, wherein the second energy delivery body also acts as a stabilizing element.
Figure 8B:
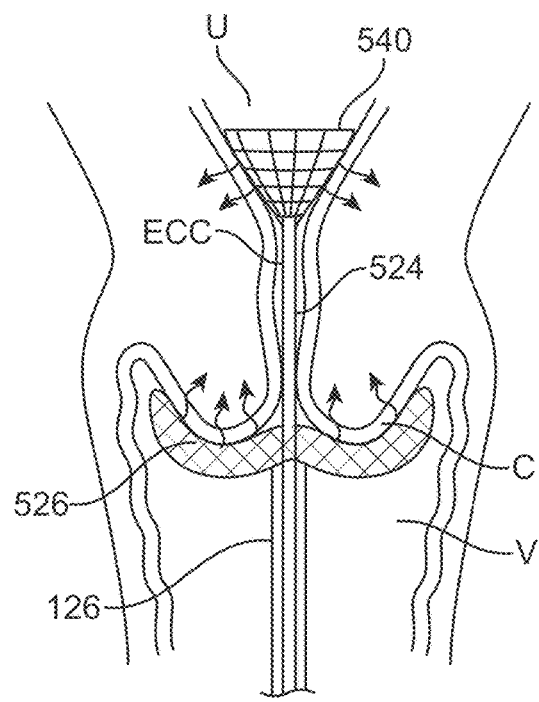

FIGS. 8A-8B illustrate another embodiment of a therapeutic energy delivery catheter 102 delivering energy to portions of the reproductive tract. In this embodiment, the catheter 102 comprises a first energy delivery body 108a and a second energy delivery body 108b, wherein the second energy delivery body 108b also acts as a stabilizing element. The second energy delivery body 108b is configured to be advanced into the uterus U to stabilize the catheter 102 and deliver energy to the uterus U while the first energy delivery body 108a resides in the vagina V so as to deliver energy to the cervix C. In this embodiment, the second energy delivery body 108b comprises a second wireform 540 having a funnel shape that is mounted on a shaft 524. In this embodiment, the opening of the funnel shape faces distally so as to more closely mimic the interior shape of the uterus U near the cervix C. The shaft 524 is sized and configured to concentrically pass through a lumen in shaft 126 of the catheter 102. The first energy delivery body 108a is mounted on the shaft 126. Thus, the shaft 524 and second energy body 108b are able to move relative to the first energy delivery body 108a therefore allowing the distance between the second energy body 108b and first energy delivery body 108a to be adjustable. In this embodiment, the first energy delivery body 108a comprises a first wireform 526 that is shaped to mate with the contours of the cervix C. Thus, in this embodiment the first wireform 526 has a modified cup shape facing the second energy delivery body 108b. Likewise, the shaft 126 is disposed so that the second energy delivery body 108b and its shaft 524 pass through the center of the first wireform 526, centering the cup shape such as around the endocervical canal EEC.

In some embodiments, the first wireform 526 and/or the second wireform 540 are comprised of a plurality of wires that together act as a single electrode. In such embodiments, each wireform 526, 540 delivers PEFs in a monopolar fashion. In other embodiments, the first wireform 526 and the second wireform 540 act as a bipolar pair, transmitting energy between them. This may be particularly useful when treating conditions and diseases that extend deep within the cervix or involve portions of multiple anatomies. In other embodiments, the first wireform 526 and/or the second wireform 540 are comprised of a plurality of wires wherein the wires are individually energizable or energizable in groups. In such embodiments, each wireform 526, 540 delivers PEFs in a bipolar fashion but may optionally operate in a monopolar fashion. Thus, it may be appreciated that in some embodiments, the first wireform 526 functions in a monopolar fashion while the second wireform 540 functions in a bipolar fashion and vice versa. Further, such functionality may vary over time.

FIG. 8B illustrates the catheter 102 positioned within the reproductive tract of a patient. As shown, the catheter 102 is introduced through the vagina V and the shaft 524 is advanced into the endocervical canal EEC. The second energy delivery body 540 is expanded within the uterus U so that the shaft 524 can no longer be retracted through the endocervical canal EEC. The funnel shape of the second energy delivery body 108b conforms to the interior surface of the uterus U above the cervix C so that the second wireform 540 contacts at least a portion of the lining of the uterus U. The first energy delivery body 108 is advanced so that the first wireform 526 contacts a surface of the cervix C. In this embodiment, the first wireform 526 is shaped so that the first wireform 526 mates with a circumferential portion of the surface of the cervix C. The electrode(s) of the first wireform 526 and second wireform 540 are then energized to deliver PEFs to the cervix C and uterus U respectively.

In some embodiments, the energy from the first wireform 526 penetrates up to various depths within the layer of epithelial cells EC (e.g. up to 1, up to 2 mm) of the cervix C, such as to treat CIN. This destroys the abnormal epithelial cells EC without affecting cells beyond the epithelial cell layer. In other embodiments, the energy penetrates beyond the layer of epithelial cells EC (e.g. up to 1 cm) of the cervix C, such as to treat CIS. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Likewise, the energy from the second wireform 540 penetrates up to various depths within the layer of epithelial cells EC (e.g. up to 1 mm, up to 2 mm or up to 3 mm) of the uterus U This destroys the abnormal epithelial cells EC without affecting cells beyond the epithelial cell layer. In other embodiments, the energy penetrates beyond the layer of epithelial cells EC (e.g. up to 1 cm or up to 2 cm) of the uterus U. The normal thickness of the uterus is 1-2 cm however such thicknesses may vary widely. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Figure 9A:
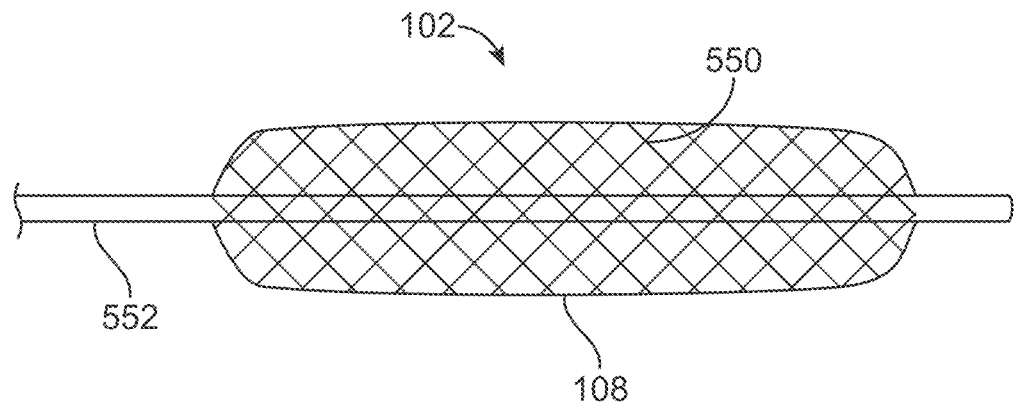
FIGS. 9A-9B illustrate an embodiment of a therapeutic energy delivery catheter delivering energy to a portion of the reproductive anatomy wherein the catheter is configured to deliver energy to the endocervical canal.
Figure 9B:
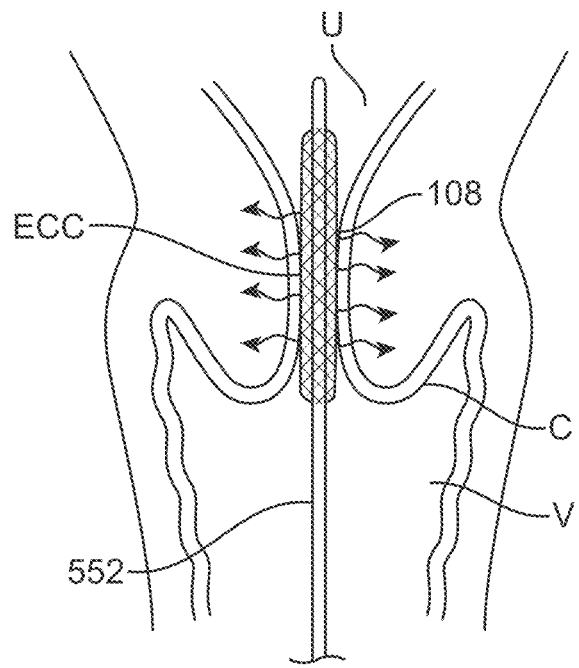

FIGS. 9A-9B illustrate another embodiment of a therapeutic energy delivery catheter 102 delivering energy to a portion of the reproductive anatomy. In this embodiment, the catheter is configured to deliver energy to the endocervical canal EEC which typically has a length of 2.5-4 cm. In this embodiment, the catheter 102 comprises an energy delivery body 108 mounted on shaft 552 wherein the energy delivery body 108 comprises an elongate wireform 550 having an elongate, tubular or oval shape so as to pass within the endocervical canal EEC. In some embodiments, the elongate wireform 550 has a length sufficient to extend the length of the endocervical canal, extend beyond the length of the endocervical canal or to extend along a portion of the endocervical canal. Thus, in some embodiments, the wireform 550 has a length in the range of 0.1 cm to 5 cm, 0.1 to 4 cm, 0.1 to 2 cm and all subranges therebetween. Typically, the elongate wireform 550 has a diameter sufficient to contact the walls of the endocervical canal. In some embodiments, the wireform 550 has a diameter in the range of 0.5 cm to 1 cm.

In some embodiments, the elongate wireform 550 is comprised of a plurality of wires that together act as a single electrode. In such embodiments, the wireform 550 delivers PEFs in a monopolar fashion. In other embodiments, the elongate wireform 550 is comprised of a plurality of wires wherein the wires are individually energizable or energizable in groups. In such embodiments, the wireform 550 delivers PEFs in a bipolar fashion but may optionally operate in a monopolar fashion. Further, such functionality may vary over time.

FIG. 9B illustrates the catheter 102 positioned within the reproductive tract of a patient. As shown, the catheter 102 is introduced through the vagina V and the shaft 552 is advanced into the endocervical canal EEC so that the energy delivery body 108 is positioned within the endocervical canal EEC. The electrode(s) of the energy delivery device 108 are then energized to deliver PEFs to the endocervical canal EEC. It may be appreciated that in some embodiments the energy delivery body 108 is sized and/or positioned to optionally deliver energy to portions of the cervix C and/or portions of the uterus U.

In some embodiments, the energy from the energy delivery body 108 penetrates up to various depths within the layer of epithelial cells EC (e.g. up to 1 mm, up to 2 mm) of the endocervical canal EEC. This destroys the abnormal epithelial cells EC without affecting cells beyond the epithelial cell layer. In other embodiments, the energy penetrates beyond the layer of epithelial cells EC (e.g. up to 1 cm) of the endocervical canal EEC. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Figure 10A:
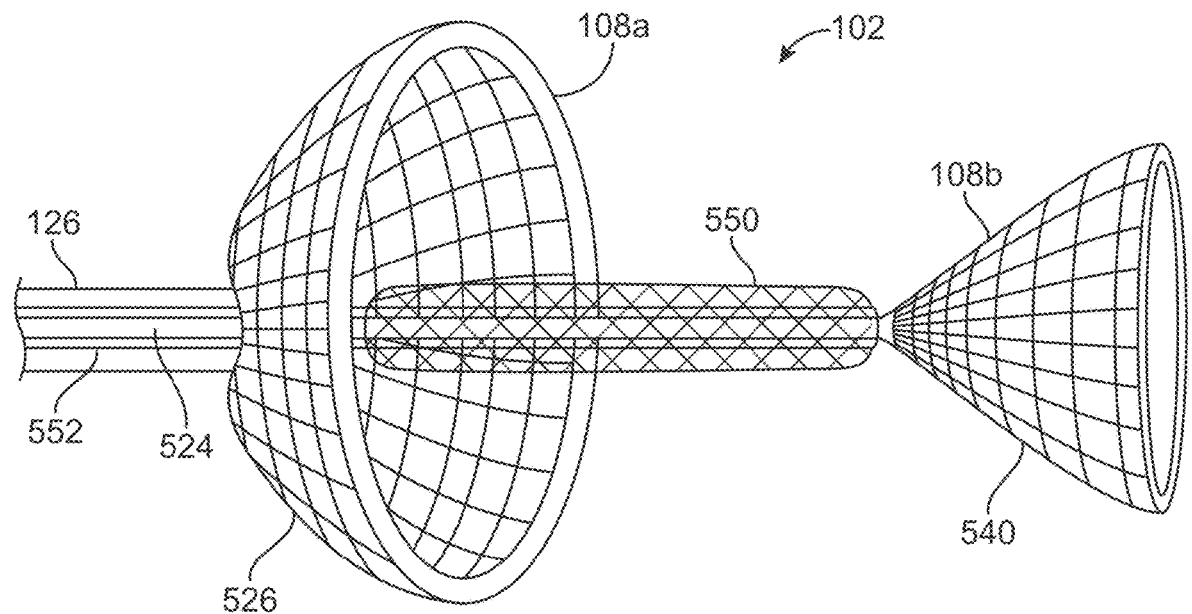
FIGS. 10A-10B illustrate another embodiment of a therapeutic energy delivery catheter delivering energy to portions of the reproductive tract, wherein the catheter combines various features of the energy delivery catheters of FIG. 8A and FIG. 9A.
Figure 10B:
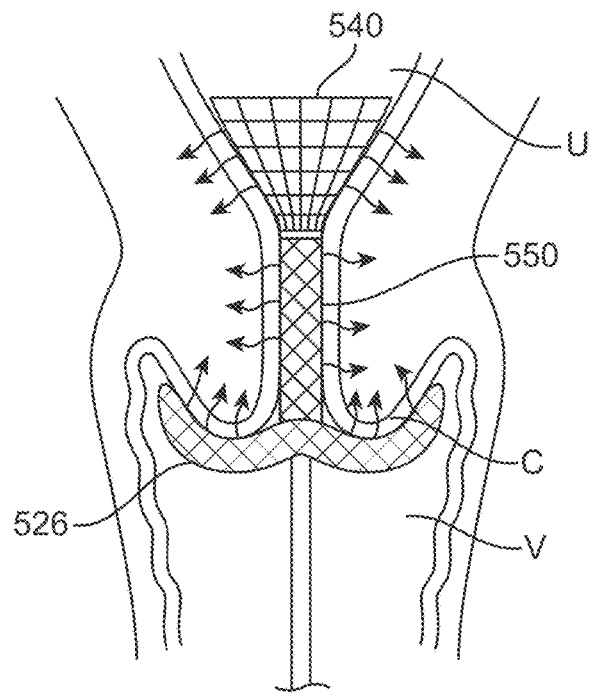

FIGS. 10A-10B illustrate another embodiment of a therapeutic energy delivery catheter 102 delivering energy to portions of the reproductive tract. This embodiment combines various features of the energy delivery catheters 102 of FIG. 8A and FIG. 9A. In this embodiment, the catheter 102 comprises the first energy delivery body 108a and a second energy delivery body 108b of FIG. 8A with the elongate wireform 550 of FIG. 8B which acts as a third energy delivery body. Thus, the first energy delivery body 108a is comprised of wireform 526 having a cup shape and is mounted on shaft 126. The wireform 526 is shaped and configured to engage a surface of the cervix C from within the vagina V. Elongate wireform 550 is mounted on shaft 552. The shaft 552 is sized and configured to concentrically pass through a lumen in shaft 126. Thus, the elongate wireform 550 and first energy delivery body 108a are able to move relative to each other therefore allowing the distance between them to be adjustable. As mentioned previously, the elongate wireform 550 is configured to deliver energy to the endocervical canal EEC, and optionally portions of the cervix C and uterus U. In this embodiment, the second energy delivery body 108b comprises wireform 540 having a funnel shape and is mounted on shaft 524. In this embodiment, the shaft 524 is sized and configured to concentrically pass through a lumen in shaft 552. Thus, the elongate wireform 550 and second energy delivery body 108b are able to move relative to each other therefore allowing the distance between them to be adjustable.

In some embodiments, the first wireform 526 and/or the second wireform 540 and/or the elongate wireform 550 are comprised of a plurality of wires that together act as a single electrode. In such embodiments, each wireform 526, 540, 550 delivers PEFs in a monopolar fashion. In other embodiments, any pair of the first wireform 526, the second wireform 540 and the elongate wireform 550 act in as a bipolar pair, transmitting energy between them. In other embodiments, the first wireform 526, the second wireform 540 and the elongate wireform 550 act in a tripolar configuration, transmitting energy between them. This may be particularly useful when treating conditions and diseases that extend deep within the cervix or involve portions of multiple anatomies. In other embodiments, the first wireform 526 and/or the second wireform 540 and/or the elongate wireform 550 are comprised of a plurality of wires wherein the wires are individually energizable or energizable in groups. In such embodiments, each wireform 526, 540, 550 delivers PEFs in a bipolar fashion but may optionally operate in a monopolar fashion. Thus, it may be appreciated that in some embodiments, the wireforms 526, 540, 550 each act in differing fashions and may vary over time.

FIG. 10B illustrates the catheter 102 positioned within the reproductive tract of a patient. As shown, the catheter 102 is introduced through the vagina V and the second energy delivery body 108b is passed through the endocervical canal EEC to the uterus U. The second energy delivery body 108b is expanded within the uterus U so that it can no longer be retracted through the endocervical canal EEC. The funnel shape of the second energy delivery body 108b conforms to the interior surface of the uterus U above the cervix C so that the second wireform 540 contacts at least a portion of the lining of the uterus U. The elongate wireform 550 is advanced into the endocervical canal EEC. Further, the first energy delivery body 108 is advanced so that the first wireform 526 contacts a surface of the cervix C. In this embodiment, the first wireform 526 is shaped so that the first wireform 526 mates with a circumferential portion of the surface of the cervix C. The electrode(s) of the first wireform 526, elongate wireform 550 and second wireform 540 are then energized to deliver PEFs to the cervix C, endocervical canal EEC and uterus U respectively.

In some embodiments, the energy from the first wireform 526 penetrates up to various depths within the layer of epithelial cells EC (e.g. up to 1 mm, up to 2 mm) of the cervix C, such as to treat CIN. This destroys the abnormal epithelial cells EC without affecting cells beyond the epithelial cell layer. In other embodiments, the energy penetrates beyond the layer of epithelial cells EC (e.g. up to 1 cm) of the cervix C, such as to treat CIS. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

In some embodiments, the energy from the energy delivery body 108 penetrates up to various depths within the layer of epithelial cells EC (e.g. up to 1 mm, up to 2 mm) of the endocervical canal EEC. This destroys the abnormal epithelial cells EC without affecting cells beyond the epithelial cell layer. In other embodiments, the energy penetrates beyond the layer of epithelial cells EC (e.g. up to 1 cm) of the endocervical canal EEC. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Further, the energy from the second wireform 540 penetrates up to various depths within the layer of epithelial cells EC (e.g. up to 1 mm, up to 2 mm) of the uterus U. This destroys the abnormal epithelial cells EC without affecting cells beyond the epithelial cell layer. In other embodiments, the energy penetrates beyond the layer of epithelial cells EC (e.g. up to 1 cm) of the uterus U. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

It may be appreciated that in some embodiments one or more of the first energy delivery body 108a, the second energy delivery body 108b and the third energy delivery body/elongate wireform 550 may be formed together as a single unit. Such embodiments may allow for more expeditious delivery but reduce the variability of positioning of some or more of the parts within the reproductive anatomy.

It may also be appreciated that the first energy delivery body 108a, the second energy delivery body 108b and the third energy delivery body/elongate wireform 550 may take a variety of forms and are not limited to the embodiments illustrated herein. For example, the first energy delivery body 108a, the second energy delivery body 108b and/or the third energy delivery body/elongate wireform 550 may have a round or oval shape, such as a basket shape. Likewise, the first energy delivery body 108a, the second energy delivery body 108b and/or the third energy delivery body/elongate wireform 550 may be expanded by any suitable mechanism such self-expanding or with the use of an expandable member (e.g. balloon).

Figure 11A:
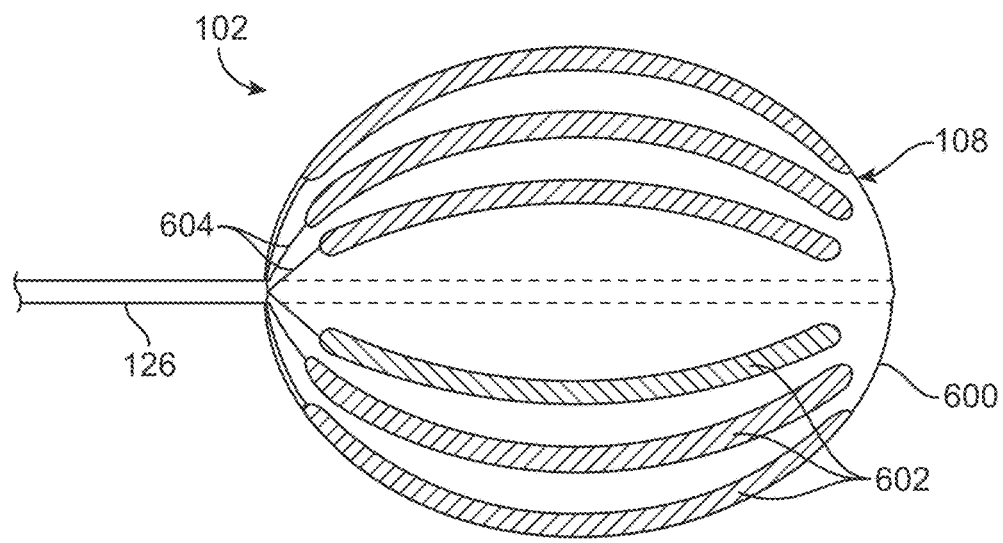
FIG. 11A-11B illustrate an embodiment of a therapeutic energy delivery catheter configured to deliver energy to the uterus.
Figure 11B:
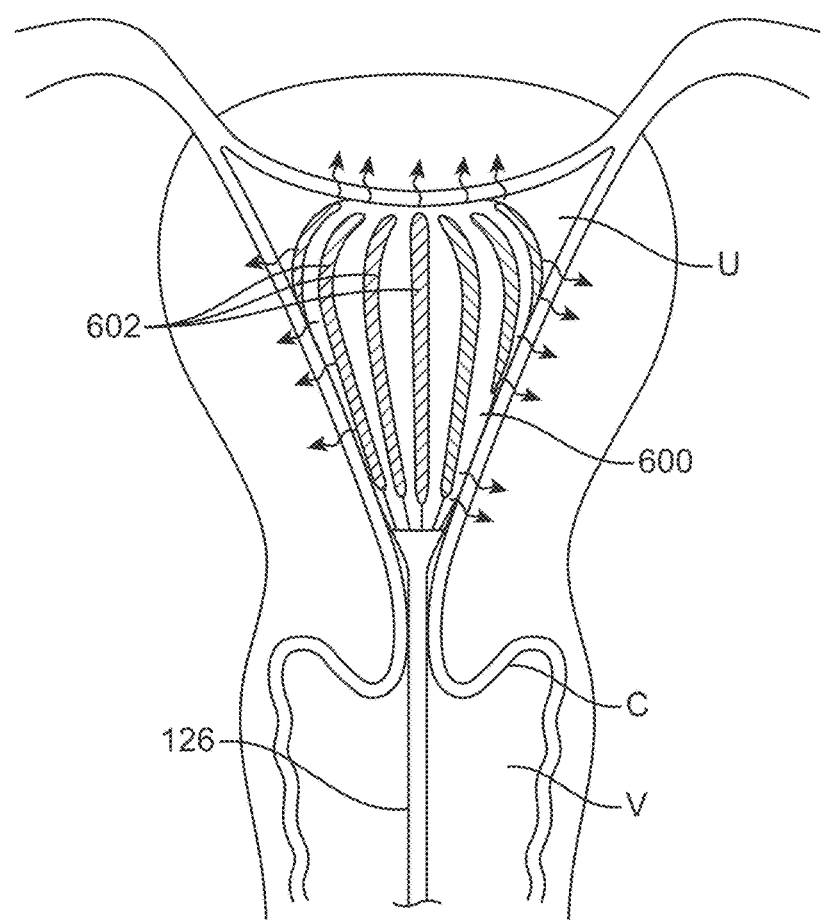

FIG. 11A-11B illustrate another embodiment of a therapeutic energy delivery catheter 102 delivering energy to a portion of the reproductive anatomy. In this embodiment, the catheter 102 is configured to deliver energy to the uterus U. In this embodiment, the catheter 102 comprises an energy delivery body 108 mounted on shaft 126, wherein the energy delivery body 108 is configured to expand within the uterus U contacting one or more interior surfaces or walls of the uterus U. Thus, in some embodiments, the energy delivery body 108 comprises a flexible expandable member 600 (e.g. a balloon) having one or more flexible electrodes 602 mounted thereon. In this embodiment, the electrodes 602 each have the form of a pad having a relatively broad surface area and thin cross-section. The pad shape provides a broader surface area than other shapes, such as a wire shape, although wires may be used. Each electrode 602 is connected with a conduction wire 604 which electrically connects the electrode 602 with the generator. It may be appreciated that each electrode 602 may be energized individually or in concert or synchronicity with one or more other electrodes 602. The electrodes 602 may be comprised of flexible circuit pads or other materials attached to the expandable member 600 or formed into the expandable member 600. The electrodes 602 may have a variety of shapes, may have a variety of sizes, may be distributed in various patterns, may vary in number, and may operate in a monopolar or bipolar fashion. Typically, the electrodes 602 are sized, shaped and arranged so as to cover a surface of the expandable member 600 configured to mate with the uterus U. Thus, in the embodiment of FIG. 11A, the electrodes 602 each have an elongate shape extending from the distal end of the energy delivery body 108 toward its proximal end. Further, in this embodiment, the electrodes 602 are arranged circumferentially around the expandable member 500.

FIG. 11B illustrates the catheter 102 of FIG. 11A in use. As shown, the catheter 102 is introduced through the vagina V and the shaft 126 is advanced into the endocervical canal EEC. The energy delivery body 108 is advanced into the uterus U wherein the energy delivery body 108 is expanded so that one or of the electrodes 602 contact an inner surface of the uterus U. The flexibility of the expandable member 600 and electrodes 602 allows the electrodes 602 to contour to the shape of the uterus U, maximizing contact. One or more electrodes 602 are then energized to deliver PEFs to the lining of the uterus U and optionally deeper into the uterus U itself.

In some embodiments, the energy from the energized electrodes 602 penetrate up to various depths within the layer of epithelial cells EC (e.g. up to 1 mm, up to 2 mm) of the uterus U. This destroys the abnormal epithelial cells EC without affecting cells beyond the epithelial cell layer. In other embodiments, the energy penetrates beyond the layer of epithelial cells EC (e.g. up to 1 cm) of the uterus U. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

Figure 12A:
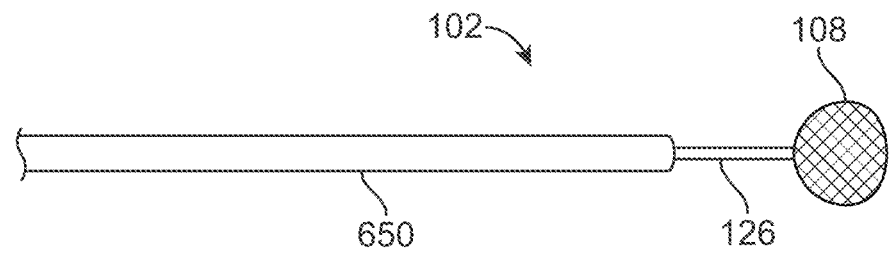
FIG. 12A-12B illustrate an embodiment of a therapeutic energy delivery catheter delivering energy select locations within the reproductive anatomy.
Figure 12B:
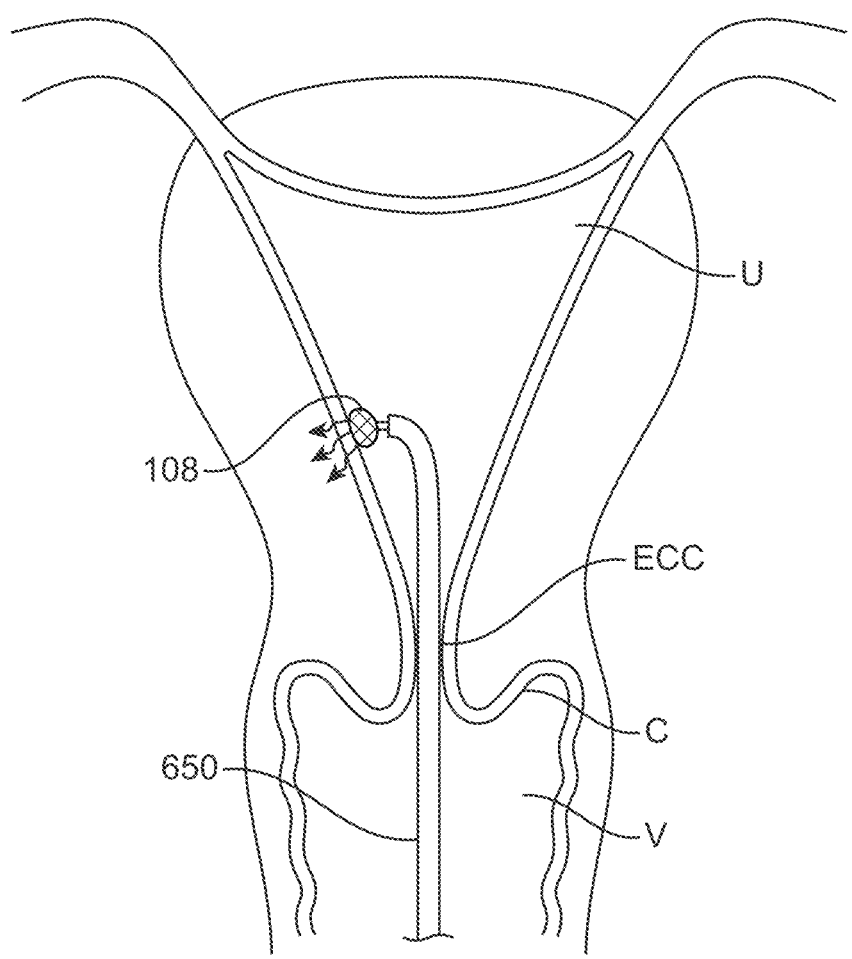

FIG. 12A-12B illustrate another embodiment of a therapeutic energy delivery catheter 102 delivering energy to a portion of the reproductive anatomy. In this embodiment, the catheter 102 is configured to deliver energy to select locations within the reproductive tract, such as within the vagina V, along the cervix C, within the endocervical canal EEC or within the uterus U. In this embodiment, the catheter 102 comprises an energy delivery body 108 mounted on shaft 126. In this embodiment, the shaft 126 is moveable by a steerable guide 650, such as a catheter, sheath or scope. However, it may be appreciated that in some embodiments the shaft 126 itself is steerable. In some embodiments, the energy delivery body 108 is retractable into the steerable guide 650 during access and positioning and in other embodiments the energy delivery body 108 resides near a distal end of the guide 650 to create a tip.

In this embodiment, the energy delivery body 108 comprises a wire basket which acts as one or more electrodes. However, it may be appreciated that in other embodiments the energy delivery body 108 comprises a balloon with an electrode covering or a finger probe. In some embodiments, the energy delivery body 108 is blunt or atraumatic and in others it is sharp or has a penetrating shape.

FIG. 12B illustrates the catheter 102 of FIG. 12A in use treating one or more locations within a uterus U. As shown, the catheter 102 is introduced through the vagina V so that the energy delivery body 108 is passed through the endocervical canal EEC and into the uterus U. In this embodiment, the energy delivery body 108 is directed toward a target location on interior wall of the uterus U by steering with the use of the steerable guide 650. Thus, the guide 650 curves laterally outwardly away from the endocervical canal EEC toward a side wall within the uterus U. The catheter 102 is advanced so that the energy delivery body 108 contacts the side wall (or fluids/substances on the side wall) so as to deliver energy thereto. The energy delivery body 108 is then energized to deliver PEFs to the lining of the uterus U at the target location and optionally deeper into the uterus U itself.

In some embodiments, the energy from the energy delivery body 108 penetrates up to various depths within the layer of epithelial cells EC (e.g. up to 1 mm, up to 2 mm) of the uterus U. This destroys the abnormal epithelial cells EC without affecting cells beyond the epithelial cell layer. In other embodiments, the energy penetrates beyond the layer of epithelial cells EC (e.g. up to 1 cm) of the uterus U. In such embodiments, energy penetration can be increased to treat various sized tumors and extent of disease. It may be appreciated that due to the nature of the energy delivered, penetration beyond the epithelial cell layer avoids many of the complications related to conventional treatment of these tissue layers, particular the formation of scar tissue. As previously described, the delivered energy eliminates the diseased, damaged, abnormal or otherwise undesired cells leaving the tissue framework intact. This allows the tissue to regenerate in a normal fashion, avoiding the formation of scar tissue.

It may be appreciated that the catheter 102 can then be repositioned to treat a new target location within the uterus U or elsewhere within the reproductive tract. It may be appreciated that in some embodiments the energy delivery body 108 is steered and/or positioned with the assistance of a balloon or other expandable member.

As mentioned previously, in some embodiments, biphasic pulses are utilized, such as to reduce undesired muscle stimulation. In other embodiments, the pulse waveform is monophasic and there is no clear inherent frequency. Instead, a fundamental frequency may be considered by doubling the monophasic pulse length to derive the frequency. In some embodiments, a treatment depth of 2-5 mm can be achieved with monopolar, monophasic (consistent or alternating) delivery having, for example, a voltage of 1500 V, a packet duration of 100 µs and a packet count of 40-100. In some embodiments, a treatment depth of 5-10 mm can be achieved with monopolar, monophasic (consistent or alternating) delivery having, for example, a voltage of 3000 V, a packet duration of 100 µs and a packet count of 40-100. In some embodiments, a treatment depth of 2-10 mm can be achieved with bipolar, monophasic (consistent or alternating) delivery having, for example, a voltage-to-distance ratio of 1500 V/cm, a packet duration of 100 µs and a packet count of 20-100.

It may be appreciated that in each of the embodiments, the catheter 102 may include markers or markings to aid in visualization. For example, the catheter 102 may include one or more radiopaque marker bands. This may be particularly useful when targeting a specific location, such as a particular fibroid. In other embodiments, the catheter 102 may have one or more markers that are visible by ultrasound. This may include rough surfaces or markers attached thereto.

It may be appreciated that in each of the embodiments, energy may be transferred directly to cells or tissue or to a substance or other entity along its surface, such a saline, blood, mucus, etc, which is able to conduct or otherwise transfer the energy to the cells or tissue. Such substances may be naturally occurring or delivered to the area to serve as a liquid electrode.

In some embodiments, the liquid electrode is comprised of a conductive solution that is delivered to the luminal structure, particularly into the targeted region. For example, in some embodiments, the uterus U, endocervical canal ECC and/or vagina V is filled or at least partially filled with a conductive solution to act as a liquid electrode. Typically, such a conductive solution comprises hypertonic saline, calcium, or other components. The treatment delivery would then be performed either via a catheter 102 having one or more energy delivery bodies 108 as described hereinabove or a catheter having a simple electrode configured to activate the conductive solution (e.g. a dull probe). In some embodiments, the conductive solution is then removed and in other embodiments the conductive solution is left behind to be resorbed. It may be appreciated that in some embodiments the conductive solution is comprised of a hypertonic solution, isotonic solution, or specialty conductive solution (e.g. calcium, silver, etc) that compounds the treatment effect.

In some embodiments, the liquid electrode is comprised of a conductive solution that is disposed within the one or more energy delivery bodies 108. For example, in some embodiments, the energy delivery body 108 comprises a braided wire electrode forming a basket shape and a porous expandable member (e.g. a balloon with laser-drilled holes) that is disposed within the braided wire electrode basket. Inflation of the expandable member deploys the braided wire electrode basket and allows the conductive solution to weep from the porous expandable member. In a blood-filled environment, the blood will interact with the conductive solution weeping from the porous expandable member, thereby creating a virtual electrode. Thus, in some embodiments, the conductive solution forms the second pole of the electrical circuit to create a bipolar electrode configuration.

In another embodiment, a second pole electrode is added to the distal tip of the catheter to act as the return pole of the bipolar circuit. The second pole electrode may be comprised of any suitable conductive material, such as a platinum metal tip. In a blood-filled environment, blood therearound will interact with the second pole electrode thereby turning the local blood into a virtual electrode to complete the circuit. These embodiments allow for localized bipolar delivery of energy for treatment of tissue while diminishing effects on the integrity of adjacent structures.

The delivered energy treats the abnormal or diseased tissue as appropriate. In the case of cancer, the cancerous cells are destroyed, eliminated, killed, removed, etc., while maintaining non-cancerous, non-cellular elements, such as collagen, elastin, and matrix proteins. These non-cellular elements maintain the structure of the walls of the luminal structures (e.g. vagina, endocervical canal, uterus, fallopian tubes, etc.) while allowing for and encouraging normative cellular regeneration. Therefore, the integrity and mechanical properties of the luminal structures are maintained while abnormal or diseased cells and tissues are sufficiently eliminated. It may be appreciated that in some instances, the energy kills the cells directly, such as via accumulated generalized cellular injury and irrecoverable disruption of cellular homeostasis. In other instances, the energy encourages macromolecule uptake in the targeted cells for gene, drug or other bioactive compound transfection. This treatment may also utilize a combination of these effects, such as directly killing the most superficial cells while rendering the deeper targeted cells more susceptible to treatment or effects from the uptake of some adjuvant material.

After treatment, the catheter 102 is then removed from the reproductive tract. In some instances, the patient will not need follow up treatment. In other instances the treatment may be repeated or other types of treatment may be utilized, such as resection or tumors (e.g. which are now operable due to the treatment).

It may be appreciated that the methods and devices described herein may be used or modified to achieve a variety of treatment goals. Such treatment may be used to restore function to the tissue, with or without debulking of the tissue. Such treatment may be used to reduce or eliminate pain. Such treatment may be the sole treatment or may be used in combination with other treatments, such as surgery, other energy modalities, pharmacologic-based therapeutics and other approaches, such as to address remaining tissue regions. For example, such treatment may be undertaken in advance of a resection or ablation treatment, such as 2 hours prior, 1 day prior, 3 days prior, 7 days prior, 14 days prior, 28 days prior 60 days prior, 90 days prior or more. Alternatively, such treatment may be undertaken during the same procedure as resection or ablation treatment as well as after surgical resection and/or debulking. It may be appreciated that such treatment may occur over a single session or achieved over a series of multiple treatment deliveries.

Thus, the approach is minimally invasive, quickly and easily executable, and has relatively low sensitivity to electrode placement (e.g. when utilizing monopolar arrangements) therefore allowing technicians of various skill levels to achieve high levels of consistency as well as successful outcomes. In some embodiments, the monopolar arrangement is possible without the need for muscular paralytics due to the waveform characteristics of the energy used. This can mitigate muscle contractions from motor neuron and skeletal muscle depolarization to an acceptable level, with or without a neuromuscular paralytic. It may be appreciated that paralytics may optionally be used depending on the type of energy and the depth of penetration desired.

In some embodiments, the energy delivery catheter 102 is configured to provide focal therapy, such as according to international patent application number PCT/US2018/067504 titled "OPTIMIZATION OF ENERGY DELIVERY FOR VARIOUS APPLICATIONS" which claims priority to Provisional Patent Application No. 62/610,430 filed Dec. 26, 2017 and U.S. Provisional Patent Application No. 62/693,622 filed Jul. 3, 2018, all of which are incorporated herein by reference for all purposes. This may be particularly the case in reference to embodiments of FIGS. 6A-6D and FIGS. 11A-11B.

It may be appreciated that in some embodiments focal therapy is utilized to treat diseased tissue that is not localized but has surrounded a majority or all of the tissue surrounding the electrodes. In such instances, energy may be delivered to the entire diseased region in segmental sections, either circumferentially or longitudinally, such as by energizing various electrodes in a predetermined pattern and/or with a predetermined pattern of energy parameters. It may also be appreciated in some embodiments various electrodes are energized at differing voltage levels with respect to a dispersive (return) electrode 140 applied externally to the skin of the patient P. Manipulation of the voltage levels manipulates the electric field distribution, thus shaping the treatment area.

Extra-Luminal Placement and Energy Delivery

FIGS. 13A-13B illustrate another embodiment of a treatment system 100. Here, the system 100 is configured to treat target tissue that is located at least partially outside of a body lumen, such as near the vagina V, cervix C, uterus U and fallopian tubes F, wherein treatment may benefit from originating the treatment energy outside of the body lumen. This may be particularly suitable for treating cervical carcinoma in situ (CIS) or various tumors, masses, growths, fibroids, abnormal tissue, undesired tissue, etc., within or accessible from the reproductive tract. Likewise, this may be particularly suitable for treating tissue that is beyond the penetration depth of the delivery methods described herein above and/or would benefit from originating at least some of the energy beyond the lumen.

FIGS. 13A-13B illustrate a system 100 comprising an energy delivery catheter 102 connectable with a generator 104. It may be appreciated that many of the system components described above are utilized in this embodiment of the system 100, such as particular aspects of the catheter 102, generator 104 and other accessories. Therefore, such description provided above is applicable to the system 100 described herein below. The main differences are related to the energy delivery body 108.

Here, the catheter 102 comprises a shaft 106 having a distal end 103, a proximal end 107 and at least one lumen 105 extending at least partially therethrough. Likewise, the catheter 102 also includes at least one energy delivery body 108. In this embodiment, an energy delivery body 108 has the form of a probe 700 that is disposed within the lumen 105 of the shaft 106. The probe 700 has a probe tip 702 that is advanceable through the lumen 105 and extendable from the distal end 103 of the shaft 106 (expanded in FIG. 13A to show detail). In this embodiment, the tip 702 has a pointed shape configured to penetrate tissue, such as to resemble a needle. Thus, in this embodiment, the probe tip 702 is utilized to penetrate the lumen wall W and surrounding tissue so that it may be inserted into the target tissue external to the body lumen. Thus, the probe 700 has sufficient flexibility to be endoluminally delivered yet has sufficient column strength to penetrate the lumen wall W and target tissue. In some embodiments, the catheter 102 has markings to indicate to the user the distance that the probe tip 702 has been advanced so as to ensure desired placement.

In some embodiments, the probe extends from the distal end 103 of the shaft 106 approximately less than 0.5 cm, 0.5 cm, 1 cm, 2 cm, 3 cm, 4 cm, 5 cm, 6 cm, 7 cm, 8 cm or more than 8 cm. In some embodiments, the probe extends 1-3 cm or 2-3 cm from the distal end of the shaft 106. In some embodiments, the probe is 18 gauge, 19 gauge, 20 gauge, 21 gauge, 22 gauge, 23 gauge, 24 gauge, or 25 gauge. In some embodiments, the probe 700 is comprised of a conductive material so as to serve as an electrode. Thus, the electrode would have the size of the exposed probe. Example materials include stainless steel, nitinol, cobalt-chromium alloy, copper, and gold. Thus, in these embodiments, the PEF energy is transmittable through the probe 700 to the probe tip 702. Consequently, the shaft 106 is comprised of an insulating material or is covered by an insulating sheath. Example insulating materials include polyimide, silicone, polytetrafluoroethylene, and polyether block amide. The insulating material may be consistent or varied along the length of the shaft 106 or sheath. Likewise, in either case, the insulating material typically comprises complete electrical insulation. However, in some embodiments, the insulating material allows for some leakage current to penetrate.

When the probe 700 is energized, the insulting shaft 106 protects the surrounding tissue from the treatment energy and directs the energy to the probe tip 702 (and any exposed portion of the probe 700) which is able to deliver treatment energy to surrounding tissue. Thus, the tip 702 acts as a delivery electrode and its size can be selected based on the amount of exposed probe 700. Larger electrodes can be formed by exposing a greater amount of the probe 700 and smaller electrodes can be formed by exposing less. In some embodiments, the exposed tip 702 (measured from its distal end to the distal edge of the insulating shaft) during energy delivery has a length of 0.1 cm, 0.2 cm, 0.3 cm, 0.4 cm, 0.5 cm, 0.6 cm, 0.7 cm, 0.8 cm, 0.9 cm, 1 cm, 2 cm, 3 cm, greater than 3 cm, up to 8 cm, less than or equal to 0.1 cm, less than or equal to 0.3 cm, less than or equal to 0.5 cm, less than or equal to 1 cm, 0.2-0.3 cm, 0.1-0.5 cm, 0.1-1 cm, and all ranges and subranges therebetween. In addition to changing the size of the electrode, the tip 702 is retractable into the shaft 106 to allow for atraumatic endoscopic delivery and is then advanceable as desired to reach the target tissue. In this embodiment, advancement and retraction are controlled by an actuator 732 (e.g. knob, button, lever, slide or other mechanism) on a handle 110 attached to the proximal end 107 of the shaft 106. It may be appreciated that the shaft 106 itself may be advanced toward the target tissue, with or without advancing the probe from the distal end 103 of the shaft 106. In some embodiments, the distal end of the shaft 106 is advanced up to 20 cm into the tissue, such as from an external surface of a luminal structure or from an external surface of the body of the patient.

The handle 110 is connected to the generator 104 with the use of a specialized energy plug 510. The energy plug 510 has a first end 512 that connects to the handle 110 and a second end 514 the connects to the generator 104. The connection of the first end 512 with the handle 110 is expanded for detail in FIG. 16B. In this embodiment, the first end 712 has an adapter 716 that includes a connection wire 718 extending therefrom. The connection wire 718 is insertable into the proximal end of the probe 700 within the handle 110. This allows the energy to be transferred from the generator 104, through the connection wire 718 to the probe 700. Thus, the probe 700 is able to be electrified throughout its length, however only the exposed tip 702 delivers energy to the tissue due to the presence of the insulated shaft 106.

Figure 14A:
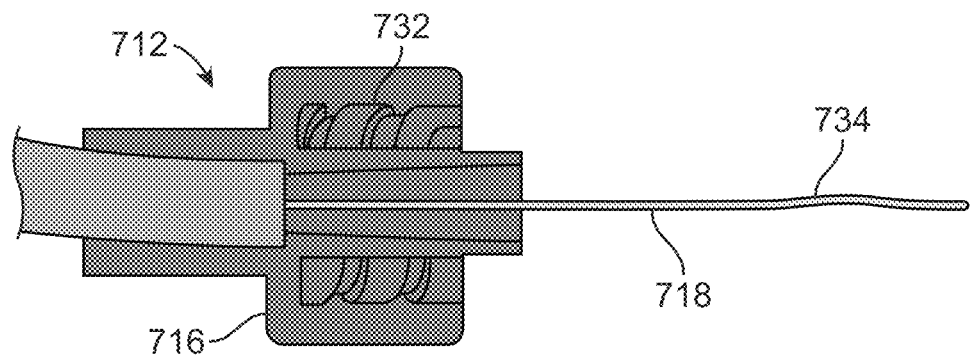
FIGS. 14A-14C illustrate an example of the connection between the energy plug and the handle.
Figure 14B:
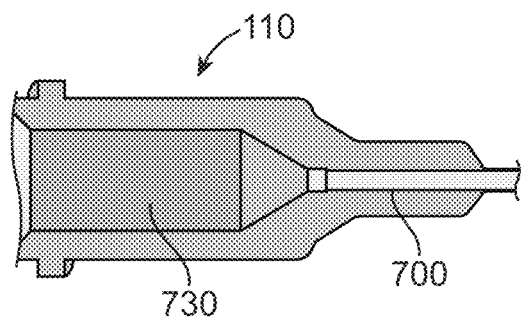
Figure 14C:
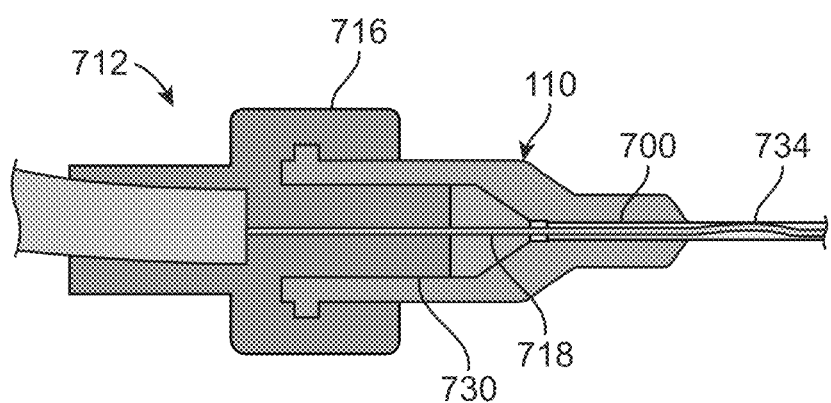

FIGS. 14A-14C illustrate an example of the connection between the energy plug 510 and the handle 110. As mentioned previously, in this embodiment, the first end 712 of the energy plug 710 has an adapter 716 that includes a connection wire 718 extending therefrom. The connection wire 718 is conductive and is typically comprised of copper, aluminum, stainless steel, or nitinol. Thus, energy from the generator 104 is able to be transmitted from the generator 104, through the plug 710 and to the connection wire 718. In this embodiment, the adapter 716 is joinable with the handle 110 so that the connection wire 718 is inserted into the handle 110. As illustrated in FIGS. 14A-14B, the handle 110 has a cavity 730 into which the connection wire 718 is insertable. The cavity 730 guides the connection wire 718 into the proximal end of the probe 700, wherein the probe 700 has a hollow configuration, at least near its proximal end, so as to receive the connection wire 718. As the connection wire 718 is advanced into the probe 700, the adapter 716 engages with the handle 110. In this embodiment, the adapter 716 has threads 732 so as to hold the handle 110 in engagement, as illustrated in FIG. 14C. In this embodiment, the connection wire 718 includes at least one bend or kink 734. Therefore, when the connection wire 718 is coaxially positioned within the probe 700, the kink 734 draws the connection wire away from the coaxial axis and contacts the probe 700. It is this contact that allows the energy to be transmitted from the connection wire 718 to the probe 700.

Figure 15B:
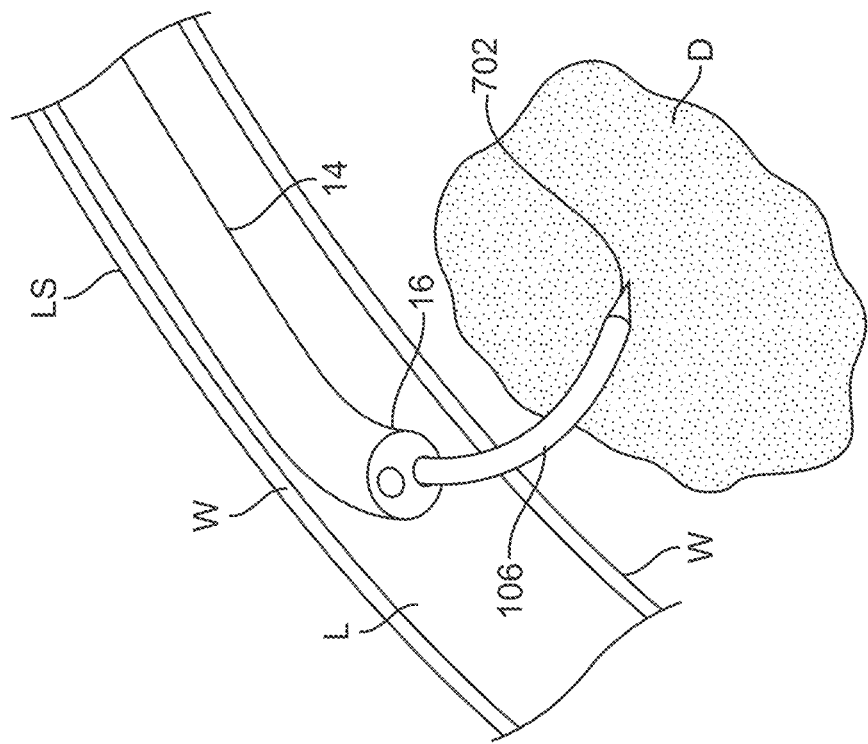
FIGS. 15A-15C illustrate an example method of extra-luminal treatment.
Figure 15A:
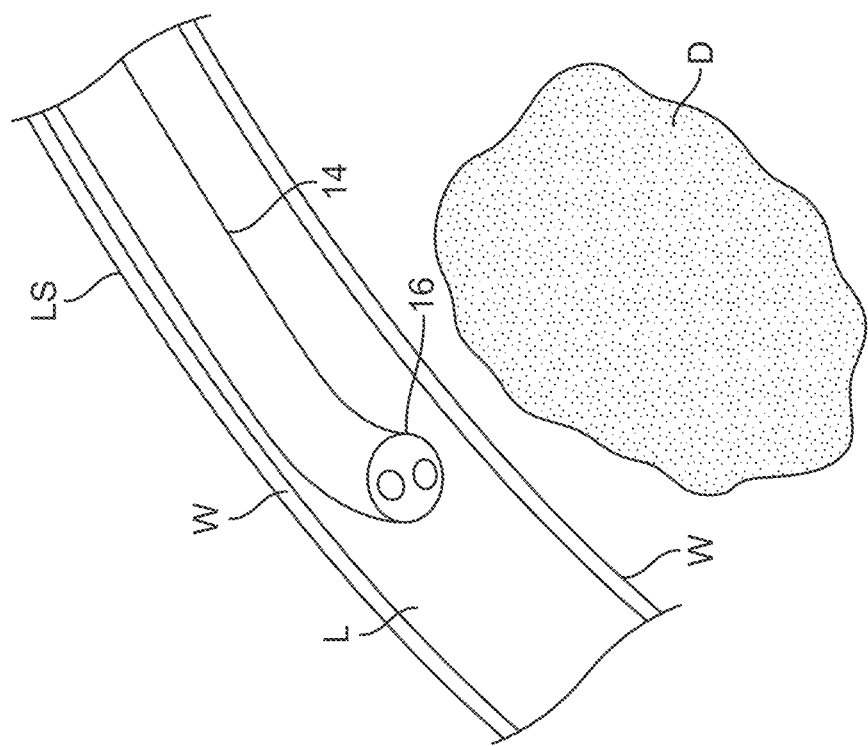
Figure 15C:
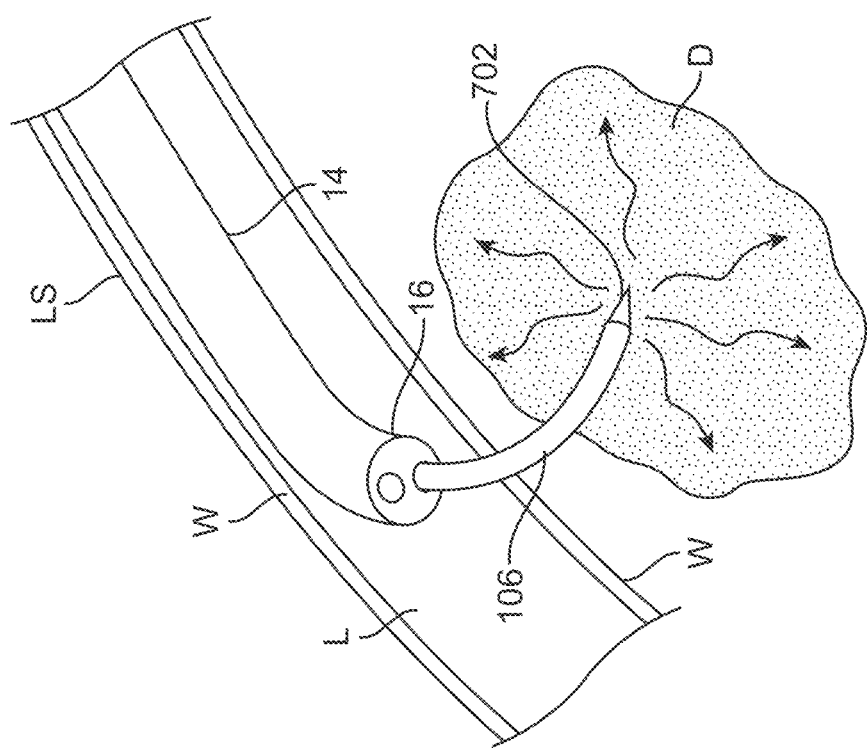

FIGS. 15A-15C illustrate an example method of treatment. FIG. 15A illustrates abnormal or diseased tissue D, such as a tumor, near a luminal structure LS. In this example, the diseased tissue D is near the luminal structure LS but spaced a distance from the lumen wall W. This luminal structure LS is used to access and the diseased tissue D and extra-luminally treat the diseased tissue D near the luminal structure LS. In this embodiment, the elongate insertion tube 14 of an endoscope 10 is advanced into the luminal structure LS and its distal tip 16 is steered toward the lumen wall W, beyond which lies the diseased tissue D. Once desirably positioned, the treatment catheter 102 is advanced through a lumen in the insertion tube 14 so that the distal end 103 of the shaft 106 extends beyond the tip 16 of the endoscope 10, as illustrated in FIG. 15B. In this embodiment, the probe tip 702 assists in penetrating the wall W and the shaft 106 is advanced across the wall W until the probe tip 702 is desirably positioned within the diseased tissue D. Referring to FIG. 15C, in this embodiment, the probe tip 702 is then advanced from the shaft 106 so as to create a desired delivery electrode size. Energy is then delivered according to one or more energy delivery algorithms 152, through the probe 700 to the diseased tissue D, as illustrated in FIG. 15C by wavy arrows extending radially outwardly from the probe tip 702. It may be appreciated that the distance into the diseased tissue may vary based on parameter values, treatment times and type of tissue, to name a few. It may also be appreciated that larger or smaller treatment depths may be achieved than illustrated herein.

The delivered energy treats the diseased tissue D as appropriate. In the case of cancer, the cancerous cells are destroyed, eliminated, killed, removed, etc., while maintaining non-cancerous, non-cellular elements, such as collagen, elastin, and matrix proteins. These non-cellular elements maintain the structure of the tissue allowing for and encouraging normative cellular regeneration. Likewise, any energy reaching the walls W of the nearby luminal structure LS preserve the integrity and mechanical properties of the luminal structure LS. It may be appreciated that in some instances, the energy kills the cells in the diseased tissue D directly, such as via accumulated generalized cellular injury and irrecoverable disruption of cellular homeostasis. Any remaining diseased tissue may then be surgically removed or removed by other methods that are typically unable to safely treat tissue close to luminal structures.

Alternative Probe Designs

It may be appreciated that the probe 700 may have a variety of forms and structures. In some embodiments, the probe 700 is hollow, such as having a tubular shape. In such embodiments, the probe 700 may be formed from a hypotube or metal tube. The probe 700 may be provided in a variety of sizes, including 16 gauge to 25 gauge. The probes 700 can be optimized for desired push and torque capabilities, kink performance, compression resistance and flexibility to ensure consistent and reliable steerability to the target treatment site. Likewise, such tubes can include custom engineered transitions, such as laser cutting and skive features, along with optional coatings to optimize produce performance.

Figure 16A:
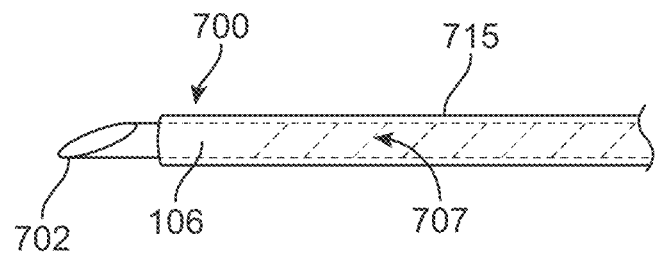
FIGS. 16A-16B illustrates a shaft of a probe having a pattern incorporated into the shaft to provide desired flexibility and steerability, wherein the pattern has a continuous or discontinuous spiral pitch along its length.

FIGS. 16A-16B, 17A-17B illustrate embodiments of a probe 700 having a shaft 106 customized for desired flexibility and steerability while maintaining desired push and torque capabilities. FIG. 16A illustrates a shaft 106 comprising a tube having a pattern 707 incorporated into the shaft 106 to provide such handling properties. In some embodiments, the tube is comprised of metal and the pattern 707 is laser cut or etched. In this embodiment, the pattern 707 comprises a spiral, wrapping around circumference of the tube. Likewise, in this embodiment, the pitch of the spiral is consistent throughout the length of the pattern 707.

Figure 16B:
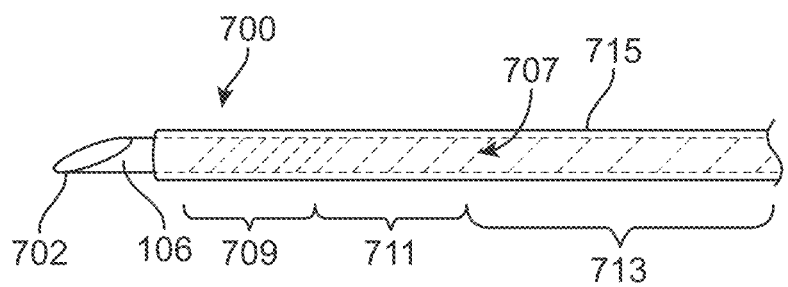

FIG. 16B illustrates as shaft 106 having a pattern 707 that varies along its length. In this embodiment, the pattern 707 also comprises a spiral, wrapping around the circumference of the tube. However, in this embodiment, the pitch of the spiral varies throughout the length of the pattern 707. In particular, in this embodiment the pattern 707 is comprised of three sections, each section having a different pitch. A first section 709 has a first pitch, a second section 711 has a second pitch and a third section 713 has a third pitch. Here, the second section 711 has a larger pitch than the first section 709 and the third section 713 has a larger pitch than the second section 709. Likewise, in this embodiment, the sections 709, 711, 713 are adjacent to each other such that the pattern 707 may be comprised of a continuous spiral. However, it may be appreciated that two or more sections may be spaced apart so that the pattern is comprised or more than one spiral cut. Likewise, the pitches may vary in various combinations, including repeated spacing in non-adjacent sections.

It may be appreciated that in some embodiments, the shaft 106 is at least partially covered by an insulation layer 715. FIGS. 16A-16B illustrate an insulation layer 715 comprising a heat-shrink polymer tubing disposed around the shaft 106, leaving the probe tip 702 exposed for transmission of energy. The insulation layer 715 seals over the laser cut pattern and serves as electrical insulation. The size of the exposed tip 702 may be varied by altering the insulation layer 715 to obtain the desired electrode size for transmission of energy.

In some embodiments, the shaft 106 comprising a tube having braiding 721 incorporated into the shaft 106 to provide desired handling properties. Typically, the braid material is comprised of stainless steel. The braid material can be comprised of round wire or flat wire. The PIC count provides the per inch crosses (PIC) of the braid. Higher PIC counts improve flexibility, while a lower PIC count increases longitudinal stiffness. The PIC count can be varied within a specific length to provide variable flexibility. This can also be achieved via selective removal of various layers of the tube, such as polymer layers. In some embodiments, the tube is comprised of various layers, such as a polytetrafluoroethylene (PTFE) inner liner, an adjacent polyimide layer, an adjacent a braided layer, another polyimide layer and an outer Pebax sheath.

Figure 17A:
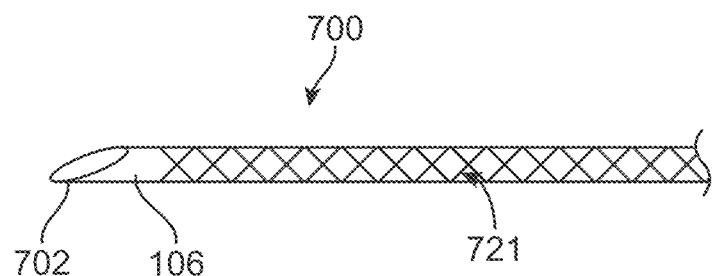
FIGS. 17A-17B illustrates a shaft of a probe having a braid incorporated into the shaft, wherein the braid has a consistent or variable PIC count along its length.
Figure 17B:
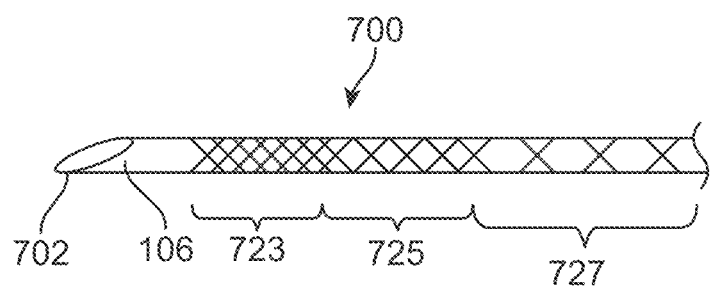

FIG. 17A illustrates a shaft 106 comprising a tube having such a braid 721 incorporated into the shaft 106. Here the braid 721 is uniform along its length having a consistent PIC count. FIG. 17B illustrates as shaft 106 having a braid 721 that varies along its length. In this embodiment, the PIC count varies along three sections, each section having a different pitch. A first section 723 has a first PIC count, a second section 725 has a second PIC count and a third section 727 has a third PIC count. Here, the second section 725 has a larger PIC count than the first section 723 and the third section 729 has a larger PIC count than the second section 725. Likewise, in this embodiment, the sections 723, 725, 727 are adjacent to each other such that the braiding is continuous. However, it may be appreciated that two or more sections may be spaced apart so that non-braided sections are interspersed between braided sections. Likewise, the PICs may vary in various combinations, including repeated PIC types in non-adjacent sections.

It may be appreciated that the probe tip 702 may have a variety of shapes and styles, including a lancet, Chiba (two-part hollow needle with a beveled tip angled at 30 degrees) or pencil tip (atraumatic) design. In some embodiments, the probe shaft has a sharp point with multiple cutting edges to form the probe tip 702. In other embodiments, the tube has a blunt atraumatic tip. In some embodiments, the probe 700 is solid, such as having a rod shape. These probes can also be optimized and customized similarly to hypotubes. In some embodiments, the solid probe 700 has a sharp point with a symmetric or asymmetric cut to form the probe tip 702. In other embodiments, the solid probe 702 has a blunt atraumatic tip.

Figure 18A:
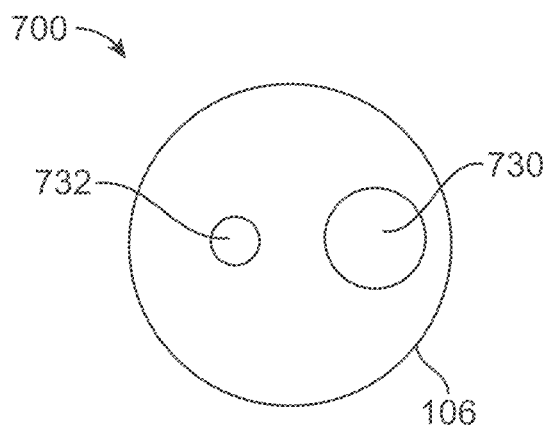
FIGS. 18A-18B illustrate cross sections of embodiments of probe shafts 106 having lumens for fluid transport.
Figure 18B:
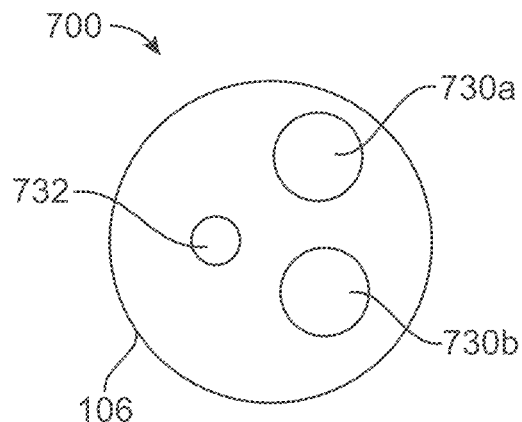
Figure 18C:
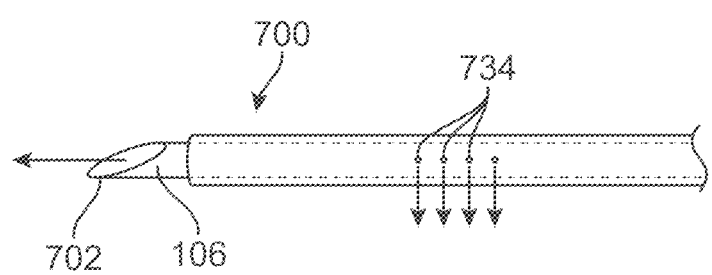
FIG. 18C illustrates a probe shaft having a plurality of ports for liquid delivery or suction.
Figure 18D:
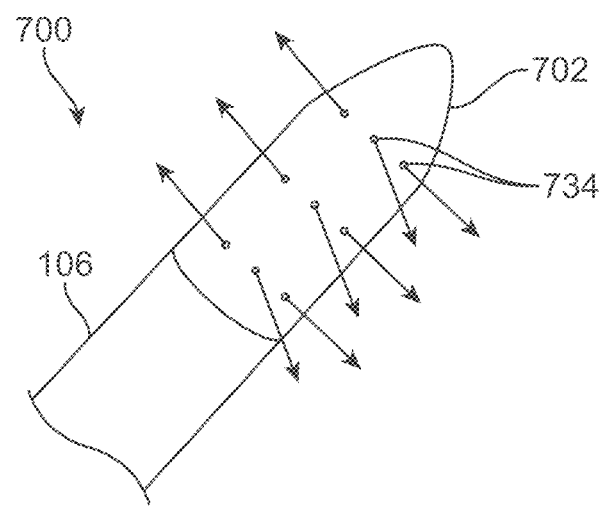
FIG. 18D illustrates a probe tip having a plurality of ports for liquid delivery or suction.

It may be appreciated that the probe 700 may include a lumen for delivery of fluids or agents. Such a lumen may be internal or external to the probe. FIGS. 18A-18B illustrate cross sections of embodiments of probe shafts 106. FIG. 18A illustrates a probe 700 having a shaft 106 that includes a single lumen 730 for transport of fluid. Such transport may be delivery and/or suction. A conduction wire 732 is also shown. FIG. 18B illustrates a probe 800 having a shaft 106 that includes a two lumens 730a, 730b for transport of fluid. Thus, two different fluids may be delivered, each through a different lumen. Or, one lumen may be used for delivery while the other lumen is used for suction. It may be appreciated that various combinations may be utilized. A conduction wire 732 is also shown. The fluid or agents may be delivered directly from the shaft 106, such as through an internal lumen and out one or more ports 734 located along the shaft 106 or out the probe tip 702, as illustrated in FIG. 18C. In some embodiments, as illustrated in FIG. 18D, the probe tip 702 includes a plurality of ports 734, such as micro-ports, which allow the fluid to be delivered in a uniform and pervasive radial pattern.

Figure 19A:
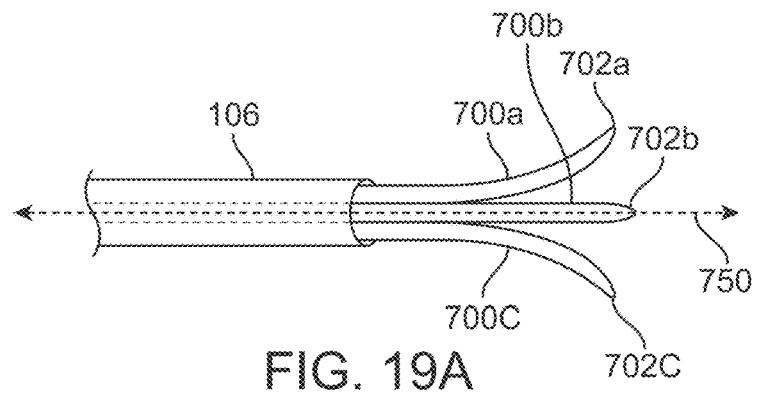
FIG. 19A illustrates an embodiment of a probe having three probe elements, each having a respective probe tip.

In some embodiments, the probe 700 is comprised of multiple probe elements, wherein each probe element has similar features and functionality to an individual probe 700 as described above. Thus, in some embodiments they may be considered separate probes, however for simplicity they will be described as probe elements making up a single probe 700 since they are passed through the same shaft 106 of the catheter 102. FIG. 19A illustrates an embodiment having three probe elements 700*a*, 700*b*, 700*c*, each having a respective probe tip 702*a*, 702*b*, 702*c*. The probe elements 700*a*, 700*b*, 700*c* extend from the shaft 106 in varying directions from a central axis 750, for example along the axis 750 and curving radially away from the axis 550 in opposite directions. This allows the tips 702*a*, 702*b*, 702*c* to be positioned in an array of locations throughout an area of diseased tissue D. Consequently, a larger ablation zone can be created. This may be desired when the area of diseased tissue D is larger, when treating multiple targets or when a target has imprecise location information. It may be appreciated that the probe elements 700*a*, 700*b*, 700*c* may be deployed independently or simultaneously. Likewise, the tips 702*a*, 702*b*, 702*c* may be energized independently or simultaneously. The energy delivered by the tips 702*a*, 702*b*, 702*c* may be provided by the same energy delivery algorithm 152 or different energy delivery algorithms 152, therefore delivering the same or different energies. The probe elements 700*a*, 700*b*, 700*c* may function in a monopolar manner or in a bipolar manner between pairs of probe elements. Likewise, it may be appreciated that the probe elements 700*a*, 700*b*, 700*c* may function in a combination of monopolar and bipolar manners.

Figure 19B:
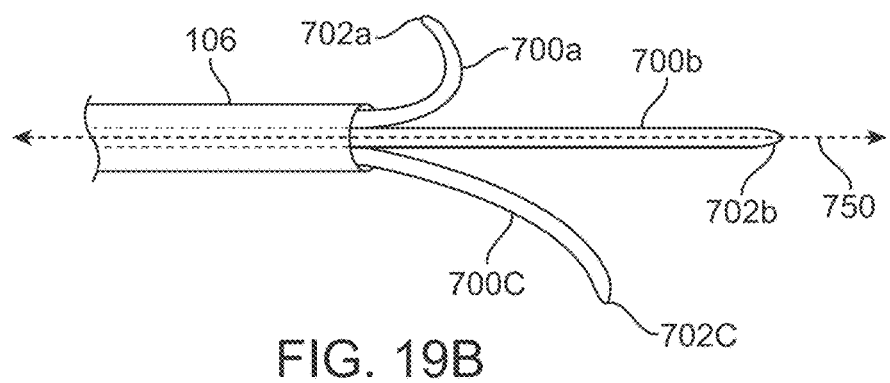
FIG. 19B illustrates an embodiment of a probe having probe elements that extended different distances from the shaft and have the different curvatures.

It may be appreciated that any number of probe elements may be present, including one, two, three, four, five, six, seven, eight, nine, ten or more. Likewise, the probe elements may be extended the same or different distances from the shaft 106 and may have the same or different curvatures. In FIG. 19B, three probe elements 700*a*, 700*b*, 700*c* are illustrated extending different distances from the shaft 106, wherein one probe element 700*a* is extended the shortest distance, another probe element 700*b* is extended the furthest distance and yet another probe element 700*c* is extended therebetween. These probe elements 700*a*, 700*b*, 700*c* also are illustrated as having different curvatures, extending radially outwardly from the central axis 750. Here, the one probe element 700*a* has the greatest curvature, the another probe element 700*b* has no curvature and the yet another probe element 700*c* has a curvature therebetween. In another embodiment, the probe elements to not have any curvature and exit from the shaft 106 in a linear fashion. Typically, the probe elements are pre-curved so that advancement of the probe tip from the shaft 106 allows the probe element to assume its pre-curved shape. Thus, in some embodiments, a variety of curvatures can be utilized by advancing the probe tips differing amounts from the shaft 106.

Figure 19C:
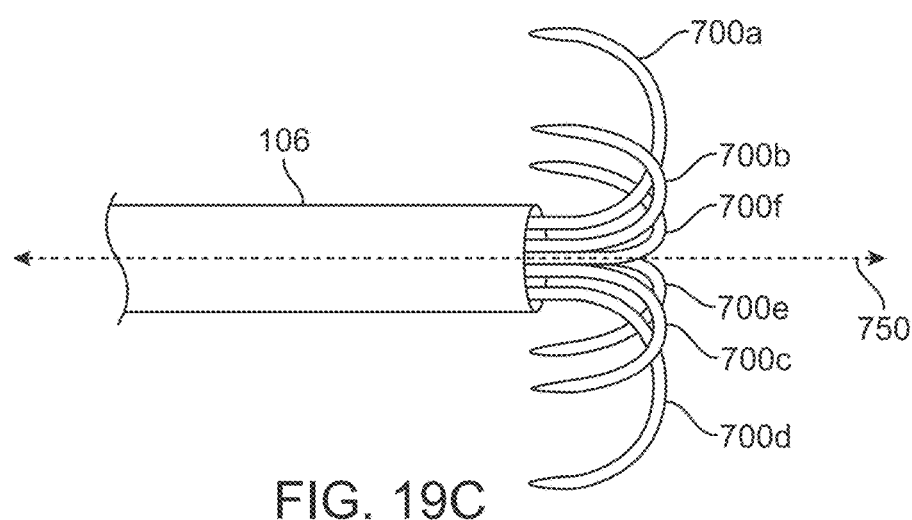
FIG. 19C illustrates an embodiment of a probe having probe elements curve that radially outwardly in a flower or umbrella shape.

In some embodiments, the probe elements curve radially outwardly in a flower or umbrella shape, as illustrated in FIG. 19C. Here, a plurality of probe elements 700*a*, 700*b*, 700*c*, 700*d*, 700*e*, 700*f* extend radially outwardly from the central axis 750 in a flower shape and curve around so that their respective tips are ultimately oriented in a proximal direction. In some embodiments, the elements 700*a*, 700*b*, 700*c*, 700*d*, 700*e*, 700*f* are of equal length and are equally spaced to form a symmetrical arrangement. In other embodiments, the elements 700*a*, 700*b*, 700*c*, 700*d*, 700*e*, 700*f* have differing lengths and/or have differing spacing to form a myriad of arrangements.

Figure 19D:
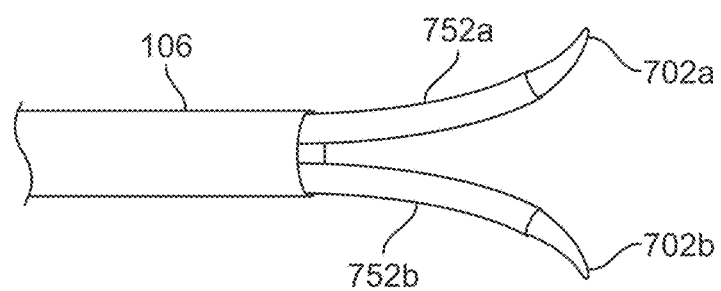
FIG. 19D illustrates an embodiment of a probe comprising two probe elements extending from a shaft wherein each probe element is at least partially covered by a respective insulating sheath, leaving the tips exposed.

It may be appreciated that the size of the probe tip 702 capable of transmitting energy may be further adjusted with the use of an insulating sheath 752 that extends at least partially over the probe. As mentioned previously, the size of the active portion of the probe tip 702 may be adjusted based on its extension from the shaft 106. However, this may be further refined, particularly when a plurality of probe elements are present, with the use of insulating sheaths 752 covering portions of the individual probe elements. FIG. 19D illustrates an embodiment of a probe comprising two probe elements 700*a*, 700*b* extending from a shaft 106. Here, each probe element 700*a*, 700*b* is at least partially covered by a respective insulating sheath 752*a*, 752*b*, leaving the tips 702*a*, 702*b* exposed. In some embodiments, the sheaths 752*a*, 752*b* are individually advanceable so that the size of each probe tip 702*a*, 702*b* is individually selectable. This may be beneficial when the tips 702*a*, 702*b* are deployed into different portions of the target tissue desiring different amounts of energy delivery. This may also be beneficial when delivering a concentration of energy to a location that is at an angular distance from the central axis of the shaft 106. Together, the ability to vary the number of probe elements, the shape and length of the probe elements, the arrangement of the probe elements and the size of the delivery area on the probe tips, allows for a wide variety of lesion shapes, sizes and intensities to be formed.

It may be appreciated that any of the probe elements described herein may have the same structure and features as any of the probes describe herein. For example, the probe elements may be constructed of the same materials, have the same functionality and have a sharp or atraumatic tip. Likewise, it may be appreciated that any of the probe elements may be deployed independently or simultaneously and may be energized independently or simultaneously. The energy delivered may be provided by the same energy delivery algorithm 152 or different energy delivery algorithms 152, therefore delivering the same or different energies. Any of the probe elements may function in a monopolar manner or in a bipolar manner between pairs of probe elements. Likewise, it may be appreciated that the probe elements may function in a combination of monopolar and bipolar manners.

As stated previously, in many of these extra-luminal delivery embodiments, the energy delivery body 108 has the form of a probe 700 that is disposed within the lumen 105 of the shaft 106. In some embodiments, the probe 700 comprises a plurality of wires or ribbons 120 and forms a basket 755 serving as an electrode, as illustrated in FIG. 20. It may be appreciated that alternatively the basket 755 can be laser cut from a tube. It may be appreciated that a variety of other designs may be used. Typically, the basket 755 is delivered to a targeted area in a collapsed configuration and then expanded for use. Such expansion can form the basket 755 into an oblong shape, an oval or elliptical shape, a round shape or a disk shape, to name a few. In some embodiments, the basket 755 is configured to form a disk shape, as illustrated in FIG. 21 (side view). In this embodiment, probe 700 comprises both a disk-shaped basket 755 and a pointed probe tip 702, wherein the probe tip 702 is concentric to the disk-shaped basket 755. Such arrangement may assist in creating larger lesions. For example, FIG. 22A illustrates an embodiment of a probe tip 702 positioned within a target tissue area A. Energy transmitted from the probe tip 702 creates a first ablation zone Z1 surrounding the tip 702. In this example, the first ablation zone Z1 is smaller than the target tissue area A. However, with the addition of the disk-shaped basket 755, as illustrated in FIG. 22B, energy is also delivered from the basket 755 forming a second ablation zone Z2 that is larger than the first ablation zone Z1. In some embodiments, the first and second ablation zones Z1, Z2 overlap so that the first ablation zone Z1 resides entirely within the second ablation zone Z2. This provides an additive effect of the two ablations within the first ablation zone Z1. In other embodiments, the disk-shaped basket 755 delivers energy only or primarily from its outer perimeter or rim, such as by insulating or masking the central region of the basket 755. In such embodiments, the first ablation zone Z1 and the second ablation zone Z2 do not substantially overlap. When the energy provided by the basket 755 and the probe tip 702 are the same, this arrangement may allow an even expansion of the first ablation zone Z1 to the size of the second ablation zone Z1 (i.e. forming a consistent lesion). When the energy provided by the basket 755 and the probe tip 702 are different, this may allow different types of lesions to be formed in the first ablation zone Z1 and the second ablation zone Z2.

It may be appreciated that in some embodiments, the probe 700 may include two or more baskets 755 that are spaced apart so as to allow target tissue to be positioned therebetween. In such instances, energy can be delivered from the two or more baskets 755 in a monopolar fashion, or in a bipolar fashion wherein two baskets have opposite polarities so that energy is transferred between them, treating the tissue therebetween.

It may be appreciated that in some embodiments, the probe 700 is fixed in relation to the shaft 106. Likewise, in some embodiments, the probe 700 does not extend throughout the length of the shaft 106. For example, in some embodiments, the probe 700 is shortened and resides near the distal end 103 of the shaft 106 where a probe tip 702 extends from the shaft 106. In such embodiments, energy is transmitted to the shortened probe 700 by a conductive wire or other apparatus that extends through the shaft 106 to the shortened probe 700. In some instances, this may allow the shaft 106 to have altered physical characteristics, such as increased flexibility.

Figure 23:
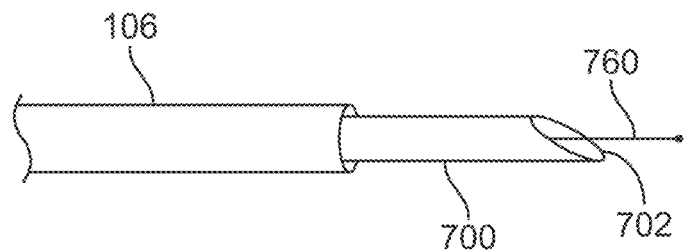
FIG. 23 illustrates an energy delivery body comprising a conductive element passing through a probe and extending therefrom.

It may be appreciated that, in some embodiments, the energy delivery body 108 comprises conductive element 760, such as a wire or filament, that passes through the probe 700 and extends therefrom, such as illustrated in FIG. 23. In this embodiment, the probe 700 is not conductive and simply provides a tip 702 to assist in penetrating tissue and to deliver the conductive element 760. It may be appreciated that the conductive element 760 has suitable strength to be advanced beyond the probe tip 702 so as to be inserted into target tissue. Energy is delivered from the generator 104 to the conductive element 760 which delivers the energy to the tissue. In some embodiments, the conductive element 760 has a length 0.5 cm, 0.5 cm, 1 cm, 2 cm, 3 cm, 1-3 cm, 2-3 cm or greater than 3 cm from the probe tip. In some embodiments, the conductive element 560 has a diameter of 0.010 inches, 0.011 inches, 0.012 inches, 0.013 inches, 0.014 inches, 0.015 inches. Use of such a conductive element 560 may be beneficial when higher concentrations of energy are desired to be delivered at a particular tissue location.

It may be appreciated that in some embodiments, the catheter 102 does not include a probe 700 and the one or more electrode bodies 108 are mounted on or integral with the shaft 106. In such embodiments, the one or more electrode bodies 108 may have the form of a band electrode, a basket electrode, or any other suitable shaped electrode. In such embodiments, the shaft 106 is advanced into the target tissue and energy is delivered from the one or more electrode bodies 108.

Manipulation of Catheter and Visualization

As described herein above, the catheter 102 is typically delivered through an endoscope 10 or other delivery device which is steered through the luminal structures by conventional methods. This may culminate in positioning one or more energy delivery bodies 108 within a body lumen (intra-luminal placement) or positioning one or more energy delivery bodies 108 outside of a body lumen (extra-luminal placement). In either case, the shaft 106 of the catheter 102 is advanced from the endoscope or delivery device to its desired position. Such positioning may be achieved manually, such as with manual manipulation of the handle 110 (e.g. with one hand or two), and/or positioning may be controlled or assisted with a variety of mechanisms, such as electromechanical servo-based controls (e.g. robotics), actuated through the handle 110 or the user interface 150.

In some embodiments, the distal end 103 of the shaft 106 may be steered in one or more planes. This includes side to side movement, up and down movement or angular movement in relation to a central longitudinal axis of the shaft 106 as it exits the endoscope or delivery device. In some embodiments, the distal end 103 of the shaft 106 is able to rotate in relation to the endoscope or delivery device. As mentioned, such steering may be achieved manually or with electromechanical controls, either via the handle 110 and/or the user interface 150. Likewise, in embodiments having probes and/or probe elements, the probes/probe elements may be advanced, steered, manipulated or positioned in a similar manner, either independently or simultaneously in relation to each other and/or in relation to the shaft 106.

Steering and positioning of the shaft 106 can be assisted by a variety of design features. For example, in some embodiments, flexibility of the shaft 106 is enhanced through a series of designed cuts along its length. Such cuts may vary along the length to incur variance in flexibility, such as increased flexibility along the distal end 103 of the shaft 106. Likewise, the probe 700 itself may be enhanced for flexibility, such as having notches machined along its length to confer additional steerability or flexibility. This may be particularly the case with the use of solid probes 700.

Typically, the catheter 102 is visualized within the body during placement with the use of one or more visualization systems including but not limited to white light visualization from the endoscope, ultrasound visualization from the endoscope or external ultrasound system, fluoroscopy, cone beam computed tomography, or any other X-Ray visualization system. In some embodiments, the catheter 102 has an integrated or embedded electromagnetic (EM) sensor that provides tracking in electromagnetic fields. In other embodiments, the catheter 102 has an integrated or embedded sensing system that measures changes in shaft shape such as Fiber-Bragg Grating sensor. In other embodiments, the catheter 102 and/or energy delivery body 108 is coated with an echogenic coating that allows for enhanced visualization in ultrasound fields. In other embodiments, the catheter 102 has surface preparation or treatments that allows for enhanced visualization in ultrasound fields. In yet other embodiments, the catheter 102 has one or more designs imprinted into its surface that allows for enhanced visualization in ultrasound fields. In still other embodiments, the catheter 102 is enhanced with integrated ultrasound. For example, in some embodiments the shaft 106 includes one or more Piezoelectric Micromachined Ultrasonic Transducers (PMUT), Capacitive Micromachined Ultrasonic Transducers (CMUT) or lead zirconate titanate (PZT)-based ultrasound transducers, such as in an array circumferentially positioned around the shaft 106. In still other embodiments, the catheter 102 is at least partially comprised of metal that is radio-opaque and visible under X-Ray, fluoroscopy, cone beam computed tomography (CBCT), and/or magnetic resonance imaging (MRI). In other embodiments, the shaft is comprised partially of fluoro-visible material such as tungsten powder or paste. In other embodiments, a combination of these sensors, coatings, surface treatments, imprints or materials to enhance visualization.

Methods associated with imaging that can be useful include: (a) detecting diseased target tissue, (b) identifying areas to be treated, (c) assessing areas treated to determine how effective the energy delivery was, (d) assessing target areas to determine if areas were missed or insufficiently treated, (e) using pre- or intra-procedural imaging to measure a target treatment depth and using that depth to choose a specific energy delivery algorithm to achieve tissue effects to that depth, (f) using pre or intra-procedural imaging to identify a target cell type or cellular interface and using that location or depth to choose a specific energy delivery algorithm to achieve tissue effects to that target cell type or cellular interface, and/or (g) using pre-, intra-, or post-procedural imaging to identify the presence or absence of a pathogen with or without the presence of inflamed tissue.

In some embodiments, confocal laser endomicroscopy (CLE), optical coherence tomography (OCT), ultrasound, static or dynamic CT imaging, X-ray, magnetic resonance imaging (MRI), and/or other imaging modalities can be used, either as a separate apparatus/system, or incorporated/integrated (functionally and/or structurally) into the treatment system 100 by either incorporating into the instrument 102 or a separate device. The imaging modality (or modalities) can be used to locate and/or access various sections of target tissue. In some embodiments, the targeted depth of treatment can be measured and used to select a treatment algorithm 152 sufficient to treat to the targeted depth. At least one energy delivery body can then be deployed at the target tissue site and energy delivered to affect the target tissue. The imaging modality (or modalities) can be used before, during, between, and/or after treatments to determine where treatments have or have not been delivered or whether the energy adequately affected the airway wall. If it is determined that an area was missed or that an area was not adequately affected, the energy delivery can be repeated followed by imaging modality (or modalities) until adequate treatment is achieved. Further, the imaging information can be utilized to determine if specific cell types and or a desired depth of therapy was applied. This can allow for customization of the energy delivery algorithm for treating a wide variety of patient anatomies.

In some embodiments, access via a body lumen is visualized with one or more appliances inserted into the body. Likewise, in some embodiments, one or more of a variety of imaging modalities (e.g., CLE, OCT) are used either along with direct visualization, or instead of direct visualization. As an example, a bronchoscope can be delivered via the mouth to allow for direct visualization and delivery of the instrument 102, while an alternate imaging modality can be delivered via another working channel of the bronchoscope, via the nose, or adjacent to the bronchoscope via the mouth. In some embodiments, the imaging modality (e.g., direct visualization, CLE, and/or OCT) is incorporated into the instrument 102 with appropriate mechanisms to connect the imaging modality to either the system generator 104 or commercially available consoles.

Sensing

In some embodiments, one or more sensors are included in the system 100 to measure one or more system or tissue parameters. Example sensors include temperature sensors, impedance sensors, resistance sensors, surface conductance sensors, membrane potential sensors, capacitance sensors, and/or force/pressure sensors, or combinations thereof. Thus, parameters measured by sensors can include impedance, membrane potential or capacitance, and/or temperature, to name a few. Sensors can be used for (a) obtaining a baseline measure, (b) measuring a parameter during the delivery of energy, and/or (c) measuring a parameter following energy delivery, among others.

Sensor information can be used as feedback to the system 100 in order to, as non-limiting examples, determine proper deployment of energy delivery bodies 108, drive a therapeutic algorithm 152, and/or stop energy delivery for safety reasons. Sensors can also be used to sense when an adequate treatment is achieved. An algorithm 152 within the generator 104 can also use the sensed data to automatically titrate the therapeutic algorithm 152 such that the target tissue treatment is achieved. Said another way, one or more parameters and/or aspects of the therapeutic algorithm can be modified based on the sensor data in an iterative manner. For example, in some embodiments, the power and/or energy duration can be increased or decreased based on the sensor data. Thus, in some embodiments, the system 100 includes one or more sensors which may optionally provide real-time information that can be used to modify the treatment during the treatment session. It may be appreciated that in some embodiments, energy delivery bodies 108 having or functioning as electrodes may be used as sensors. These include some probes 700 and probe elements.

In some embodiments, the catheter 102 includes one or more sensors to provide force feedback to the user during positioning of the catheter 102. Example sensors include force sensor based on fiber Bragg grating (FBG). An FBG is a microstructure typically a few millimeters in length that can be photo inscribed in the core of a single mode fiber. The FBG has unique characteristics to perform as a sensor. For example, when the fiber is stretched or compressed, the FBG will measure strain. This happens because the deformation of the optical fiber leads to a change in the period of the microstructure and of the Bragg wavelength. Such force sensors may be constructed to measure force in one, two or three dimensions. It may be appreciated that other types of force sensors may be used. Such force sensors may be used to sense the curvature of the shaft 106 and/or probe 700 during delivery. Or such force sensors may be used to provide a variety of force feedback to assist in advancing or redirecting the catheter during placement of the one or more energy delivery bodies 108.

In some embodiments, the system 100 includes one or more sensors to measure tissue impedance. In some embodiments, such tissue impedance information is used to generate approximate mapping of tissue treatment areas before, during and after treatment. In other embodiments, such tissue impedance information is provided as feedback to the generator 104 during treatment. Thus, the energy delivery algorithm 152 can be modified or a different algorithm 152 can be selected based on the feedback information so as to change the energy delivered. In other embodiments, an alert is provided to the user. In either case, this may be triggered when the tissue impedance crosses a predetermined threshold, optionally for a predetermined period of time.

In some embodiments, impedance measurements can be made prior to, during or after applying energy in order to define which energy delivery algorithm 152 to apply and/or the need to apply additional energy to the target location. In some embodiments, pre-treatment impedance measurements can be used to determine the settings of various signal parameters. In other embodiments, sensors can be used to determine if the energy-delivery algorithm should be adjusted.

In some embodiments, the impedance measurement is performed as follows. A short duration, low voltage signal is delivered to the energy delivery body 108 via a generator (e.g., the generator 104) once positioned at a targeted area within a lung passageway. Based on the measured electrical current feedback received by the generator 104, the generator 104 performs a calculation using the set voltage and actual current to calculate the impedance. The calculated impedance is compared to impedance values that are considered acceptable for the measured impedance. Then, the energy delivery algorithm 152 is modified or tailored based upon the measured impedance. Parameters that can be adjusted include, but are not limited to, voltage, frequency, rest period, cycle count, dead time, packet count or number of packets, or a combination thereof. Thus, a feedback control loop can be configured to modify a parameter of energy delivery based on the measured one or more system or tissue parameters.

In some embodiments, one or more impedance sensors are used to monitor the electrical properties of the tissue. Impedance values can be regarded as an indicator of tissue state. In some embodiments, impedance is measured at different frequencies to provide an impedance spectrum. This spectrum characterizes the frequency dependent, or reactive, component of impedance. Tissue has both resistive and reactive components; these are components of complex impedance. Reactance is the frequency dependent component of impedance that includes tissue capacitance and inductance. Changes in the state of the tissue can result in changes to overall impedance as well as to changes in the resistive or reactive components of complex impedance. Measurement of complex impedance involves the conduction of a low voltage sensing signal between two electrodes. The signal can include but not be limited to a sine wave. Changes in complex impedance, including changes in resistance or reactance, can reflect the state of treated tissue and therefore be used as indicators that treatment is affecting tissue, not affecting tissue, and or that treatment can be complete. Impedance values can also change depending on the contact conditions between the sensors and airway tissue. In this way, sensors can also be used to determine the state of contact between electrodes and the tissue.

In some instances, the generator 104 instructs the user that additional energy delivery at the target location is not needed. Optionally, the generator 104 displays a specific message and/or emits a specific sound alerting the operator as to which energy delivery algorithm 154 has been selected, or that treatment is complete at that target location. Thus, the generator 104 can be configured to automatically select the appropriate algorithm for a particular measured impedance or shut off the delivery of energy signals if the treatment is determined to be completed. Further, impedance or other sensors can be used to determine that a treatment should be automatically stopped due to a safety concern.

In some embodiments, the system 100 includes one or more sensors to measure temperature. Example sensors include a temperature sensor based on fiber Bragg grating (FBG). Sensitivity to temperature is intrinsic to a fiber Bragg grating. In this case, the main contributor to Bragg wavelength change is the variation of the silica refraction index induced by the thermo-optic effect. There is also a lesser contribution from the thermal expansion which alters the period of the microstructure. It may be appreciated that other types of temperature sensors may be used. In some embodiments, potential thermal damage can be calculated based on feedback from one or more temperature sensors and aspects of the energy in use, such as waveform parameters. Thus, in some embodiments, the system 100 includes software that calculates such potential thermal damage and such information is provided as feedback to the generator 104 during treatment. Thus, the energy delivery algorithm 152 can be modified or a different algorithm 152 can be selected based on the feedback information so as to change the energy delivered. In other embodiments, an alert is provided to the user. In other embodiments, approximate local perfusion at the treatment site may be calculated based on feedback from one or more temperature sensors measuring temperature at the treatment site in combination with the core temperature of the patient (measured either by a temperature sensor of the system 100 or other mechanisms). Thus, in some embodiments, the system 100 includes software that calculates such local perfusion at the treatment site and such information is provided as feedback to the generator 104 during treatment. Thus, the energy delivery algorithm 152 can be modified or a different algorithm 152 can be selected based on the feedback information so as to change the energy delivered.

In some embodiments, one or more temperature sensors are disposed along the surface of one or more energy delivery bodies 108 so as to contact the tissue and ensure that the tissue is not being heated above a pre-defined safety threshold. Thus, the one or more temperature sensors can be used to monitor the temperature of the tissue during treatment. In one embodiment, temperature changes that meet pre-specified criterion, such as temperature increases above a threshold (e.g., 40° C., 45° C., 50° C., 60° C., 65° C.) value, can result in changes to energy delivery parameters (e.g. modifying the algorithm) in an effort to lower the measured temperature or reduce the temperature to below the pre-set threshold. Adjustments can include but not be limited to increasing the rest period or dead time, or decreasing the packet count. Such adjustments occur in a pre-defined step-wise approach, as a percentage of the parameter, or by other methods.

In other embodiments, one or more temperature sensors monitor the temperature of the tissue and/or electrode, and if a pre-defined threshold temperature is exceeded (e.g., 65° C.), the generator 104 alters the algorithm to automatically cease energy delivery. For example, if the safety threshold is set at 65° C. and the generator 104 receives the feedback from the one or more temperature sensors that the temperature safety threshold is being exceeded, the treatment can be stopped automatically.

In some embodiments, the system 100 includes one or more sensors to measure pH. In some embodiments, such pH information is used to provide information about the microenvironment of the target treatment area, such as before, during and after treatment. When utilized during treatment, the pH information can be provided as feedback to the generator 104 so that the energy delivery algorithm 152 can be modified or a different algorithm 152 can be selected based on the feedback information. In other embodiments, an alert is provided to the user. Thus, energy delivered can be changed in real time. In either case, this may be triggered when the information crosses a predetermined threshold, optionally for a predetermined period of time.

It may be appreciated that the sensors may be located in various locations throughout the system 100. For example, one or more sensors may be attached to or embedded in the shaft 106 of the catheter 102. Additionally or alternatively, one or more sensors may be attached or embedded in the probe 700 or various probe elements. Likewise, if other accessories are utilized, one or more sensors may be located on the accessory and communicated to the system 100.

Alternative Delivery Approaches

As mentioned previously, in most embodiments, access is minimally invasive and relies on endoluminal approaches. However, it may be appreciated that other approaches, such as percutaneous, laparoscopic, or open surgical approaches, may be used in some situations.

In some embodiments, when accessing percutaneously, the shaft 106 of the catheter 102 is passed through a delivery device that penetrates the skin layer into the underlying tissue. In some embodiments, the delivery device comprises a needle that is inserted through the skin and directed toward the target tissue. The shaft 106 is then advanced through the needle. In some embodiments, the probe tip 702 is shaped to assist in penetrating tissue, such as a pointed shape. Thus, the shaft 106 may be advanced through tissue to the desired location therein. Once desirably positioned, energy is delivered through the probe tip 702 to treat the target tissue. It may be appreciated that the probe tip 702 may also be advanced from the shaft 106 into the tissue and/or a conductive element 760 may be advanced into the tissue wherein the energy is delivered from the conductive element 760.

In other embodiments, when accessing percutaneously, the shaft 106 of the catheter 102 is rigid so as to be able to penetrate the skin layer without the use of a delivery device. In such embodiments, the probe tip 702 is typically shaped to assist in penetrating tissue, such as a pointed shape. Thus, the shaft 106 itself is advanced into the tissue to the desired location therein. Once desirably, positioned, energy is delivered through the probe tip 702 to treat the target tissue. It may be appreciated that the probe tip 702 may also be advanced from the shaft 106 into the tissue and/or a conductive element 760 may be advanced into the tissue wherein the energy is delivered from the conductive element 760.

In laparoscopic approaches, the shaft 106 of the catheter 102 is passed through a laparoscope which has been inserted through a small incision. These small incisions provide reduced pain, reduced hemorrhaging and shorter recovery time in comparison to open surgery. In some embodiments, the probe tip 702 is shaped to assist in penetrating tissue, such as a pointed shape. Thus, the shaft 106 may be advanced through tissue to the desired location therein. Once desirably positioned, energy is delivered through the probe tip 702 to treat the target tissue.

In open surgical approaches, the shaft 106 of the catheter 102 may also be passed through a delivery device or the catheter 102 may penetrate the tissue directly. In either case, once desirably positioned, energy is delivered through the probe tip 702 to treat the target tissue.

Example Treatments

As mentioned previously, the devices, systems and methods described herein are provided to treat damaged, diseased, abnormal, obstructive, cancerous or undesired tissue by delivering specialized pulsed electric field (PEF) energy to target tissue areas. Such therapies may be used on their own wherein the undesired cells are destroyed, eliminated, killed, removed, etc., while maintaining non-cellular elements, such as collagen, elastin, and matrix proteins. These non-cellular elements maintain the structure of the tissue allowing for and encouraging normative cellular regeneration. Therefore, the integrity and mechanical properties of the tissue, and any nearby luminal structures, are maintained while abnormal or diseased cells and tissues are sufficiently eliminated. In such instances, the therapy may resolve the issue in a single treatment or may involve follow up treatments.

Figure 24:
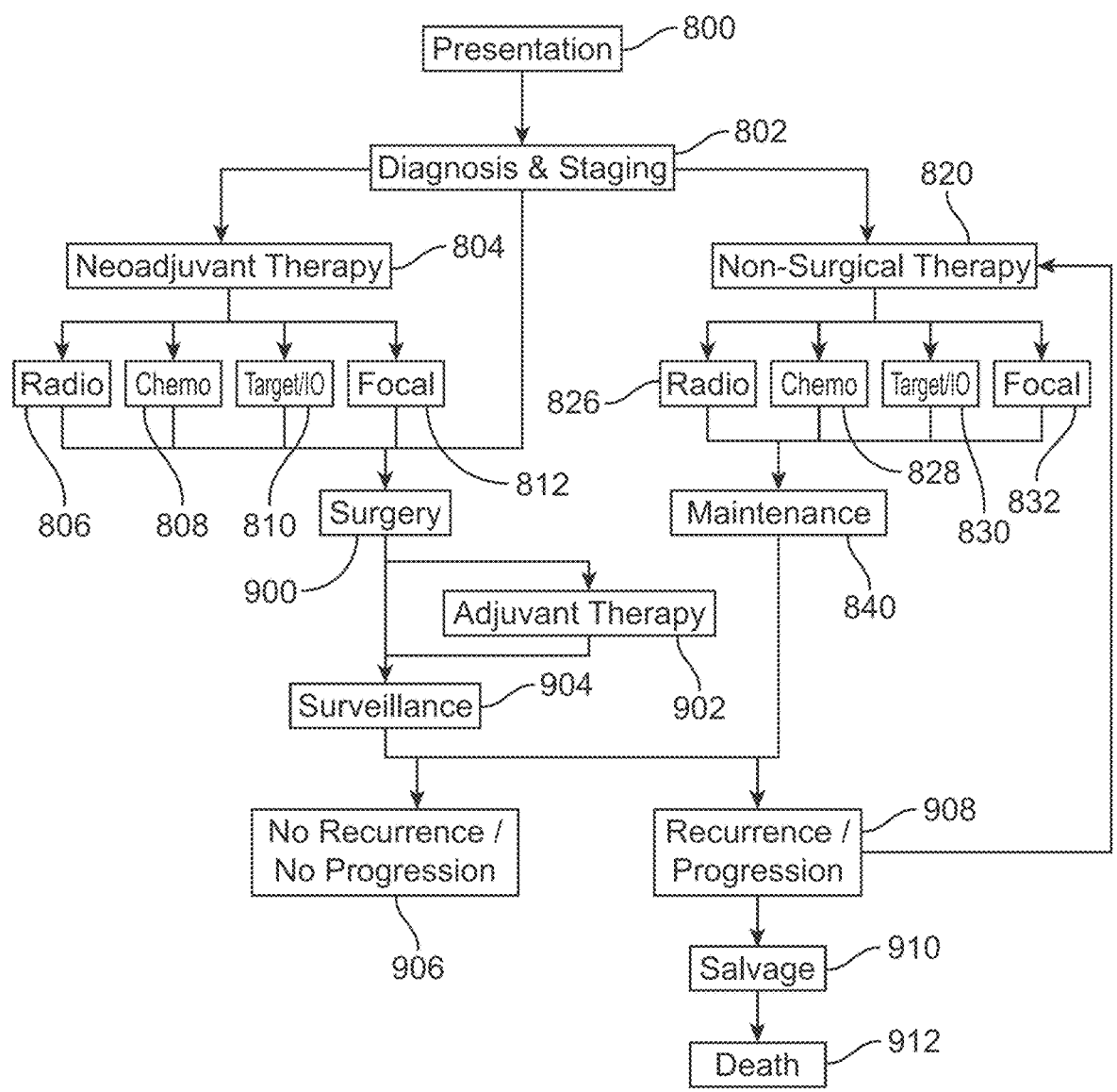
FIG. 24 provides a flowchart of example care path options for a cancer patient.

However, in some instances, the medical issue involves a variety of treatment options, of which the treatments provided by the systems 100 described herein are utilized in combination with other treatments. This may be particularly the case when treating cancer. FIG. 24 provides a flowchart of example care path options for a cancer patient. Cancer is typically discovered either through related symptoms or through unrelated testing wherein cancer is identified (step 800). Once discovered, a diagnosis is made as to the type of cancer and its stage (step 802). Stage refers to the extent of the cancer, such as how large the tumor is, and if it has spread. The FIGO (International Federation of Gynecology and Obstetrics) staging system is used most often for cancers of the female reproductive organs, including cervical cancer. The following explains the meaning of the letters and numbers:

FIGO Stage I: The cancer cells have grown from the surface of the cervix into deeper tissues of the cervix. Cancer has not spread to nearby lymph nodes. Cancer has not spread to distant sites.
  IA: There is a very small amount of cancer, and it can be seen only under a microscope. It has not spread to nearby lymph nodes. It has not spread to distant sites.
  IA1: The area of cancer can only be seen with a microscope and is less than 3 mm (about ⅛-inch) deep. It has not spread to nearby lymph nodes. It has not spread to distant sites.
  IA2: The area of cancer can only be seen with a microscope and is between 3 mm and 5 mm (about ⅕-inch) deep. It not has not spread to nearby lymph nodes. It has not spread to distant sites.
  IB: This includes stage I cancer that has spread deeper than 5 mm (about ⅕ inch) but is still limited to the cervix. It has not spread to nearby lymph nodes. It has not spread to distant sites.
  IB1: The cancer is deeper than 5 mm (about ⅕-inch) but not more than 2 cm (about ⅘-inch) in size. It has not spread to nearby lymph nodes. It has not spread to distant sites.
  IB2: The cancer is at least 2 cm in size but not larger than 4 cm. It has not spread to nearby lymph nodes. It has not spread to distant sites.
  IB3: The cancer is at least 4 cm in size and limited to the cervix. It has not spread to nearby lymph nodes. It has not spread to distant sites.

FIGO Stage II: The cancer has grown beyond the cervix and uterus, but hasn't spread to the walls of the pelvis or the lower part of the vagina. It has not spread to nearby lymph nodes. It has not spread to distant sites.
  IIA: The cancer has grown beyond the cervix and uterus but has not spread into the tissues next to the cervix (called the parametria). It has not spread to nearby lymph nodes. It has not spread to distant sites.
  IIA1: The cancer is not larger than 4 cm (about 1⅗ inches). It not has not spread to nearby lymph nodes. It has not spread to distant sites.
  IIA2: The cancer is 4 cm or larger. It has not spread to nearby lymph nodes. It has not spread to distant sites.
  IIB: The cancer has grown beyond the cervix and uterus and has spread into the tissues next to the cervix (the parametria). It has not spread to nearby lymph nodes. It has not spread to distant sites.

FIGO Stage III: The cancer has spread to the lower part of the vagina or the walls of the pelvis. The cancer may be blocking the ureters (tubes that carry urine from the kidneys to the bladder). It might or might not have spread to nearby lymph nodes. It has not spread to distant sites.
- IIIA: The cancer has spread to the lower part of the vagina but not the walls of the pelvis. It has not spread to nearby lymph nodes. It has not spread to distant sites.
- IIIB: The cancer has grown into the walls of the pelvis and/or is blocking one or both ureters causing kidney problems (called hydronephrosis). It has not spread to nearby lymph nodes. It has not spread to distant sites.
- IIIC: The cancer can be any size. Imaging tests or a biopsy show the cancer has spread to nearby pelvic lymph nodes (IIIC1) or para-aortic lymph nodes (IIIC2). It has not spread to distant sites.

FIGO Stage IV: The cancer has grown into the bladder or rectum or to far away organs like the lungs or bones.
- IVA: The cancer has spread to the bladder or rectum or it is growing out of the pelvis.
- IVB: The cancer has spread to distant organs outside the pelvic area, such as distant lymph nodes, lungs or bones.

The diagnosis and staging are used to plan the best treatment option for the patient. Typically, there are two main pathways of treatment for cancer patients, surgical treatments (left branch of flowchart) and non-surgical treatments (right branch of flowchart).

Surgery (step 900) can be utilized alone as a treatment option. However, it is often provided as a primary treatment in conjunction with neoadjuvant therapy (step 804) and/or adjuvant therapy (step 902). Neoadjuvant therapies are delivered before the primary treatment, to help reduce the size of a tumor or kill cancer cells that have spread. Adjuvant therapies are delivered after the primary treatment, to destroy remaining cancer cells. Neoadjuvant and adjuvant therapies benefit many, but not all, cancer patients. The type and stage of a patient's cancer often dictate whether he or she is a candidate for additional treatment. For example, if surgery determines that cancer is found in a large number of lymph nodes, the risk rises that cancer cells may be left behind and adjuvant therapy may help. Also, because certain cancers result from specific mutations that carry a high risk of recurrence, adjuvant therapy may benefit patients with these cancers more than those with cancers that have a lower recurrence risk. In some cases, neoadjuvant therapy may be more helpful than adjuvant therapy. For example, if neoadjuvant therapy is given before surgery, the physician can assess the response to see if the tumor is indeed shrinking. The treatment can then be adjusted accordingly, which may mean fewer treatments. Neoadjuvant therapy may also serve as a tool for determining the patient's response to treatment. If the tumor responds to the neoadjuvant therapy before surgery, it is known that the patient is more than likely to do well. Many times, both neoadjuvant and adjuvant therapies may be prescribed.

FIG. 24 illustrates a variety of different types of neoadjuvant therapies: radiotherapies (step 806), chemotherapy (step 808), targeted therapy/immunotherapy (step 810), and focal therapy (step 820). Example focal therapies include microwave ablation, radiofrequency ablation, cryoablation, high intensity focused ultrasound (HIFU), and pulsed electric field ablation, such as described herein.

Radiation therapy or radiotherapy (step 706), often abbreviated RT, RTx, XRT, or SBRT (also known as CyberKnife), is a therapy using ionizing radiation that is normally delivered by a linear accelerator. Radiation therapy is commonly applied to cancerous tumors because of its ability to control cell growth. Ionizing radiation works by damaging the DNA of cancerous tissue leading to cellular death. To spare normal tissues (such as skin or organs which radiation must pass through to treat the tumor), shaped radiation beams are aimed from several angles of exposure to intersect at the tumor, providing a much larger absorbed dose there than in the surrounding, healthy tissue.

It may be appreciated that since radiotherapy relies on damaging DNA to kill cells, the cells do not die immediately. Over time, the damage leads to cell death, leaving scarred tissue behind. In some instances, pulsed electric field ablation provided by the systems 100 described herein, are used in conjunction with radiotherapy to provide improved outcomes. For example, in some instances, the target tissue is treated with PEF energy provided by the systems 100 described herein, before, during and/or after radiotherapy. Such treatment disrupts cellular homeostasis, which can initiate an apoptotic-like effect which leads to permanent cell death or priming of the cells for more effective damage by the radiotherapy. Since cell death is delayed in radiotherapy, application of PEF energy after radiotherapy can also increase cell death rate. Thus, such combinatory treatment can lead to more effective treatment and better outcomes.

Chemotherapy (step 808) is typically a systemic therapy that is introduced into the bloodstream, so it is, in principle, able to address cancer at any anatomic location in the body. Traditional chemotherapeutic agents are cytotoxic by means of interfering with cell division but cancer cells vary widely in their susceptibility to these agents. To a large extent, chemotherapy can be thought of as a way to damage or stress cells, which may then lead to cell death if apoptosis is initiated. Many of the side effects of chemotherapy can be traced to damage to normal cells that divide rapidly and are thus sensitive to anti-mitotic drugs, particularly cells in the bone marrow, digestive tract and hair follicles. Chemotherapy may also be administered locally to the tumor tissue.

In some instances, pulsed electric field ablation provided by the systems 100 described herein, are used in conjunction with chemotherapy to provide improved outcomes. For example, in some instances, the target tissue is treated with PEF energy provided by the systems 100 described herein, before, during and/or after chemotherapy. Such treatment disrupts cellular homeostasis, which can initiate an apoptotic-like effect which leads to permanent cell death or priming of the cells for more effective damage by the chemotherapy. Such priming provides a synergy between the PEF treatment and the chemotherapy leading to outcomes that exceed either treatment alone. Thus, such combinatory treatment can lead to more effective treatment and greatly improved responses.

Targeted therapies/immunotherapy (step 810) are types of targeted cancer therapies. Targeted therapies are drugs or other substances that block the growth and spread of cancer by interfering with specific molecules or molecular targets that are involved in the growth, progression, and spread of cancer. Targeted therapies differ from standard chemotherapy in several ways. For example, targeted therapies act on specific molecular targets that are associated with cancer, whereas most standard chemotherapies act on all rapidly dividing normal and cancerous cells. Targeted therapies are deliberately chosen or designed to interact with their target, whereas many standard chemotherapies were identified because they kill cells. Targeted therapies are often cytostatic (i.e. block tumor cell proliferation), whereas standard chemotherapy agents are cytotoxic (i.e. kill tumor cells).

Targeted therapies are a cornerstone of precision medicine, a form of medicine that uses information about a person's genes and proteins to prevent, diagnose, and treat disease.

Immunotherapy is a type of biological therapy. Biological therapy is a treatment that uses substances made from living organisms to treat cancer. Several types of immunotherapy are used to treat cancer. One example is immune checkpoint inhibitors. Checkpoints are a normal part of the immune system and keep immune responses from being too strong. Therefore, by blocking or inhibiting them, these drugs allow immune cells to respond more strongly to cancer. In T-cell transfer therapy, immune cells are taken from the tumor. Those that are most active against the cancer are selected or modified to better attack the cancer cells, grown in large batches, and put back into the patient intravenously. This treatment boosts the natural ability of the T cells to fight cancer. In this treatment, immune cells are taken from your tumor. In another immunotherapy, monoclonal antibodies designed to bind to specific targets on cancer cells. Some monoclonal antibodies mark cancer cells so that they will be better seen and destroyed by the immune system. Monoclonal antibodies may also be called therapeutic antibodies. Further, immune system modulators have been developed that enhance the body's immune response against cancer. Some of these agents affect specific parts of the immune system, whereas others affect the immune system in a more general way.

In some instances, pulsed electric field ablation provided by the systems 100 described herein, are used in conjunction with targeted therapies and immunotherapies to provide improved outcomes. For example, in some instances, the target tissue is treated with PEF energy provided by the systems 100 described herein, before or during these therapies. When the PEF energy causes cell death, the cell membranes are ruptured and the internal cellular components are released. This exposes the DNA and other cellular components so as to be more easily identified by the immune system, targeted therapies and immunotherapies. Thus, such combinatory treatment can lead to more effective treatment and better outcomes.

Focal therapies (step 812) have also been used as neoadjuvant therapies. Focal therapies rely largely on local delivery of energy to kill cells. As mentioned, example focal therapies include radiofrequency ablation (RFA), microwave ablation (MWA), High-Intensity Focused Ultrasound (HIFU), cryoablation, and pulsed electric field ablation, such as described herein. MWA, RFA and HIFU are conventional therapies that rely on thermal energy. RFA and MWA are treatments that use image guidance to place a needle through the skin into a tumor, such as within the chest to treat lung cancer. In RFA, high-frequency electrical currents are passed through an electrode, creating a small region of heat. In MWA, microwaves are created from the needle to create a small region of heat. HIFU uses an ultrasound transducer, similar to the ones used for diagnostic imaging, but with much higher energy. The transducer focuses sound waves to generate heat at a single point within the body and destroy the target tissue. The tissue can raise to 150° F. in just 20 seconds. This process is repeated as many times as is necessary until the target tissue is destroyed. HIFU can also be operated in a non-thermal manner.

In each case, heat is intended to destroy the cancer cells. It is known that thermal energy destroys not only the cells but the collagen support structure by coagulation necrosis. Therefore, thermal energy cannot be used near sensitive or critical structures, such as body lumens. Likewise, thermal energy is limited in its range, effectiveness and ability to be repeated. For example, once tissue has been thermally ablated it is difficult or undesired to overlap or re-treat the tissue because the tissue has become necrosed and difficult to penetrate. For all of these reasons, pulsed electric field ablation provided by the systems 100 described herein, may be used in conjunction with RFA, MWA and HIFU therapies to treat tissue areas that are inaccessible or contraindicated for thermal treatments and/or to improve the effectiveness of these conventional therapies. Thus, in some instances, tissue is treated with PEF energy provided by the systems 100 described herein, before, during or after these conventional thermal therapies.

Other focal therapies do not rely on heat to kill cancer cells. For example, cryoablation utilizes extreme cold temperatures to kill cancer cells. During cryoablation, a thin needle (cryoprobe) is inserted through the skin and directly into the cancerous tumor. A gas is pumped into the cryoprobe in order to freeze the tissue. Then the tissue is allowed to thaw. The freezing and thawing process is repeated several times during the same treatment session. The intracellular and/or extracellular ice crystals formed in the process cause the cells to rupture. Like thermal energy, cryotherapy has limitations. To begin, the size of the lesions are restricted and the treatment times are extended. Further, the therapy is limited in locations to which it can be applied. For example, some locations cannot be reached with current technologies, such as the lymph nodes. Likewise, although luminal structures are preserved, cryotherapy is not suitable for use near many luminal structures due to interference with the cooling process which leaves the therapy ineffective. For all of these reasons, pulsed electric field ablation provided by the systems 100 described herein, may be used in conjunction with cryotherapy to treat tissue areas that are inaccessible or contraindicated treatments and/or to improve the effectiveness of these conventional therapies.

Likewise, non-thermal energy has been used to treat tumors by mechanisms other than heating. In particular, irreversible electroporation (IRE) has been used for the treatment of cancerous tumors. Percutaneous IRE is performed with a system called NanoKnife® that utilizes probes inserted through the skin to deliver energy to tumor cells. The technique uses a non-thermal energy to create permanent nanopores in the cell membrane. After delivering a sufficient number of high voltage pulses, the cells within the electrical field will be irreversibly damaged and die. Like other such therapies, percutaneous IRE has limitations. As in other cases, the therapy is limited in locations to which it can be applied. Some locations cannot be reached with a percutaneous approach or are suitable for treatment with the NanoKnife®. Thus, pulsed electric field ablation provided by the systems 100 described herein, may be used in conjunction with other non-thermal treatments to treat tissue areas that are inaccessible or contraindicated for such treatments and/or to improve the effectiveness of these therapies.

It may be appreciated that pulsed electric field ablation provided by the systems 100 described herein may be used alone as a non-adjuvant therapy. Such PEF ablation may cause sufficient tissue destruction and cellular death so as to render the cancer treated and the patient cured. In addition, immune system priming due to the presence of highly antigenetic tumor cellular components resulting from the deposition of such PEF energy in the targeted tissue could induce the abscopal effect. The abscopal effect is a theory regarding the use of a local treatment in one area that results in cancer shrinking in an untreated area. This is particularly beneficial when treating metastatic cancers. When the PEF energy causes cell death, the cell membranes are ruptured and the internal cellular components are released. This exposes the DNA and other cellular components so as to be more easily identified by the immune system. These components are carried to the lymph system which also assists in identification. Thus, the treatment acts as a vaccine in some regard, generating a systemic immune response.

Likewise, it may be appreciated that any of the neoadjuvant therapies may be used in any combination, including combinations of more than two therapies.

Referring again to FIG. 24, once neoadjuvant therapy has been provided, surgery (step 900) is provided for those on the surgical care path. It may be appreciated that some patients will receive surgery (step 900) directly after diagnosis and staging (step 802), skipping neoadjuvant therapy altogether. After surgery, some patients may be considered cured and will undergo surveillance (step 904) to monitor the patient for signs of cancer recurrence. Other patients will undergo adjuvant therapy (step 902) to destroy any remaining cancer cells. Adjuvant therapy may comprise any of the treatments described herein above in relation to neoadjuvant therapy, such as radiotherapies, chemotherapy, targeted therapy/immunotherapy, either alone or in combination with pulsed electric field ablation provided by the systems 100 described herein. Likewise, adjuvant therapy may comprise any of the treatments described herein above in relation to focal therapy, such as radiofrequency ablation (RFA), microwave ablation (MWA), High-Intensity Focused Ultrasound (HIFU), cryoablation, pulsed electric field ablation provided by the systems 100 described herein and other pulsed electric field ablations, or any combination of these. It may be appreciated that any of the adjuvant therapies may be used in any combination, including combinations of more than two therapies. After adjuvant therapies, patients will undergo surveillance (step 804) to monitor the patient for signs of cancer recurrence. Some patients will not have a recurrence and will be considered cured (step 806).

Unfortunately, some patients will have cancer recurrence (step 908). Typically, these patients will be treated with non-surgical therapy options. Referring to FIG. 24, non-surgical therapy (step 820) is offered as a first line of therapy for patients unsuited or contraindicated to surgery or for patients who have a cancer recurrence. As illustrated in the flowchart, non-surgical therapy may comprise any of the treatments described herein above in relation to neoadjuvant therapy, such as radiotherapies (step 826), chemotherapy (step 828), targeted therapy/immunotherapy (step 830), either alone or in combination with pulsed electric field ablation provided by the systems 100 described herein. Likewise, non-surgical therapy may comprise any of the treatments described herein above in relation to focal therapy (step 832), such as radiofrequency ablation (RFA), microwave ablation (MWA), High-Intensity Focused Ultrasound (HIFU), cryoablation, pulsed electric field ablation provided by the systems 100 described herein and other pulsed electric field ablations, or any combination of these. It may be appreciated that any of the non-surgical therapies may be used in any combination, including combinations of more than two therapies. After such therapy, the patient will typically undergo maintenance procedures (step 740) to keep the cancer at bay.

A portion of these patients will have no recurrence or progression and will ultimately be considered cured (step 906). Those with recurrence may have additional non-surgical therapies. Others will be given salvage therapy (step 910), treatments that are given after the cancer has not responded to other treatments. And, ultimately some patients will succumb to the cancer (step 912).

It may be appreciated the pulsed electric field ablation treatments provided by the systems 100 described herein, either alone or optionally in combination with other therapies, provides additional benefits beyond the immediate success of the therapy. For example, in some instances, the PEF ablation treatments provided by the systems 100 induce an abscopal effect. The abscopal effect is a theory regarding the use of a local treatment in one area that results in cancer shrinking in an untreated area. This is particularly beneficial when treating metastatic cancers. When the PEF energy causes cell death, the cell membranes are ruptured and the internal cellular components are released. This exposes the DNA and other cellular components so as to be more easily identified by the immune system. These components are carried to the lymph system which also assists in identification. Thus, the treatment acts as a vaccine in some regard, generating a systemic immune response. This may be further accentuated when utilizing targeted therapies and immunotherapies.

Conditioning

In some embodiments, cells targeted for treatment are conditioned so as to modify the behavior of the cells in response to the delivery of the energy signals. Such conditioning may occur prior to, during, or after delivery of the energy signals. In some embodiments, conditioning prior to energy delivery is considered pre-conditioning and conditioning after energy delivery is considered post-conditioning. Such differentiation is simply based on timing rather than on how the conditioning treatment affects the cells. In other embodiments, pre-conditioning relates to affecting what happens to the cells during energy delivery, such as how the cells uptake the energy, and post-conditioning relates to affecting what happens to the cells after energy delivery, such as how the cells behave after receiving the energy. Such differentiation may be less relevant to timing since in some instances conditioning may occur prior to energy delivery but only affect the cellular response following the energy delivery. Therefore, it may be appreciated that "conditioning" may be considered to apply to each of these situations unless otherwise noted.

Typically, conditioning is achieved by delivering a conditioning solution. In some embodiments, the conditioning solution is delivered via direct fluid injection of the conditioning solution into the targeted region. In some embodiments, the conditioning solution selectively alters the electrical properties of the target cells, such as to affect the way the pulsed energy delivery gets distributed. In other embodiments, the conditioning solution influences the activity of the target cells. In other embodiments, the conditioning solution increases the likelihood of the target cells to expire following pulsed energy delivery. In still other embodiments, the conditioning solution alters the responses of non-targeted cells to the pulsed electric fields. In alternate embodiments, conditioning is performed via non-solution-based exposure of the tissues. This includes radiation therapy, radiotherapy, proton beam therapy. In some embodiments, the conditioning will impact the enzymatic and energy-producing components of the cellular infrastructure.

The conditioning solution may be comprised of a variety of agents, such as drugs, genetic material, bioactive compounds, and antimicrobials, to name a few. For embodiments where the conditioning solution increases the likelihood of the target cells to expire following pulsed energy delivery, the conditioning solution may comprise chemotherapy drugs (e.g. doxorubicin, paclitaxel, bleomycin, carboplatin, etc), calcium, antibiotics, or toxins, to name a few. For embodiments where the conditioning solution alters the responses from non-targeted cells to the pulsed electric fields, the conditioning solution may comprise cytokines (e.g. immunostimulants, such as interleukins), genes, VEGF (e.g. to encourage more vessel growth into area) and/or cellular differentiating factors.

In some embodiments, the conditioning solution includes cells, such as stem cells, autograft cells, allograft cells or other cell types. In these embodiments, the cells may be used to alter the tissue response to the pulsed electric fields. In other embodiments, the cells may be used to repopulate the affected area with healthy or desirable cells. For example, once target cells have been weakened or killed by the delivered pulsed energy treatment, the cells from the conditioning solution may move into the vacancies, such as a decellularized extracellular matrix. In some embodiments, the area is washed out to remove the dead cells, such as with a mild detergent, surfactant or other solution, prior to delivery of the conditioning solution containing the new cells. In other embodiments, mechanical stimulation, such as suction, debriding, or ultrasonic hydrodissection, is used to physically remove the dead cells prior to delivery of the conditioning solution containing the new cells.

In some embodiments, the conditioning provided may invoke a targeted immune response. The immune response may result in a number of factors that alter the treatment effect outcome. This may result in an increase in the systemic immunity upregulation using specific markers associated with some targeted tissue, such as a tumor or bacteria or virus associated with an infection. It may also result in an upregulation of the innate immunity that broadly affects the immune system functionality to detect general abnormal cells, bacteria, or other infectious organisms residing within the body, which may occur locally, regionally, or systemically.

In some embodiments, the conditioning solution is warmed or chilled to alter how the target cells respond. Generally, warmed solutions promote increased treatment effects (e.g. increased susceptibility to cell death), while chilled solutions would reduce the extent of treatment effect or increase cell survival after exposure to a reversibly-designed protocol. In some embodiments, a chilled conditioning solution comprised of genes and or drugs is used to precondition cells to survive energy delivery treatment, increasing the number of cells that survive the treatment. In some embodiments, the effects of the warmed/chilled conditioning solution is compounded with the general effects caused by the other agents in the solution (e.g. warmed calcium solution, chilled gene containing solution). In other embodiments, the warmed/chilled conditioning solution does not provide effects other than temperature changes. In such embodiments, the conditioning solution is typically comprised of isotonic saline, phosphate buffered solution or other benign solution.

It may be appreciated that such heating or cooling may alternatively be achieved by other methods that do not involve delivery of a conditioning solution. For example, the target tissue may be heated or cooled by contacting the tissue with a warmed/cooled device, deliberately warming/cooling the pulsed electric field delivery catheter, delivering mild cryotherapy, or delivering mild radiofrequency or microwave energy. As previously described, this could promote enhanced lethality or permeability effects to the tissue or it could provide protective aspects to the cells that enable them to survive the procedure and exude the desired change as was targeted for them as a result of the therapy.

In some embodiments, a conditioning solution is delivered systemically, such as by intravenous injection, ingestion or other systemic methods. In other embodiments, the conditioning solution is delivered locally in the area of the targeted cells, such as through a delivery device or the energy delivery catheter 102 itself.

Vulvovaginal Rejuvenation

Vulvovaginal rejuvenation can be used for both aesthetic and functional problems of the female genitalia and urinary tract. The aesthetics of the female genitalia have become an area of interest for women as women in increasing numbers are choosing to alter their genital anatomy to gain greater self-esteem, diminish functional discomforts and improve sexual pleasure. Others are interested in correcting functional problem which can occur due to physiologic changes in a woman's life, such as childbirth and weight fluctuations, genetics or even trauma. Vaginal laxity is associated with stretching and expansion of the vaginal introitus, often attributed to vaginal childbirth. The vaginal muscle tone decreases and can lead to orgasmic dysfunction, changes in genital sensation, and even urinary incontinence. Likewise, hormonal changes due to aging and menopause may alter the laxity of the vaginal canal, damage the pelvic floor, and devitalize the mucosal tone of the vaginal wall. These events often lead to the development of genitourinary conditions such as stress urinary incontinence; vaginal atrophy; dryness; and physiologic distress affecting a woman's quality of life, self-confidence, and sexuality. This myriad of symptoms may be referred to as genitourinary syndrome of menopause. Many patients with vaginal laxity or genitourinary syndrome of menopause also have stress urinary incontinence, recurrent urinary tract infections and pain with urination. Thus, for both cosmetic and medical reasons, women seek to revitalize or rejuvenate the vagina and/or associated structures. Vaginal or vulvovaginal rejuvenation are marketing rather than medical nomenclature, however such terms may be used to describe a range of aesthetic and functional procedures that correct and restore the optimal or normative aesthetics and functionality of these organs and tissues.

The vaginal wall is comprised of a superficial layer of nonkeratinized, squamous epithelial cells while deeper layers of the vaginal wall contain dense connective tissue, smooth muscle, collagen, and elastin, which give the vaginal wall strength and elasticity. Vaginal mucosa is estrogen dependent and responds to cyclic changes associated with the menstrual cycle. With menopause, estrogen production decreases and this in turn causes changes in the genital tract with the decreased vaginal elasticity and thinning of the vaginal walls. Blood flow and secretions in the vagina also decrease as a result of decreased estrogen levels.

The vagina wall may be treated with particular devices, systems and methods described herein to reduce or reverse at least some of these anatomical changes. In some embodiments, a therapeutic energy delivery catheter 102, such as illustrated in FIG. 3A or FIG. 3B, is inserted into the vagina to apply energy to a portion of the vaginal wall. The catheter 102 has an elongate shaft 106 with at least one energy delivery body 108 near its distal end and a handle 110 at its proximal end. The catheter 102 is connectable to a generator 104 as part of a treatment system 100. Connection of the catheter 102 to the generator 104 provides electrical energy to the energy delivery body 108, among other features. Embodiments such as illustrated in FIG. 3A comprise an energy delivery body 108 having a plurality of wires or ribbons 120, constrained by a proximal end constraint 122 and a distal end constraint 124, and forms a basket serving as an electrode. The energy delivery body 108 is expandable within the vagina so that the basket contacts the vaginal wall, either circumferentially or partially circumferentially. Pulsed electric field energy is delivered to the vaginal wall in a manner so that the epithelial cells are treated. In some embodiments, the epithelial cells are destroyed so that new healthy epithelial cells are able to regrow in their place. In other embodiments, the epithelial cells are treated so as to improve blood flow and lubricity in the area.

It may be appreciated that a variety of other designs may be used. For example, FIG. 3B illustrates an energy delivery body 108 having a paddle shape. In this embodiment, the energy delivery body 108 is comprised of a plurality of wires or ribbons 120 arranged so as to form a flat pad or paddle. In such embodiments, the paddle may be positioned against the vaginal wall for treatment. In other embodiments, the energy delivery body comprises a flexible material having surface electrodes, such as flexible pad electrodes. Such electrodes may be utilized to provide energy circumferentially or partially circumferentially to the vaginal canal. Or, the electrodes may be utilized individually or in groups to provide focal therapy as described herein above.

In some embodiments, energy is provided in conjunction with an agent such as a pharmacological agent (e.g. growth factor, hormone, estrogen, etc.). In some embodiments, the energy causes the epithelial cells to preferentially absorb the agent for beneficial therapeutic effect, such as to correct and restore the optimal or normative aesthetics and functionality of the vaginal tissue.

It may be appreciated that the devices, systems and methods described herein in relation to treatments of conditions and disorders of the reproductive tract may be utilized in other areas of the body, including other lumens, cavities and tissue surfaces. Likewise, various parameter values and parameter value combinations to achieve various treatment depths described herein may be utilized to treat tissues at such treatment depths in other areas of the body outside of the reproductive tract. Example luminal structures include blood vessels, airways, esophagus, stomach, small and large intestines, colon, bladder, urethra, urinary collecting ducts, uterus, vagina, fallopian tubes, ureters, kidneys, renal tubules, spinal canal, spinal cord, and others throughout the body, as well as structures within and including such organs as the lung, heart and kidneys, to name a few.

It may be appreciated that although the devices, systems and method are described herein to utilize pulsed electric fields, it may be appreciated that in some instances other types of energy may be used instead of pulsed electric fields or in combination with pulsed electric fields. Other types of energy include microwave, radiofrequency (RF), and high intensity focused ultrasound (HIFU), to name a few.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for treating an area of tissue suffering from dysplasia or cancer within a reproductive system of a patient comprising:

a catheter comprising an elongate shaft and an energy delivery body disposed near a distal end of the elongate shaft, wherein the elongate shaft is configured to be advanced into a luminal structure of the reproductive system so as to position the energy delivery body near or against the area of tissue suffering from dysplasia or cancer within the reproductive system; and a generator couplable with the catheter, wherein the generator includes at least one energy delivery algorithm configured to be capable of providing an electric signal of energy at a depth of 2 mm and less into a wall of the luminal structure, wherein the energy is deliverable by the energy delivery body so as to treat the area of tissue suffering from dysplasia or cancer at a depth of up to 2 mm, wherein the energy comprises non-thermal energy and treating the area of tissue suffering from dysplasia or cancer comprises destroying at least a portion of cells suffering from dysplasia or cancer within the area of tissue while maintaining its collagen structure.

2. A system as in claim 1, wherein the luminal structure comprises a cervix, a vagina, a uterus, an endocervical canal or a fallopian tube.

3. A system as in claim 2, wherein the energy delivery body comprises a flexible expandable member configured to be pressable against the luminal structure so as to conform to contours of the luminal structure.

4. A system as in claim 3, wherein the flexible expandable member includes one or more flexible electrodes.

5. A system as in claim 1, wherein the electric signal comprises a series of biphasic pulses delivered in packets to provide the non-thermal energy.

6. A system as in claim 5, wherein each of the biphasic pulses has a voltage between approximately 500-4000 V.

7. A system as in claim 5, wherein the electric signal has a frequency in the range of approximately 100-1000 kHz.

8. A system as in claim 1, wherein the energy delivery body has a shape configured to mate with contours of a cervix of the reproductive system of the patient.

9. A system as in claim 1, wherein the catheter further comprises a stabilizing element configured to be advanced into a uterus of the patient to stabilize the catheter while the energy delivery body resides in a vagina of the patient so as to deliver energy to a cervix.

10. A system as in claim 1, wherein the catheter further comprises a second energy delivery body, wherein the second energy delivery body is configured to be advanced into a uterus of the patient so as to treat an area of tissue within the uterus while the energy delivery body resides in a vagina of the patient so as to treat an area of tissue within the vagina.

11. A system as in claim 10, further comprising a third energy delivery body configured to be advanced into an endocervical canal of the patient.

12. A system as in claim 1, wherein the energy delivery body comprises a probe configured to penetrate a wall of a luminal structure within the reproductive system and deliver the energy to the area of tissue.

13. A method of treating an area of tissue having cells suffering from dysplasia or cancer within a reproductive system of a patient comprising:

inserting a distal end of a catheter having an energy delivery body into a luminal structure of the reproductive system;

positioning the energy delivery body near the area of tissue having the cells suffering from dysplasia or cancer; and providing energy to the catheter with the use of a generator having an energy delivery algorithm configured to be capable of delivering energy at a depth of 2 mm into a wall of the luminal structure so that the energy delivery body delivers the energy to the area of tissue so as to treat the area of tissue to a depth of up to but not beyond 2 mm into a wall of the luminal structure, and wherein the energy comprises non-thermal energy that leads to destruction of at least a portion of the cells suffering from dysplasia or cancer in the area of tissue while maintaining a collagen structure within the area of tissue.

14. A method as in claim 13, wherein providing energy to the catheter comprises providing energy to but not beyond an epithelial layer of the luminal structure within the reproductive tract.

15. A method as in claim 13, wherein the luminal structure comprises a cervix, vagina, uterus, endocervical canal or fallopian tube.

16. A method as in claim 13, wherein providing energy to the catheter comprises providing energy to the catheter so that the energy delivery body delivers energy to the area of tissue to a depth of up to 3 cm from an exterior of a wall of the luminal structure.

17. A method as in claim 13, further comprising positioning a return electrode at a distance from the energy delivery body so that the energy delivery body functions in a monopolar fashion.

18. A method as in claim 13, further comprising delivering a liquid to the area of tissue, wherein the liquid comprises a conductive solution.

19. A method as in claim 13, further comprising delivering a liquid to the area of tissue, wherein the liquid comprises adjuvant material and wherein the energy encourages uptake of the adjuvant material.

20. A method as in claim 19, wherein the adjuvant material comprises a molecule, a macromolecule, or a plasmid.

* * * * *